United States Patent
Otani

(10) Patent No.: US 6,400,693 B2
(45) Date of Patent: *Jun. 4, 2002

(54) COMMUNICATIONS APPARATUS FOR MULTIMEDIA INFORMATION

(75) Inventor: Masatoshi Otani, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/982,027

(22) Filed: Dec. 1, 1997

Related U.S. Application Data

(63) Continuation of application No. 08/365,758, filed on Dec. 29, 1994, now abandoned.

(30) Foreign Application Priority Data

| Dec. 29, 1993 | (JP) | 5-351691 |
| Dec. 29, 1993 | (JP) | 5-351692 |
| Dec. 29, 1993 | (JP) | 5-351694 |
| Dec. 29, 1993 | (JP) | 5-351697 |
| Dec. 29, 1993 | (JP) | 5-351699 |

(51) Int. Cl.[7] .................................. H04M 11/00
(52) U.S. Cl. ........................ 370/271; 348/14.06
(58) Field of Search ................. 370/485, 486, 370/487, 489, 490, 533, 265, 270, 271, 498; 348/7, 13, 14, 15, 17, 18, 14.01, 14.04, 14.06; 379/93.01

(56) References Cited

U.S. PATENT DOCUMENTS

| 4,827,339 A | 5/1989 | Wada et al. ................ 358/136 |
| 5,018,186 A | 5/1991 | Kimura et al. ............. 379/153 |
| 5,164,980 A | 11/1992 | Bush et al. ................... 379/53 |
| 5,182,642 A | 1/1993 | Gersdorff et al. .......... 358/133 |
| 5,231,492 A | 7/1993 | Dangi et al. ................ 358/143 |
| 5,367,522 A | * 11/1994 | Otani .......................... 370/468 |
| 5,473,366 A | 12/1995 | Imaeda et al. ................ 348/14 |
| 5,481,542 A | * 1/1996 | Logston et al. ................ 348/7 |
| 5,497,373 A | 3/1996 | Hulen et al. ................ 370/79 |
| 5,512,938 A | 4/1996 | Ohno ........................... 348/15 |
| 5,524,194 A | 6/1996 | Chida et al. ................ 395/154 |
| 5,528,285 A | 6/1996 | Morikawa et al. ........... 348/14 |
| 5,966,164 A | * 10/1999 | Gotoh et al. ................. 348/14 |

FOREIGN PATENT DOCUMENTS

| EP | 0 447 212 | 9/1991 |
| EP | 0 477 080 | 3/1992 |

* cited by examiner

Primary Examiner—Min Jung
(74) Attorney, Agent, or Firm—Fitzpatrick, Cella, Harper & Scinto

(57) ABSTRACT

A communication unit stores information including audio and image information in order to respond to a multiplexed multimedia information signal from another communication unit. In response to the received multiplexed multimedia information signal, the stored image information is transmitted after transmission of the stored audio information.

11 Claims, 40 Drawing Sheets

FIG. 2A
PRIOR ART

| | SUBMULTI-FRAME NO. | FRAME NO. | FRAME SYNCHRONIZATION SIGNAL (FAS) | | | | | | | |
|---|---|---|---|---|---|---|---|---|---|---|
| | | | b1 | b2 | b3 | b4 | b5 | b6 | b7 | b8 |
| MULTI-FRAME | SMF1 | 0 | N1 | 0 | 0 | 1 | 1 | 0 | 1 | 1 |
| | | 1 | 0 | 1 | A | E | C1 | C2 | C3 | C4 |
| | SMF2 | 2 | N2 | 0 | 0 | 1 | 1 | 0 | 1 | 1 |
| | | 3 | 0 | 1 | A | E | C1 | C2 | C3 | C4 |
| | SMF3 | 4 | N3 | 0 | 0 | 1 | 1 | 0 | 1 | 1 |
| | | 5 | 0 | 1 | A | E | C1 | C2 | C3 | C4 |
| | SMF4 | 6 | N4 | 0 | 0 | 1 | 1 | 0 | 1 | 1 |
| | | 7 | 0 | 1 | A | E | C1 | C2 | C3 | C4 |
| | SMF5 | 8 | N5 | 0 | 0 | 1 | 1 | 0 | 1 | 1 |
| | | 9 | 0 | 1 | A | E | C1 | C2 | C3 | C4 |
| | SMF6 | 10 | L1 | 0 | 0 | 1 | 1 | 0 | 1 | 1 |
| | | 11 | 0 | 1 | A | E | C1 | C2 | C3 | C4 |
| | SMF7 | 12 | L2 | 0 | 0 | 1 | 1 | 0 | 1 | 1 |
| | | 13 | L3 | 1 | A | E | C1 | C2 | C3 | C4 |
| | SMF8 | 14 | TEA | 0 | 0 | 1 | 1 | 0 | 1 | 1 |
| | | 15 | R | 1 | A | E | C1 | C2 | C3 | C4 |

FIG. 2B
PRIOR ART

| | BIT RATE ASSIGNMENT SIGNAL (BAS) | | | | | | | |
|---|---|---|---|---|---|---|---|---|
| | b9 | b10 | b11 | b12 | b13 | b14 | b15 | b16 |
| EVEN NUMBERS FRAME | B0 | B1 | B2 | B3 | B4 | B5 | B6 | B7 |
| ODD NUMBERS FRAME | P2 | P1 | P0 | P4 | P3 | P5 | P6 | P7 |

| FIG. 7A |
| FIG. 7B |

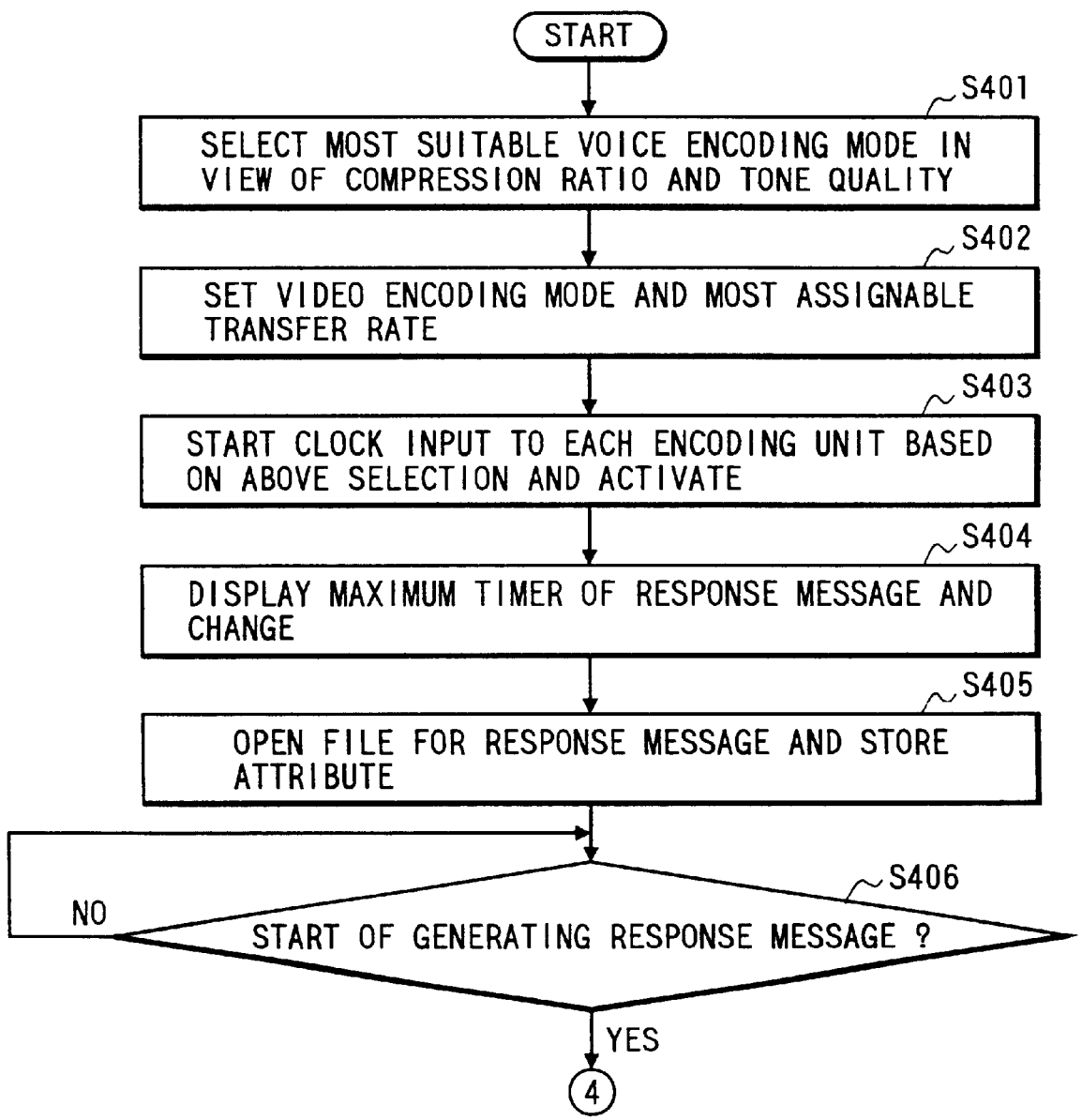

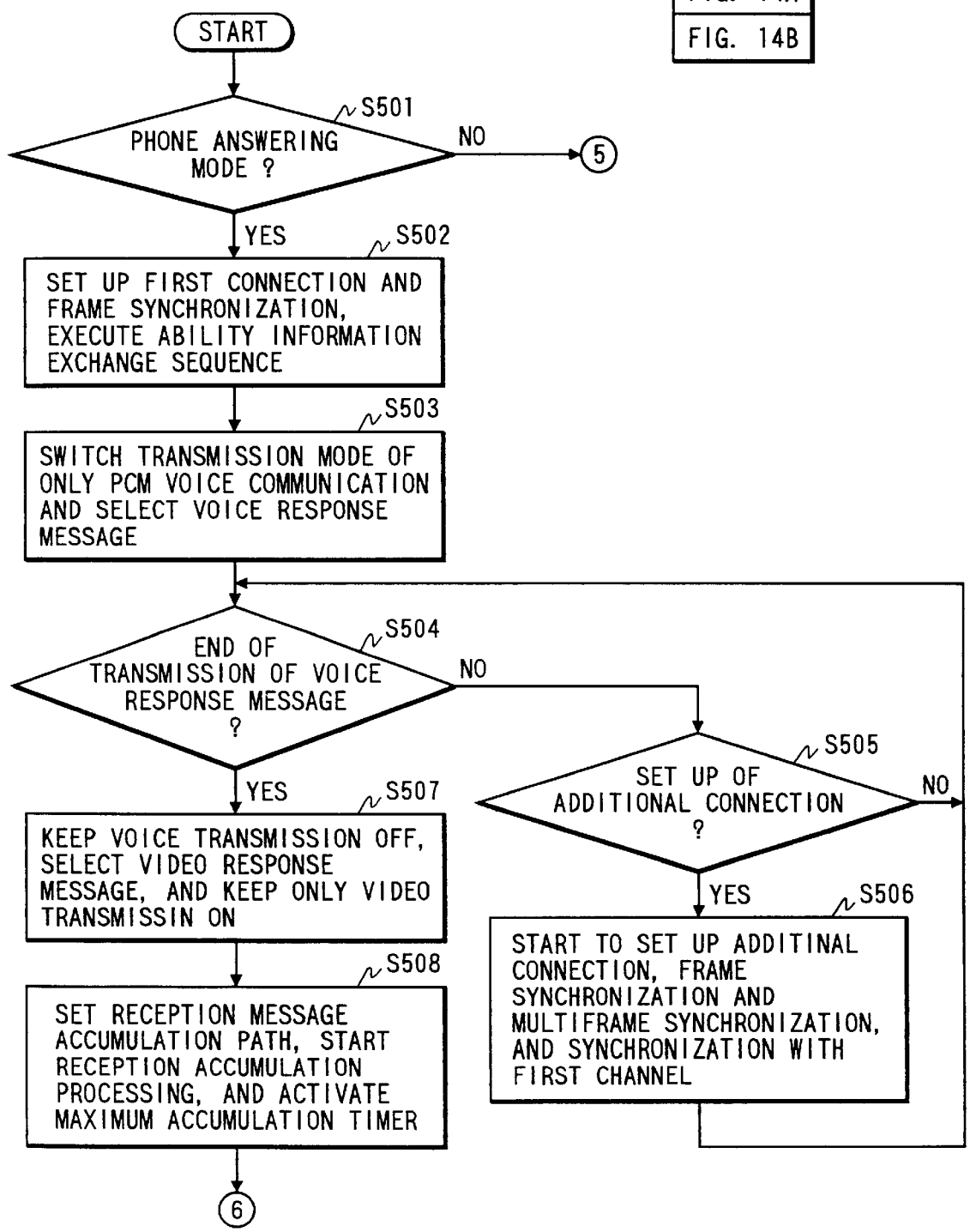

FIG. 16B

SECOND CHANNEL

| FAS | BAS | #8 |
|---|---|---|
| SUBCHANNEL #7 ||||
| SUBCHANNEL #6 |||
| SUBCHANNEL #5 |||
| SUBCHANNEL #4 |||
| SUBCHANNEL #3 |||
| SUBCHANNEL #2 |||
| SUBCHANNEL #1 |||

IDLE 68.8Kbps

FIG. 16A

FIRST CHANNEL

| FAS | BAS | #8 |
|---|---|---|
| SUBCHANNEL #7 |||
| SUBCHANNEL #6 |||
| SUBCHANNEL #5 |||
| SUBCHANNEL #4 |||
| SUBCHANNEL #3 |||
| SUBCHANNEL #2 |||
| SUBCHANNEL #1 |||

VOICE CHANNEL 56Kbps

FIG. 17B

SECOND CHANNEL

| FAS | BAS | #8 |
|---|---|---|
| SUBCHANNEL #7 | | |
| SUBCHANNEL #6 | | |
| SUBCHANNEL #5 | | |
| SUBCHANNEL #4 | | |
| SUBCHANNEL #3 | | |
| SUBCHANNEL #2 | | |
| SUBCHANNEL #1 | | |

FIG. 17A

FIRST CHANNEL

| FAS | BAS | #8 |
|---|---|---|
| SUBCHANNEL #7 | | |
| SUBCHANNEL #6 | | |
| SUBCHANNEL #5 | | |
| SUBCHANNEL #4 | | |
| SUBCHANNEL #3 | | |
| SUBCHANNEL #2 | | |
| SUBCHANNEL #1 | | |

ANIMATING IMAGE INFORMATION 124.8Kbps

FIG. 19

FIRST CHANNEL

| FAS | BAS | #8 |
|---|---|---|
| SUBCHANNEL #7 ||| 
| SUBCHANNEL #6 ||| 
| SUBCHANNEL #5 ||| 
| SUBCHANNEL #4 ||| 
| SUBCHANNEL #3 ||| 
| SUBCHANNEL #2 ||| 
| SUBCHANNEL #1 |||

LSD (STILL IMAGE) INFORMATION 62.4Kbps

FIG. 18

FIRST CHANNEL

| FAS | BAS | #8 |
|---|---|---|
| SUBCHANNEL #7 ||| 
| SUBCHANNEL #6 ||| 
| SUBCHANNEL #5 ||| 
| SUBCHANNEL #4 ||| 
| SUBCHANNEL #3 ||| 
| SUBCHANNEL #2 ||| 
| SUBCHANNEL #1 |||

ANIMATING IMAGE INFORMATION 62.4Kbps

FIG. 20B

SECOND CHANNEL

| FAS | BAS | #8 |
|-----|-----|-----|
| SUBCHANNEL #7 |||
| SUBCHANNEL #6 |||
| SUBCHANNEL #5 |||
| SUBCHANNEL #4 |||
| SUBCHANNEL #3 |||
| SUBCHANNEL #2 |||
| SUBCHANNEL #1 |||

} IDLE 62.4Kbps

FIG. 20A

FIRST CHANNEL

| FAS | BAS | #8 |
|-----|-----|-----|
| SUBCHANNEL #7 |||
| SUBCHANNEL #6 |||
| SUBCHANNEL #5 |||
| SUBCHANNEL #4 |||
| SUBCHANNEL #3 |||
| SUBCHANNEL #2 |||
| SUBCHANNEL #1 |||

} LSD (STILL IMAGE) INFORMATION 62.4Kbps

FIG. 21A

FIRST CHANNEL

| FAS | BAS | #8 |
|---|---|---|
| SUBCHANNEL #7 ||||
| SUBCHANNEL #6 ||||
| SUBCHANNEL #5 ||||
| SUBCHANNEL #4 ||||
| SUBCHANNEL #3 ||||
| SUBCHANNEL #2 ||||
| SUBCHANNEL #1 ||||

IDLE 62.4Kbps

FIG. 21B

SECOND CHANNEL

| FAS | BAS | #8 |
|---|---|---|
| SUBCHANNEL #7 ||||
| SUBCHANNEL #6 ||||
| SUBCHANNEL #5 ||||
| SUBCHANNEL #4 ||||
| SUBCHANNEL #3 ||||
| SUBCHANNEL #2 ||||
| SUBCHANNEL #1 ||||

HSD (STILL IMAGE) INFORMATION 62.4Kbps

COMMUNICATIONS APPARATUS FOR MULTIMEDIA INFORMATION

This application is a continuation of Ser. No. 08/365,758 filed Dec. 29, 1994 now abandoned.

BACKGROUND OF THE INVENTION

1. Field of the Invention

The present invention relates to a communications apparatus for multimedia information such as an AV (Audio Visual) communications apparatus used for a television telephone apparatus, and video-conference systems.

2. Related Background Art

In recent years, along with the inauguration of the communications services through ISDN circuits, a particular attention has been given to the television telephone, video-conference systems, and other AV services which use a digital circuit of the kind.

Along the inauguration of AV services, the service regulations for AV services, protocol regulations, structural regulations of multiplexing frames for multimedia, encoding methods for animated image information, and the like are recommended as recommendations H.320, H.242, H.221, H.230, H.261 among others.

Now, with reference to the accompanying drawings, the recommendation H.221 will be described. FIG. 1 is a view which shows the frame structure regulated by the JTU-TS Recommendation H.221 for 64 kbps one channel. FIGS. 2A and 2B are views which represent the bit assignments between FAS one multiframe=eight submultiframes (one subframe=two frames).

In accordance with the Recommendation H.221, frame structures are regulated in the AV services on the 64 kbps to 1,920 kbps channels. The frame structure regulated by the Recommendation H.221 for the 64 kbps one channel is a structure constituted by 80 octet per frame. As shown in FIG. 1, numerals 1 to 8 on the axis of abscissa represent bit numbers, and numerals 1 to 80 on the axis of ordinate represent octet numbers. As shown in FIG. 1 and FIG. 2A, the FAS represents the frame synchronization signals. By these signals, the frame synchronization and multiframe synchronization are controlled. Also, the monitoring function of communications quality, the notification of warning information, and the like are controlled by the signals.

On the other hand, the BAS shown in FIG. 2B represents the bit rate assignment signals. By these signals, the terminal capability, the bit rate assignment designation per media in the actual frame, and various other controls and notifications are performed. As shown in FIGS. 2A and 2B, the BAS is transferred to the even-numbered frames, while the corresponding error correction bits are transferred to the odd-numbered frames.

The Recommendation H.242 regulates procedures such as the capability information exchanging sequence and the mode switching sequence using the inchannel BAS between AV terminals.

The Recommendation H.320 regulates the systems aspect all over the AV services.

The Recommendation H.230 regulates the transfer frame synchronization or various controls and notifications which require emergency responses as additional information regarding the functions required for the performance of AV services.

The Recommendation H.261 regulates the encoding and decoding methods for animated information at a speed of p×64 kbps (p=1 to 30).

Now, with reference to the accompanying drawings, the description will be made of the circuit which performs the videocodec function in accordance with the Recommendation H.261 conceding the encoding and decoding of animated image information. FIG. 3 is a block diagram which shows the circuit structure for performing the videocodec function according to the Recommendation H.261 conceding the encoding and decoding of animated image information.

The inputted video signals are provided with a common intermediate image format called CIF/QCIF which is regulated as a compromise plan between the NTSC and PAL methods which are the television methods of Japan, U.S.A., and European nations.

The inputted video signals are supplied to a information source encoder 201. The information source encoder 201 selects the INTRA mode, INTER mode, or MC mode per unit of macro block, executes DCT (Diffuse Cosine Transformation) of inputted image/estimated errors per block of each pixel (8×8), and quantizes coefficients. Here, in the estimated processing, a two-dimensional spatial filter may be used per block of pixels (8×8).

The output from the information source encoder 201 is supplied to a video signal multiplexing encoder 202. The video signal multiplexing encoder 202 performs variable encoding in accordance with the four-layered structure of a frame, a group of blocks (GOB), a macro block (MB), and a block. The output from the video signal multiplexing encoder 202 is supplied to a transmission buffer 203. The transmission buffer 203 controls encoding on the basis of the transmission rate.

The output from the transmission buffer 203 is supplied to a transmission encoder 204. The transmission encoder 204 performs transmission encoding by use of the frames for BCH (511 and 492) error correction encoding.

On the other hand, a transmission decoder 209 on the decoding side performs the operations contrary to the encoding described above by means of a reception buffer, video signal multiplexing decoder 207, and information decoder 206, thus decoding the received image signals to the CIF/QCIF video signals.

Now, with reference to the accompanying drawings, the description will be made of the fundamental sequence to execute multimedia communications on images, voices, data (all the user information other than the images and voices) and the like in accordance with the recommendations described above. FIG. 4 is a flowchart which shows the fundamental sequence regarding the execution of the multimedia communications on images, voices, data (all the user information other than the images and voices) and the like in accordance with the ITU-TS Recommendations.

At first, when a communications apparatus for multimedia information (hereinafter referred to as an apparatus on the transmission side) is actuated, the outchannel call control is actuated following this actuation so that a reception is notified to an apparatus on the reception side. If this operation is for the ISDN circuit, a call setup sequence is actuated by a Dch.

In the apparatus on the transmission side, step S1 is executed at first as shown in FIG. 4. In the step S1, whether or not the reception is a television telephone call is determined. In a case of the ISDN circuit, it is determined whether the call is a telephone call, television telephone call, or a call which differs from them completely by use of the BC (transmission capability) information element, HLC (high level layer matching capability) information element, LLC (low level layer matching capability) information element, and other information elements.

When the call is ascertained to be a television telephone call, step S2 is executed. In the step S2, the Dch call is set up to establish a first connection.

Then, step S3 is executed. In the step S3, a frame synchronization is set up by the FAS retrieval and detection, the sending out of A bit=0 and detection in the setup connection (corresponding to the Bch, Hch, or the like in the ISDN). After the synchronized setup, step S4 is executed. In the step S4, the capability of an apparatus on the reception side is determined by the capability information exchanging sequence by the capability BAS transmission and reception detections.

Then, step S5 is executed. In the step S5, a multimedia multiplexing assignment is determined in the first connection, thus executing the BAS command transmission, and the mode switching over sequence by the reception. In this way, the multimedia multiplexing communication is started. Actually, in this case, the sequences are often those executing only the voice reception when the setup of additional connections is executed continuously. For example, the communication is started in accordance with the voice 56 kbps in a mode where the H.261 image is off as shown in FIG. 4.

After the commencement of the communications, step S6 is executed. In the step S6, it is determined whether or not there is a capability of additional connection setup in its own apparatus or in the apparatus on the reception side. If affirmative, step S7 is executed. In the step S7, the additional connection is set up.

Then, step S8 is executed. In the step S8, the frame synchronization setup, multiframe synchronization setup, and a synchronism setup with the first channel are processed by utilizing the FAS retrieval of the additional connection and its detection as well as A bit.

After the completion of the synchronizing setup process, it is again determined in the step S6 whether or not there is any need for a further addition of the additional connection.

Where there is no longer any need for additional connections, step S9 is executed. In the step S9, the operational mode suitable for the utilization of all channels is determined to execute the transmission of the BAS command, and the mode switching over sequence by means of the mode switch over by the reception. For example, in FIG. 4, the H.261 image ON and voice encoding are modified to its optimal encoding between both terminals in order to execute the multimedia multiplexing communications. In this respect, it may be possible to execute the mode switching sequence by the BAS command in the Step S9 each time immediately after the synchronized setup (step S8) per additional connection.

In a television telephone apparatus and a video conference system, if an arrangement of a response message should be considered with respect to a message kept in an answer recording mode or the recording of a message from a communicating party should be made, it is possible to transmit such a response message to a voice information containing an image information or to record such information, unlike a response message to a voice information through an ordinary telephone or the recording of a message to be kept in an answer recording mode containing only voice information. In this case, however, it is impossible to determine the type of the multiplexed voice and image information on its way before actually executing the sequence of the capability information exchange with the apparatus on the transmission side. Also, since the image encoding by the application of "H.261" uses the estimated encoding between frames, it is not necessarily possible to keep the simply encoded voice and image information in record as a response message at all times and utilize the message by transmitting it as it is. In this respect, it is conceivably possible to provide a method in which a plurality of response messages are prepared for use by switching them over in accordance with the requirements of the communicating party, but any dynamic selection cannot be made promptly. In addition, there is a problem that the apparatus itself becomes great and inevitably expensive.

Also, even if voice information and animated image encoded information are accumulated as response messages at the same time, it is extremely difficult to transmit the fixedly synchronized voice and image information because the assignable route of image transmission is variable depending on the connected party at the time of actual circuit connection. As a result, even if the voice and image information can be transmitted, there is encountered a drawback that it is not necessarily possible to execute the decoded image representation on an apparatus on the reception side as intended by the party on the transmission side.

Particularly, whereas the voice information can be transmitted immediately, it is necessary to wait until the additional channel becomes obtainable even when a first channel has been obtained because the amount of an image information is great in transmitting a multiplexed image information. As a result, there is also encountered a drawback that the timing is delayed for starting the transmission of a response message.

On the other hand, unlike an ordinary telephone system where only a transmitted voice information is recorded, the transmitted voice and image information are multiplexed in the television telephone or video conference system when recording the message from a party on the transmission side. Therefore, the message cannot be reproduced in a good condition if the message is recorded simply as it is. There is a need for any reception of a multiplexed information to be divided into the voice and image information before being recorded.

However, even when voice information is received in a telephone mode or when voice information is received in a television telephone mode with an extremely small amount of image information contained, it is still necessary to record the information on a medium for recording image information as the medium used for recording in such a case. As a result, when the medium is for recording image information, most of it is used for recording voice information, thus resulting in the wasteful consumption of the recording medium.

Further, when the received data are encoded in frames and between frames, there is encountered a drawback that a good reproduction cannot be made because, depending on the timing of decoded recording, a recording is performed beginning with the encoded data between the frames which is a differential data with the one on the last frame.

SUMMARY OF THE INVENTION

It is an object of the present invention to provide a communications apparatus for multimedia information for which the problems described above are solved.

It is another object of the invention to provide a communications apparatus for multimedia information capable of varying response messages with respect to a communication apparatus on the reception side in accordance with the communications capability of the communications apparatus on the reception side.

It is still another object of the invention to provide a communication apparatus for multimedia information capable of executing the transmission of response messages to a communication apparatus on the reception side by different timing depending on the kinds of data.

In order to achieve the objects described above, a communications apparatus for multimedia information according to the present invention comprises means for receiving multiplexed multimedia information through a circuit; memory means for storing information containing voice information and image information as a response message to a party on the transmission side in accordance with the reception by the aforesaid receiving means; and means for transmitting the image information for use of the aforesaid response after having transmitted the voice information for use of the aforesaid response in accordance with the reception.

It is a further object of the invention to provide a communications apparatus for multimedia information which makes it possible for a communications apparatus on the communicating party's side to identify the condition in which the messages transmitted by that apparatus are accumulated in the apparatus on this side.

It is still a further object of the invention to provide a communications apparatus for multimedia information capable of changing media for accumulating the received messages in accordance with the kinds of received messages.

It is another object of the invention to provide a communications apparatus for multimedia information capable of changing its communication capabilities at the time of indicating an answer recording communication and of executing an ordinary communication.

It is still another object of the invention to provide a communications apparatus for multimedia information which accumulates the received messages in such a way to be able to reproduce them in a good condition when these messages are reproduced.

It is a further object of the invention to provide a communications apparatus for multimedia information having new functions.

The other objects and features of the present invention will become clearer by reference to the accompanying drawings and detailed description which will be given below.

BRIEF DESCRIPTION OF THE DRAWINGS

FIGS. 2A and 2B are views which show the bit assignments between FAS one multiframe=8 submulti frames (one subframe=two frames).

FIGS. 16A and 16B are views which show an example of the assignments of "H.221" frame structure for the communications apparatus for multimedia information according to the fourth embodiment.

FIGS. 17A and 17B are views which show an example of the assignments of "H.221" frame structure for the communications apparatus for multimedia information according to the fourth embodiment.

FIG. 18 is a view which shows an example of the assignments of "H.221" frame structure for the communications apparatus for multimedia information according to the fourth embodiment.

FIG. 19 is a view which shows an example of the assignments of "H.221" frame structure for the communications apparatus for multimedia information according to the fourth embodiment.

FIGS. 20A and 20B are views which show an example of the assignments of "H.221" frame structure for the communications apparatus for multimedia information according to the fourth embodiment.

FIGS. 21A and 21B are views which show an example of the assignments of "H.221" frame structure for the communications apparatus for multimedia information according to the fourth embodiment.

DETAILED DESCRIPTION OF THE PREFERRED EMBODIMENTS

Hereinafter, in conjunction with FIG. 5 to FIGS. 7A and 7B, the description will be made of the embodiments according to the present invention.

[First Embodiment]

Figure 1:
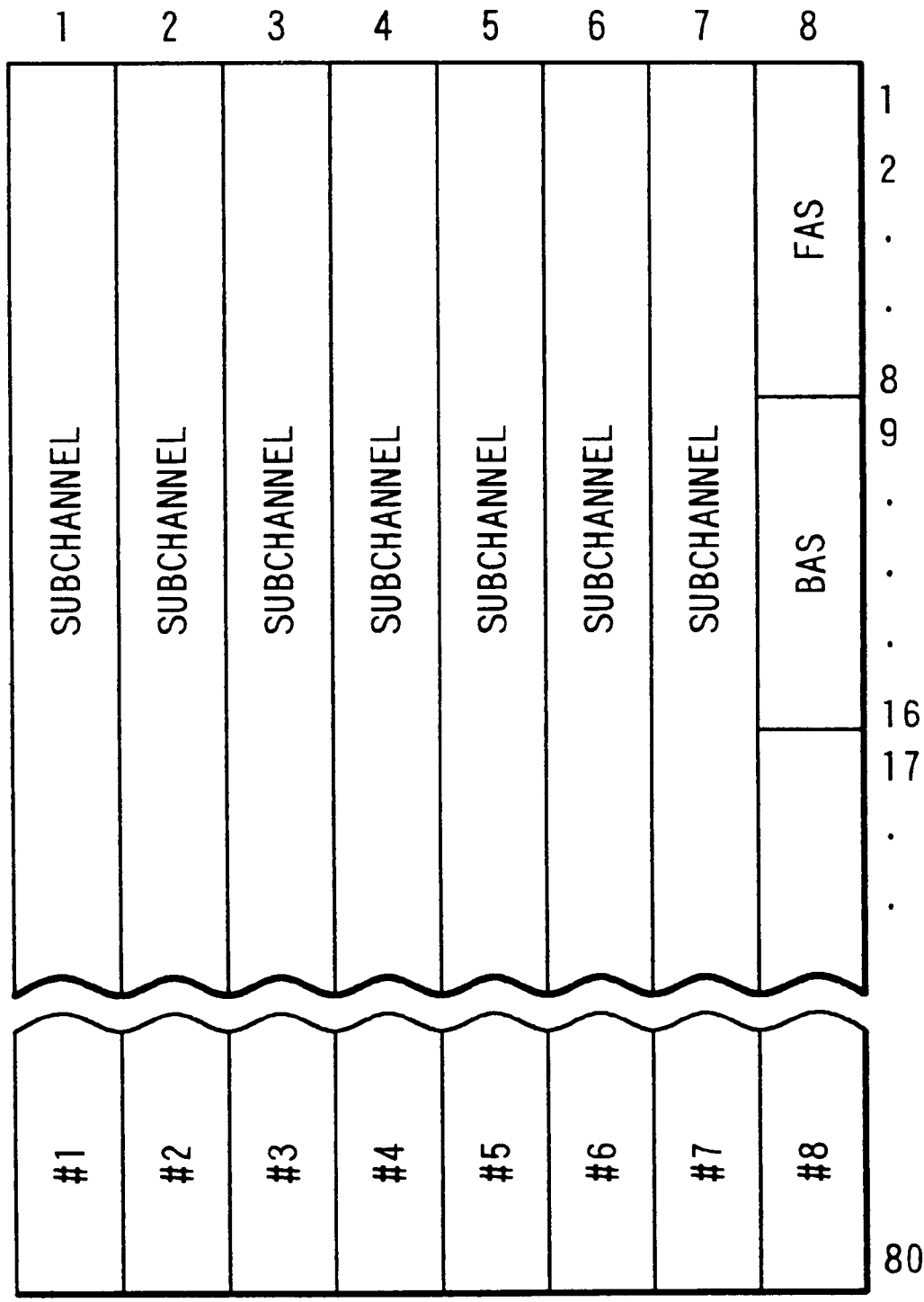
FIG. 1 is a view which shows the structure of a frame regulated by CCITT Recommendation H.221 for 64 kbps one channel.
Figure 5:
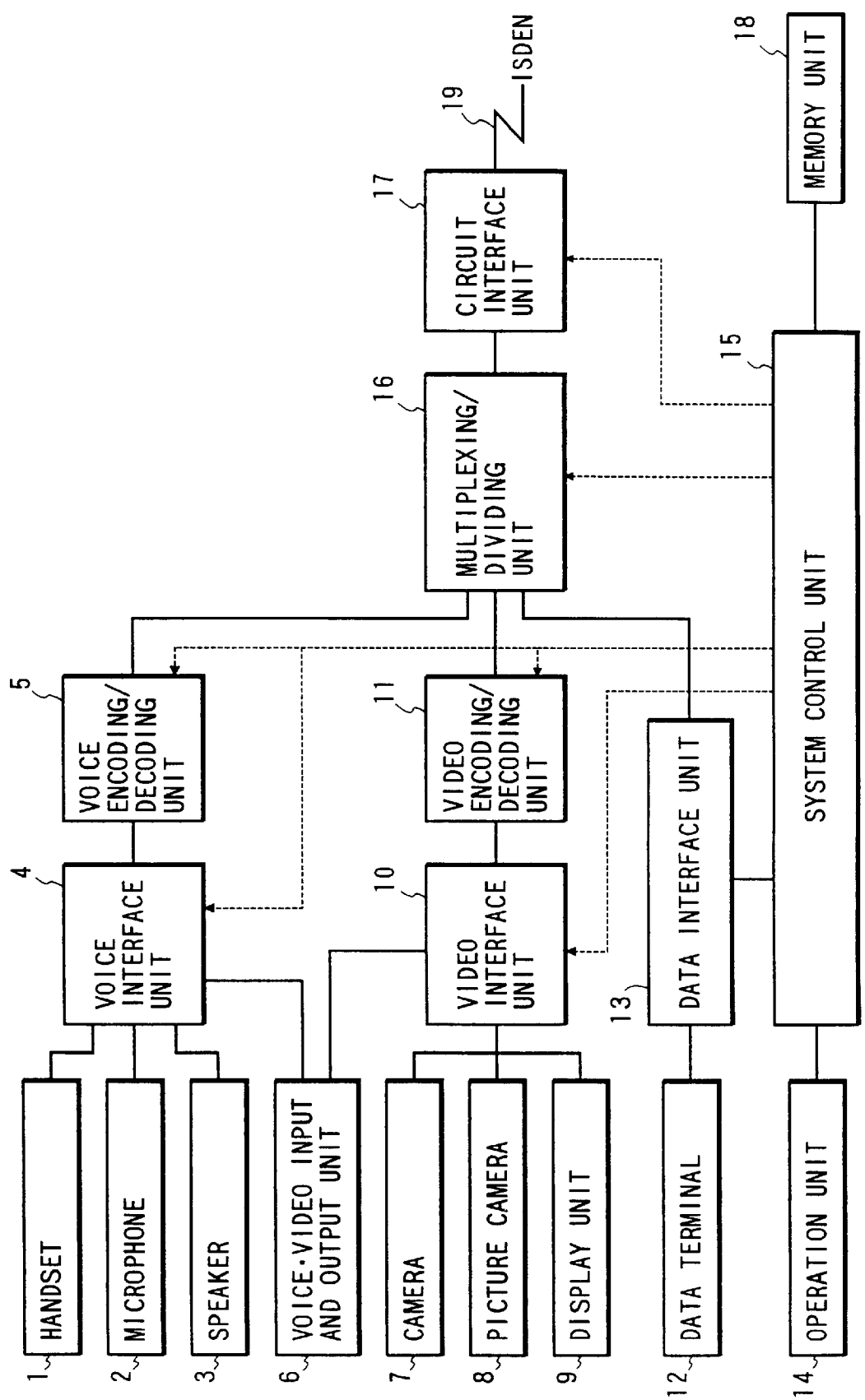
FIG. 5 is a block diagram which shows the structures of communications apparatuses for multimedia information according to first to ninth embodiments of the present invention.

FIG. 5 is a block diagram which shows the structure of a communication apparatus for multimedia information according to a first embodiment of the present invention. In FIG. 1, a reference numeral 1 designates a hand set serving as one of voice input/output means; 2, a microphone; 3, a speaker serving as one of voice output means; and 4, a voice interface (I/F) unit which is provided with the function of switching over the hand set 1, the microphone 2, and the speaker 3 which serve as voice input/output means in accordance with instructions from a system controller 15 to be described later, the function of hook on/off detection to sense the on-hook state or off-hook state of the hand set 1, the echo cancellation function to eliminate the echo when the microphone 2 and speaker 3 are used as voice input/output means, and the function for generating tones such as dial tones, call tones, busy tones, and reception tones. A reference numeral 5 designates a voice encoding/decoding unit which is provided with the function to encode a transmitted voice signal (information) by converting it by the application of an A/D conversion, and the function to decode a received voice signal (information) by converting it by the application of a D/A conversion in accordance with the voice signal (information) encoding/decoding algorithms of 64 kbps PCM (A-law), 64 kbps PCM (p-law), 64 kbps/56 kbps/48 kbps SB-ADPCM, 32 kbps ADPCM, LD-CELP, 16 kbps, 8 kbps, and the like when instructed by the system controller 15 which will be described later.

A reference numeral 6 designates the voice and image input/output unit of a VCR (video cassette recorder); 7, a camera serving as one of image input means for a self-portrait and others; 8, a camera for pictures and characters serving as one of image input means for inputting pictures, drawings, and others; 9, a display unit for displaying the inputted image from the camera 7 or the camera 8 for pictures and characters, the received image from a communicating party, the operational screen, and the like; 10, a video interface unit (I/F) which is provided with a function to switch over the camera 7 and the camera 8 for pictures and characters serving as an input means, and a function to switch over the input image, received image, and operational screen, and a processing function to synthesize image signals for dividedly displaying these images and screen on the display unit 9.

A reference numeral 11 designates the video (image) encoding/decoding unit (image codec unit) to encode the transmitted image signals (information) by the application of an A/D conversion, and to decode the received image signals (information) by the application of a D/A conversion in accordance with ITV-TS Recommendation "H.261".

A reference numeral 12 designates a data terminal for transmitting/receiving data; 13, a data interface unit which notifies the multiplexing/dividing unit 16 of the transmitted data from the data terminal 12 and the system controller 15, and notifies the data terminal 12 and the system controller 15 of the received data at the same time.

A reference numeral 14 designates an operating unit such as a key board used for inputting information to control the entire body of the apparatus; 15, the controller provided with CPU, ROM, RAM, auxiliary memory devices, and others to monitor the status of each part in order to control the entire body of the apparatus, to calculate the speed of assignment transmission to each of the media in accordance with the inputted control information, the current status of circuit utilization, and the like, to prepare the operational and display screens corresponding to the final judgment of modes, control, and status, and the like, and to execute, among others, the application program of man-machine interface or the like.

A reference numeral 16 designates the multiplexing/dividing unit which executes multiplexing per transmission frame the voice signals from the voice encoding/decoding unit 5, the image signals from the video encoding/decoding unit 11, the data from the data interface unit 13, and the data from the system controller 15 in accordance with ITU-TS Recommendation "H.221", as well as the control information of ITU-TS Recommendations "H.221", "H.242", and others, and at the same time, this unit divides the reception frame to each of media per structural unit, and notifies it accordingly to the voice encoding/decoding unit 5, video encoding/decoding unit 11, data interface unit 13, system controller 15, and others; 17, a circuit interface unit to control a circuit 19 in accordance with the ISDN user net interface; and 18, a memory unit to store various kinds of control information.

Figure 6:
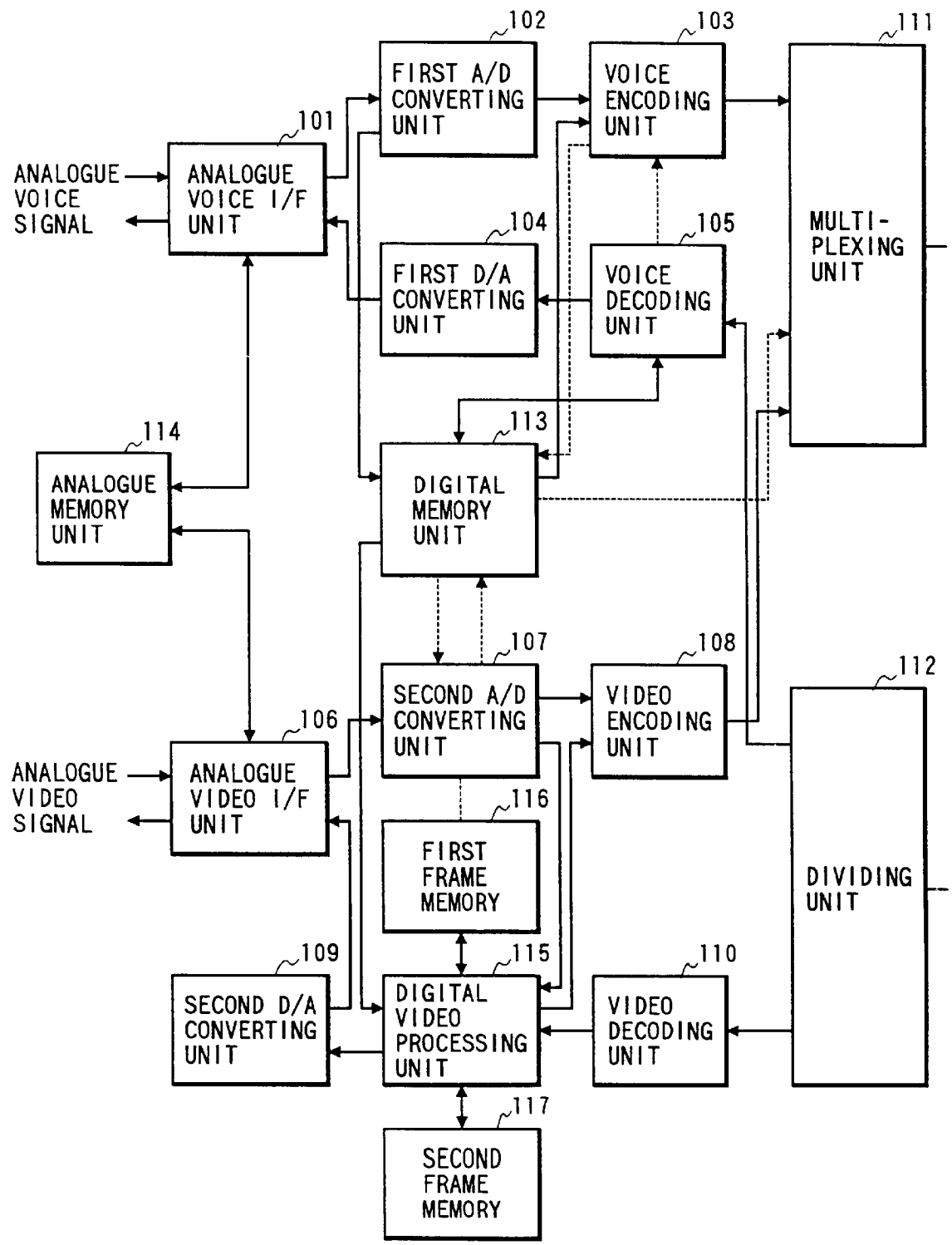
FIG. 6 is a block diagram which shows the flow from the analogue input/output units of voice and image information to multiplexing/dividing units of the communications apparatus for multimedia information according to the first embodiment of the present invention.

FIG. 6 is a block diagram which shows the flow from the analog input/output unit for voice and image information to the multiplexing/dividing unit of a communications apparatus for multimedia information according to the first embodiment. In FIG. 6, a reference numeral 101 designates the analog voice interface (I/F) unit which controls analog voice signals inputted to this apparatus, and analog voice signals output from the apparatus; 102, a first A/D converter to convert the inputted analog voice signals; 103, a voice encoding unit to encode the digitized voice signals from the first A/D converter 102; 104, a first D/A converter to convert the digital voice signals decoded by a voice decoding unit 105, which will be described later, to the analog voice signals; 105, a voice decoding unit to decode the encoded voice signals received; 106, an analog image interface (I/F) unit to control the analog image signals inputted to this apparatus and analogue image signals output from the apparatus; 107, a second A/D converter to convert the inputted analogue image signals to the digital image signals; 108, a video encoding unit to encode the digitized image signals by the second A/D converter 107; 109, a second D/A converter to convert the digital image signals decoded by a video decoding unit 110, which will be described later, to the analogue image signals; and 110, a video decoding unit to decode the encoded image signals received.

A reference numeral 111 designates a multiplexing unit to multiplex the encoded voice signals from the voice encoding unit 103, and the encoded image signals from the video encoding unit 108 in accordance with instructions from the system controller 15 shown in FIG. 5, and then, transmit them to the circuit interface unit 17 shown in FIG. 5; 112, a dividing unit to divide the received signals from the circuit interface unit 17 shown in FIG. 5, and transfer the voice signals to the voice decoding unit 105, and the image signals to the video decoding unit 110; 113, a digital memory unit formed by a magneto-optic disc, HD (hard disc), or the like to be able to store image and voice signals digitally; 114, an analogue memory unit to be able to input voice and image signals in synchronism by means of the analogue I/F such as a VCR, to store the voice and image signals output to the analogue I/F in synchronism; 115, a digital video processor to synthesize and edit various digital image signals; 116, a first frame memory controlled by the digital video processor 115 for controlling output from the second A/D converter 107, and output to the video encoding unit 108; and 117, a second frame memory controlled by the video decoding unit 110.

In this respect, the present embodiment is assumed to transfer image signals as still pictures because the amount becomes enormous if an animated image information should be accumulated as a response message. Meanwhile, the apparatus on the reception side is assumed to deal with the two kinds of encoding, that is, "H.261", and "JPEG" as its acceptable encoding modes.

Figures 7, 7A:
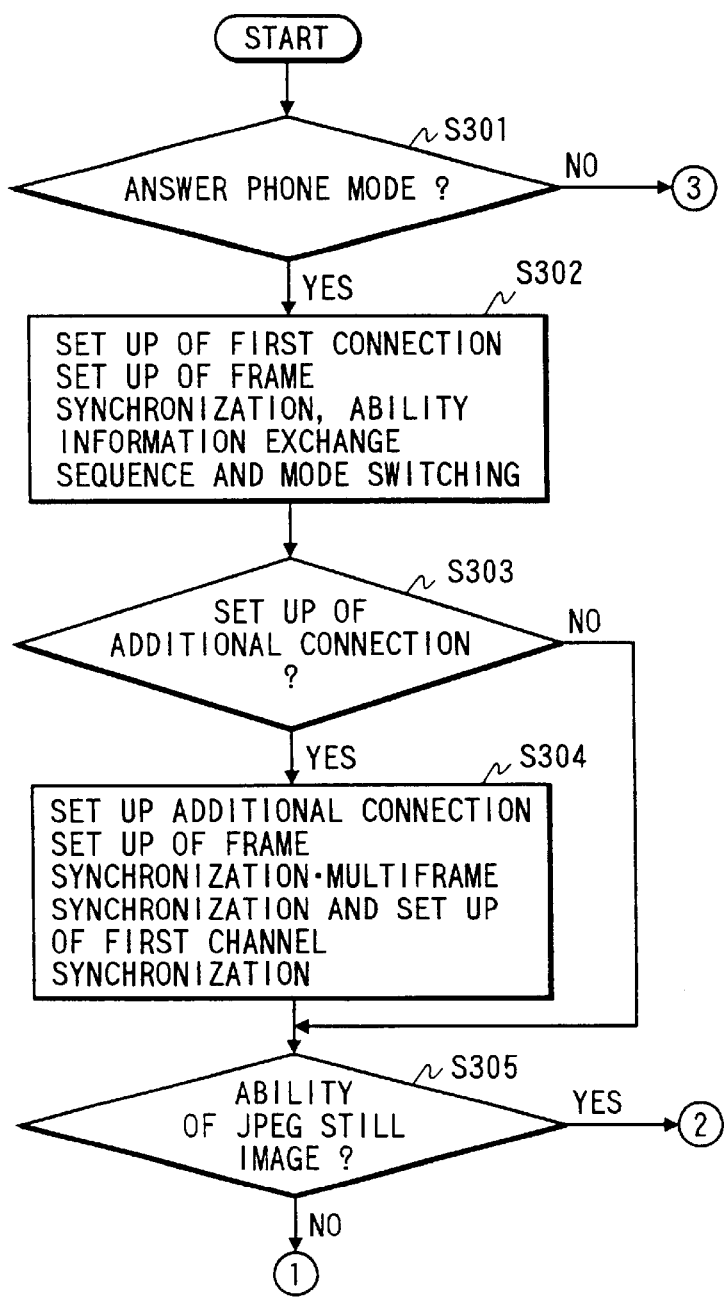
FIG. 7 is comprised of FIGS. 7A and 7B showing flowcharts which shows the preration of the communications apparatus for multimedia information according to the first embodiment.
Figure 7B:
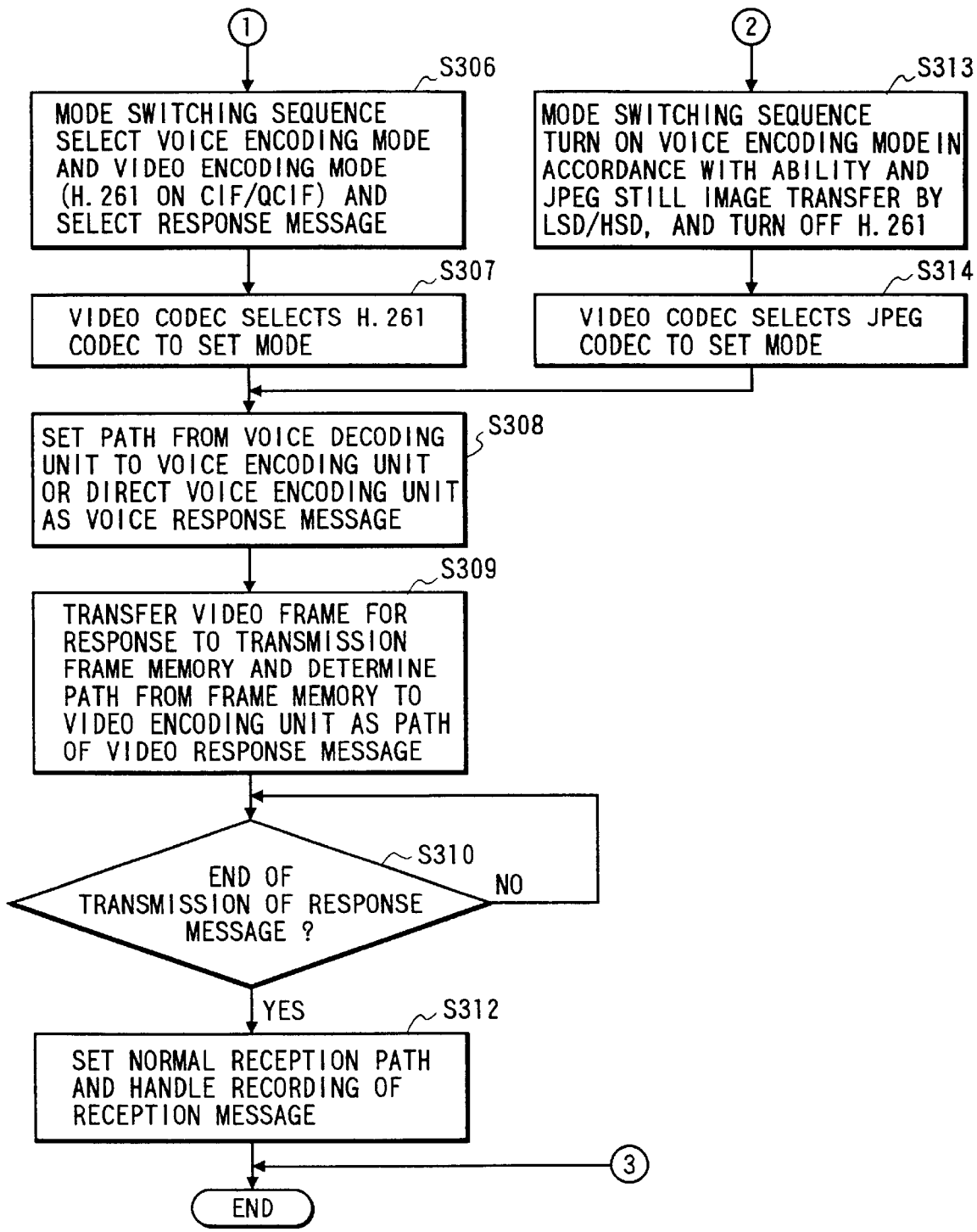

Hereinafter, with reference to flowcharts shown in FIGS. 7A and 7B, the detailed description will be made of the operation of the communications apparatus for multimedia information which is structured as described above. In this respect, the control of the operation given below is executed by the controller 15 by controlling each part shown in FIG. 5 and FIG. 6. Also, the encoding and decoding units are assumed to be provided with the video codec function of "H.261" shown in FIG. 3.

At first, in step S301, it is determined whether or not the current mode is answer recording when a television telephone call is received. The processing operation is terminated without doing anything further unless the mode is found to be an answer recording. If it is found to be an answer recording mode, the process will proceed to step S302 to accept the reception automatically, and execute the establishment of a first connection, the synchronizing establishment of inchannel frame, the capability information exchanging sequence by BAS, and the mode switching by BAS. Then, proceeding to step S304, the process will execute the establishment of an additional connection, frame synchronization, multiframe synchronization, and synchronization with the first connection, and then, proceeds to step S305. Also, in the step S303, if there is no need for the establishment of any additional connection, the process will skip over the aforesaid step S304, and proceed to step S305.

In the step S305, it is executed in the sequence of the capability information exchanging in the step S302 to identify if there is any capability to transfer a JPEG still picture at the same time. If negative, the process will proceed to step S306 to execute a mode selection depending on the current capability, such as voice encoding mode in the voice encoding unit 103, and "H.261" image encoding mode (CIF/QCIF, or the like) in the video encoding unit 108, and then, select the response message suitable for the communicating party while recognizing the telephone number and other information regarding such party which are stored in the digital memory unit 113. Then in step S307, the "H.261" codec is selected for the image codec to establish the codec mode. Subsequently, in step S308, the response message is transmitted through the path setup shown in FIG. 6 for the voice decoding unit 105 the voice encoding unit 103 in accordance with the decoding mode in which the voice response message is selected if the message is stored in a state of being encoded or to set up the path to the voice encoding unit 105 directly if the message is stored in a state before it is encoded.

Then, in step S309, the digital memory unit 113 outputs the selected response image frame (one frame) to the digital video processor 115. The digital video processor 115 stores the response image frame in the first frame memory 116.

The system controller 15 fixes the path to the digital video processor 15 so that the image frame stored in the first frame memory 116 is output continuously to the video encoding unit 108.

Then, proceeding to step S310, the process monitors the completion of the transmission of the response message.

When the completion of the transmission is sensed, the process will proceed to step S312 to set up a usual path, and terminate the present processing operation after having completed the recording process of the received message.

On the other hand, if it is found in the step S305 that there is a capability to transfer the JPEG still picture, the process will proceed to step S313 to select the voice encoding mode corresponding to the capability and the JPEG still picture mode by LSD/HSD, and notifies the transmission mode by transmitting the BAS command. At this juncture, the "H.261" is turned off. At the same time, the response message which is suitable for the communicating party is selected. Then, in step S314, the JPED codec is selected as an image codec and after each mode is set up, the process will return to the step S308 described above to set up the same path at the time of transmitting the "H.261".

Here, in the present embodiment, the description has been made of a case where the same frame is used both at the time of transferring the JPEG still picture and of transmitting the "H.261" when the same frame is continuously transmitted, but the present invention is not necessarily limited thereto. There is no problem if these are prepared separately. Also, since the still picture is received on the reception side, the synchronization of image and voice information is not so important. Hence there is no problem at all even if voice and image information are totally independent of each other as a response message. Further, there is no need at all to limit the transmission to only one frame. It may be possible to change the frames to be transmitted per ten and several seconds or several tens of seconds. In this case, the frames should only be changed when output from the digital memory unit 113 to the first memory frame.

As described above, in accordance with the communications apparatus for multimedia information of the first embodiment, it is possible to prepare a response message in a significantly smaller amount of accumulation just by accumulating one image frame portion of the response message at the time of answer recording mode because it is good enough if only the same frame is continuously transmitted to the "H.261" encoding unit even when the transfer rate assignable to the transmission of an image is varied by the multiplexing condition of multimedia at the time of its actual connection, and also, it is possible to perform a dynamic access and reproduction simply even when a plurality of image information are prepared for one frame portion per unit of plural response messages. Further, for the display unit for received images of the communications apparatus for multimedia information on the reception side at that time, it is fundamentally possible to display the received image with a remarkable clarity within a range of the resolution of CIF/QCIF if only an ordinary reception is performed simply by the "H.261" codec as in the case of an ordinary communication because the same frame is being encoded on the transmission side. Therefore, it is also possible to effectuate the continuous transmission of a frame having an indication of the current status of being in answer recording mode or the like by use of superimposed characters.

Also, for example, if there is a communication capability by use of JPEG still pictures, it becomes possible to receive a clearer image within a range of JPEG resolution by means of the same frame as the one used for the response message for the communications apparatus for multimedia information described above.

As set forth above, in accordance with the communications apparatus for multimedia information of the first embodiment, it is possible to transmit the image information for a response message in the best communication mode of the apparatus on the transmission side because the image information for the response message stored in the memory means can be transmitted in a given method in accordance with the communication capability of the apparatus on the transmission side.

[Second Embodiment]

Now, a second embodiment is a provision of a communications apparatus for multimedia information which makes it unnecessary to store the plural response messages that may be required depending on the communicating parties, but which makes it still possible to deal with the changes of the transmission modes by encoding the voice information in an optimal encoding mode as a response message for answer recording in consideration of both compression efficiency and reproducing quality, while encoding the image information in the maximum rate assignable to the image transmission as a capability of the apparatus own, thus re-encoding them in accordance with the results of the capability information exchanging sequence with the terminal on the side of the communicating party.

Hereinafter, the second embodiment will be described in detail.

Figure 8B:
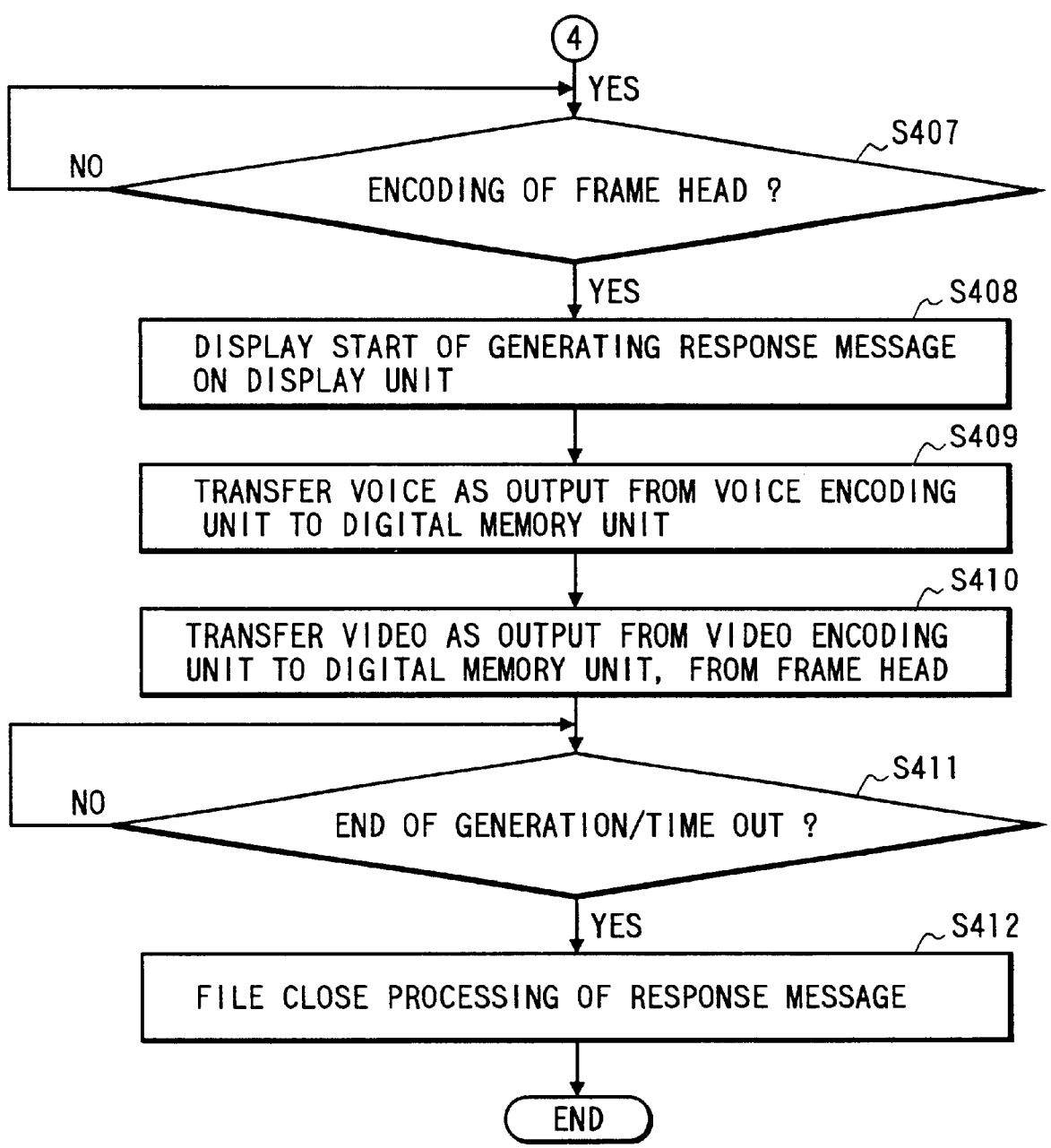
FIG. 8 is comprised of FIGS. 8A and 8B showing views which shows the flow of answer recording response message preparation in the communications apparatus for multimedia information according to the second embodiment.

With reference to flowcharts shown in FIGS. 8A and 8B, the detailed description will be made of the flow of answer recording response message preparation in a communications apparatus for multimedia information according to the second embodiment.

Figure 10:
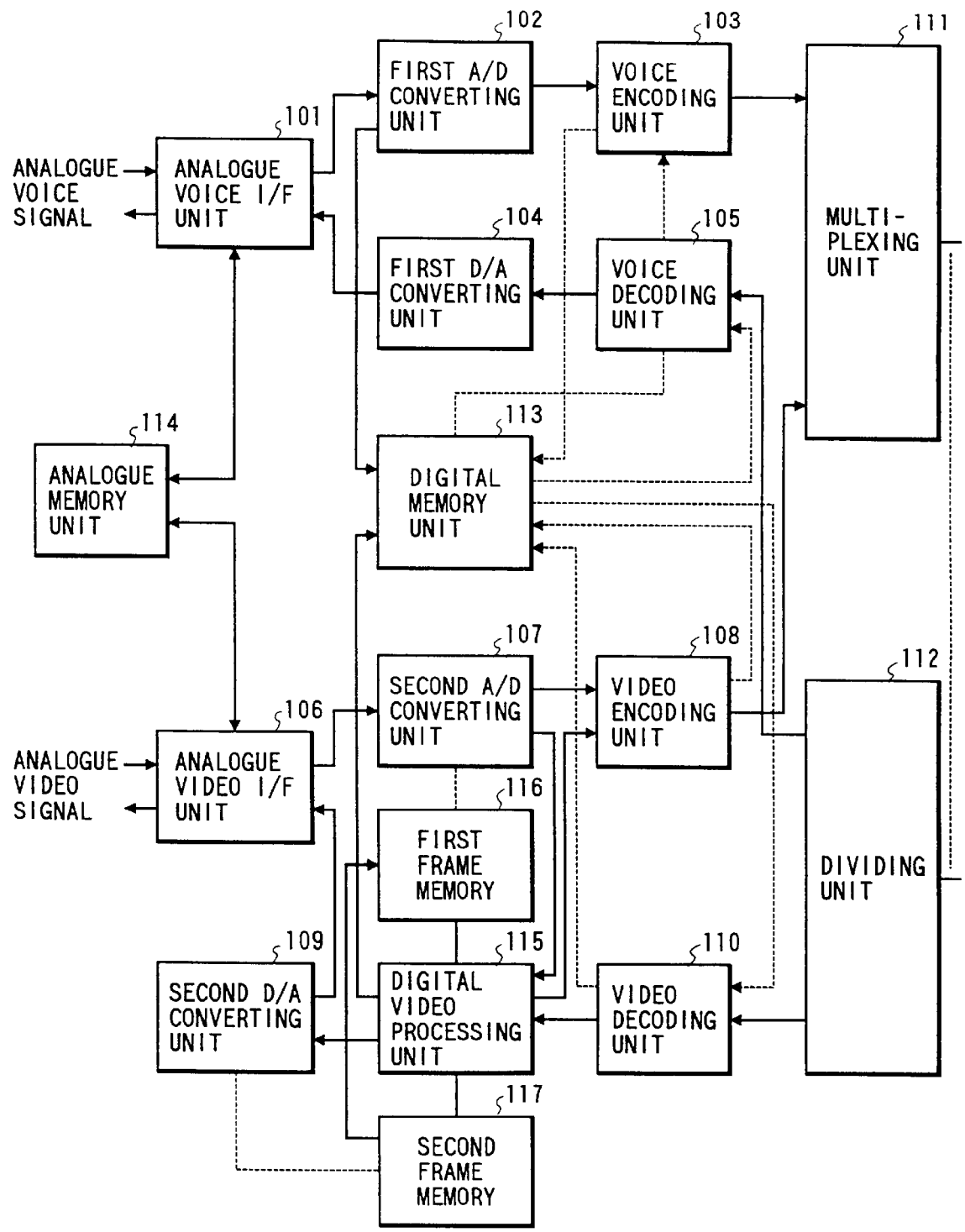
FIG. 10 is a block diagram which shows the flow from the analogue input/output units for voice and image information to the multiplexing/dividing units of the communications apparatus for multimedia information according to the second embodiment.

In the present embodiment, the fundamental structure of the communications apparatus for multimedia information is identical to the one represented in FIG. 5. FIG. 10 is a block diagram which shows the flow from the analogue input/output of voice and image information to the multiplexing/dividing unit of the communications apparatus for multimedia information according to the second embodiment. The elements having the same reference numerals as those appearing in FIG. 6 are assumed to provide the same functions as those described in FIG. 6. In this respect, each of the operations given below is also assumed to be controlled by the system controller 15.

At first, when an instruction is issued from an operational unit 14 shown in FIG. 5 for the preparation of an answer recording response message, an optimal voice encoding mode is decided (selected) in step S401 for use of the response message preparation in consideration of both compression efficiency and reproducing quality. For example, assuming that the apparatus of the present embodiment supports each of its own modes, 8 Kbps–16 Kbps LD-CELP, PCM, A-law, $\mu$-law, the own mode of 8 Kbps should be most effective if only the compression efficiency is taken into account. However, if there is any problem that may produce an extremely adverse effect on the reproducing quality, particularly when the message is recorded in a PCM after decoding, the 16 Kbps should be selected as a suitable mode.

Now, in step S402, an image encoding mode and the maximum assignable transfer rate (the maximum transfer rate) are selected when an image is encoded. For example, assuming that CIF and QCIF are applicable, the CIF is selected. If the maximum transfer rate is 2B while the voice mode is only PCM, the maximum value of 68.8 Kbps is selected when the image is transmitted together with voices or the maximum rate of 128 Kbps/124.8 Kbps is selected when only the image is transmitted. Then in step S403, clock is inputted into each of the encoding units 103 and 108 shown in FIG. 10 to actuate them in accordance with the selection made in the step S402 described above. This actuation is possible by the pseudo-actuation of the multiplexing unit 111 shown in FIG. 10. It is of course possible to use a completely different clock generator for the purpose.

Then in step S404, the maximum time required for the response message is indicated on the display unit 9 shown in FIG. 5 to notify the user thereof. If necessary, it can be modified by an input from the operational unit 14 shown in FIG. 5 accordingly. Then in step S405, files for voice and image information for use of the response message are open in a given area of the digital memory unit 113, and at the same time, each kind of attributes determined in the steps S401 to S404 is recorded (stored). Subsequently, in step S406, the commencement of response message preparation is notified to the user by utilizing the display unit 9 shown in FIG. 5 or the hand set 1, speaker 3, or the like, or in some cases, the commencement thereof should wait unit the user issues an instruction through the operational unit 14 accordingly.

Figure 3:
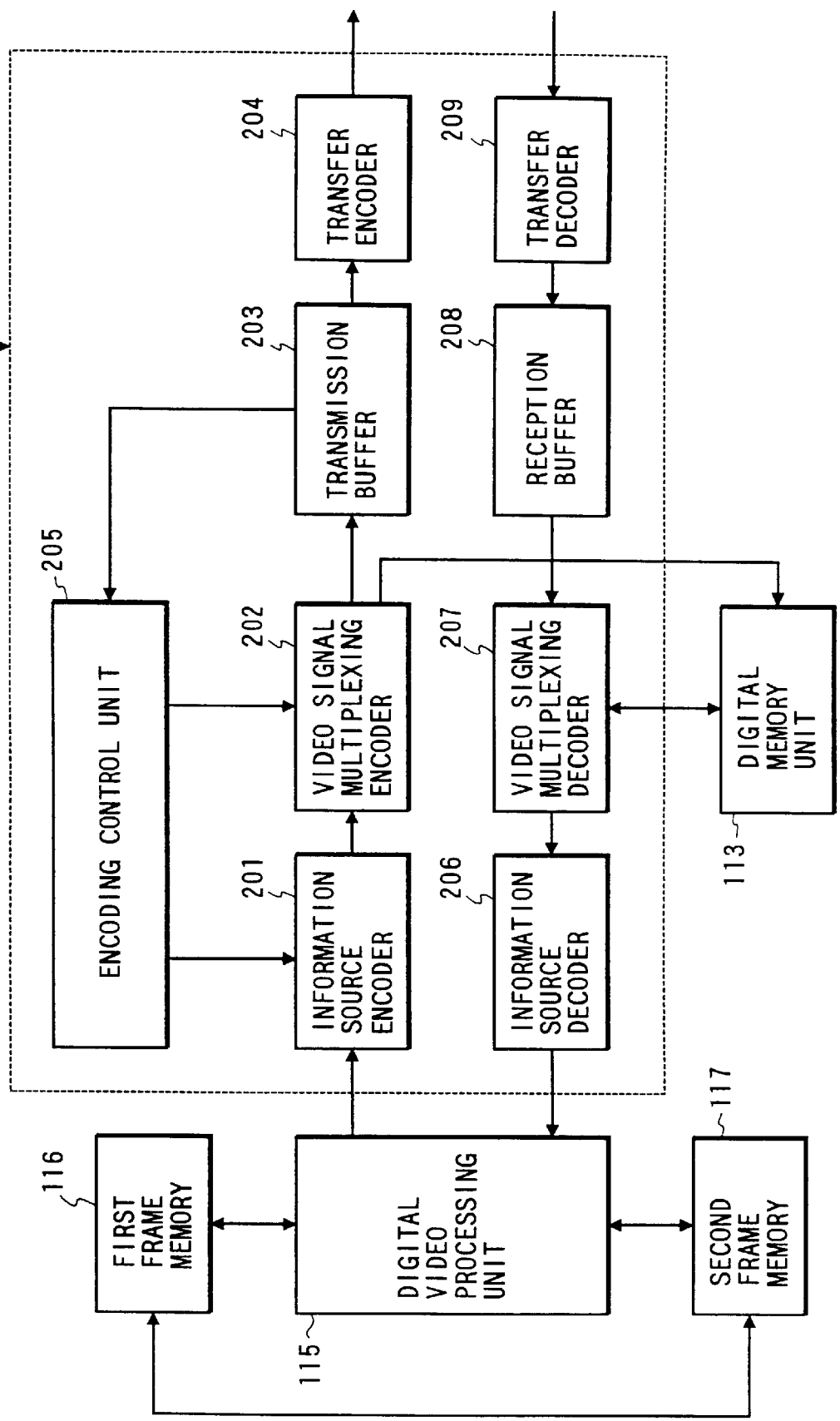
FIG. 3 is a block diagram which shows the circuit structure for executing the videocodec function by Recommendation H.261 concerning the encoding and decoding methods for animated image information.
Figure 4:
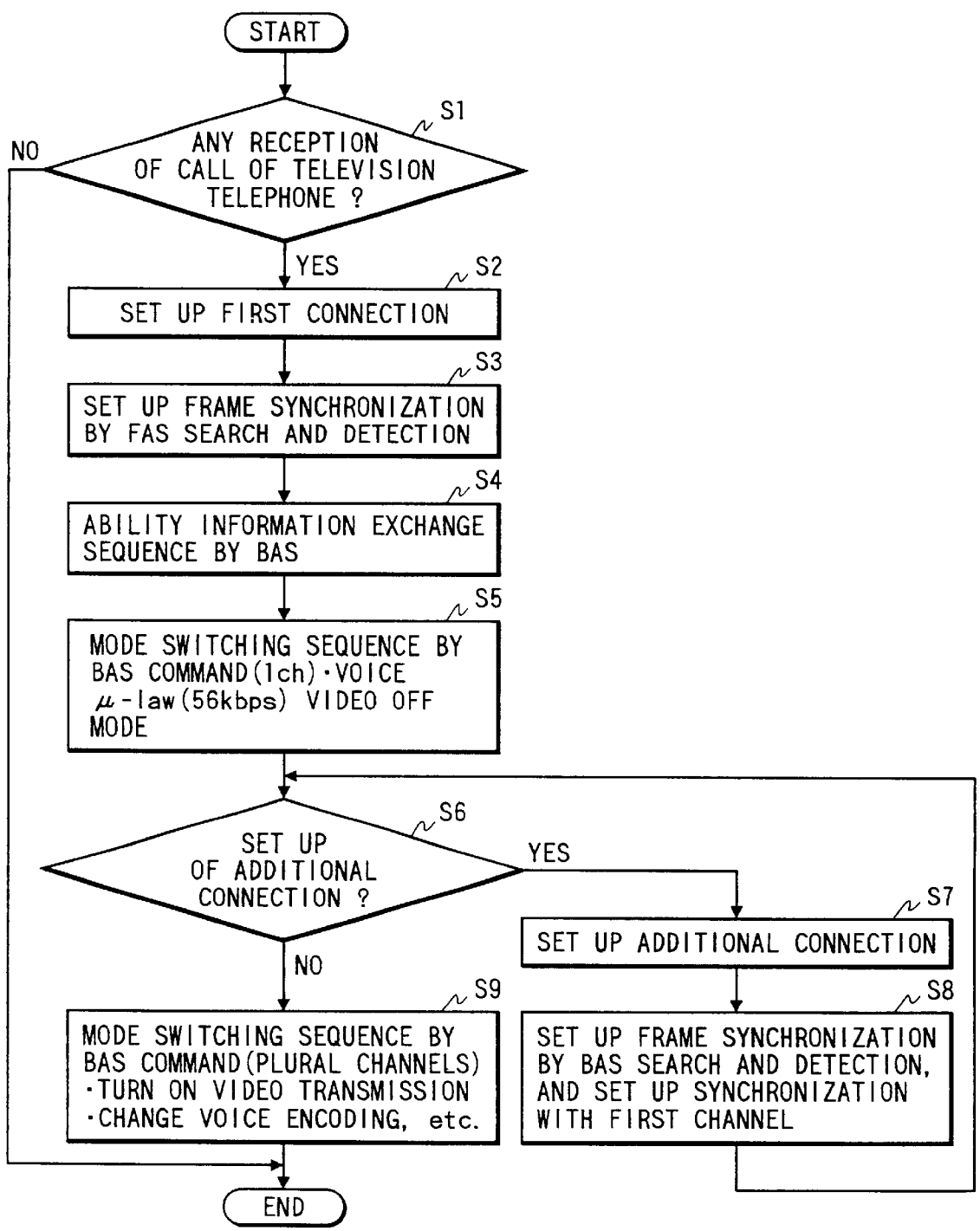
FIG. 4 is a flowchart which shows the fundamental sequence to execute the multimedia communications on images, voices, data (all the user's information other than the image and voice information), and the like in accordance with ITU-TS Recommendations.

When the preparation of the response message is started, the process will proceed to step S407 to monitor the output of a video signal multiplexing encoder 202 shown in FIG. 3 in the video encoding unit 108 shown in FIG. 10, and wait for the encoding of the frame head, that is, wait for the detection of the "starting code of the frame", more specifically. When the "starting code of the frame" is sensed, the process will proceed to step S408 to notify the user of the commencement of accumulation by utilizing a hand set 1, speaker 3, or the like.

Then in step S409, the transfer and accumulation processing is started. With respect to the voice information, the output from the voice encoding unit 103 is transferred to and accumulated in the digital memory unit 113 in FIG. 10 in the step S409. With respect to the image information, the output of the video signal multiplexing encoder 202 shown in FIG. 3 in the video encoding unit 108 shown in FIG. 10 is transferred from the head of the frame sensed in the step S407 to and accumulated in the digital memory unit 113 shown in FIG. 10 in step S410. Then proceeding to step S411, the process will monitor whether or not there is any command indicating the time out of the maximum time set for the preparation of the response message, which is actuated in the step S403, or the completion of the response message preparation. If either the time out or the completion is sensed, the process will proceed to step S412 to close the file for the response messages, and terminate the current processing operation.

Now, with reference to a flowchart shown in FIG. 9, the response operation of a communications apparatus for multimedia information will be described in detail. In this respect, the operational control of the flow shown in FIG. 9 is assumed to be performed by the system controller 15.

Figure 9:
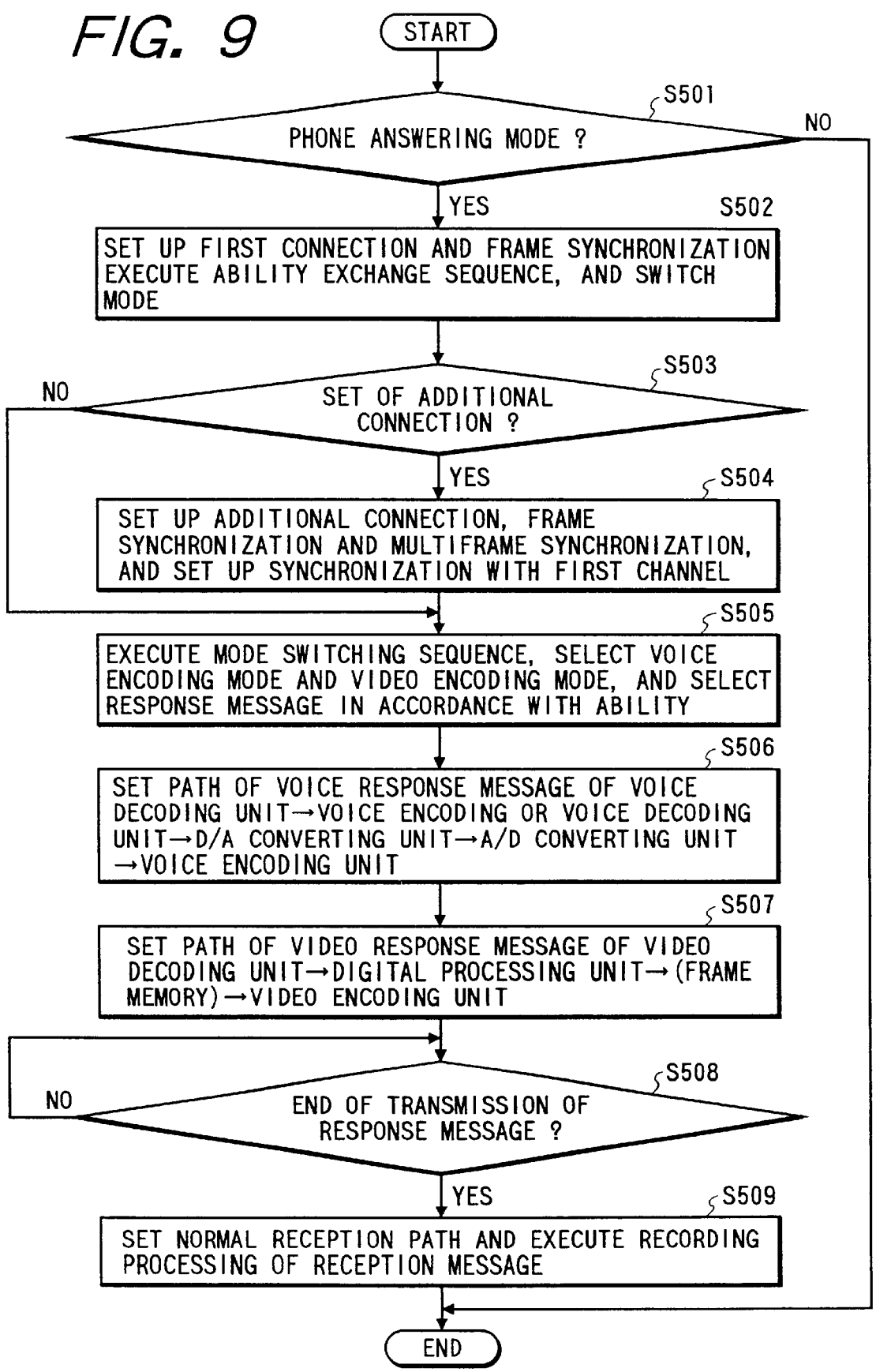
FIG. 9 is a flowchart which shows the response operation of the communications apparatus for multimedia information according to the second embodiment.

At first, in step S501 shown in FIG. 9, it is determined whether or not the current mode is answer recording when a television telephone call is received. The processing operation is terminated without doing anything further unless the mode is found to be an answer recording. If it is found to be an answer recording mode, the process will proceed to step S502 to set up the reception automatically, that is, to establish a first connection, and then, to execute on inchannel the setup of the frame synchronization, the capability information exchanging sequence by BAS code, and the mode switching over sequence in accordance with ITU-TS Recommendations "H.221" and "H.242". Then, proceeding to step S503, the process will determine whether or not the establishment of any additional connections is requested. If affirmative, the process will proceed to step S504 to establish additional connections, execute the synchronized establishment of frames on the additional connections, the synchronized establishment of multiframes, and the synchronized establishment of the first connection, and then, proceed to step S505. Also, in the step S503, if there is no need for the establishment of any additional connections, the process will skip over the aforesaid step S504, and proceed to step S505.

In the step S505, the voice encoding mode and image encoding mode for transmission are determined, the mode switching over sequence is executed, and the response message is selected in accordance with the result of the capability information exchanging sequence. Then in step S506, if the accumulated voice encoding mode of the selected response message and the transmission voice encoding mode differ from each other as the result of the capability exchanging sequence, either one of the paths shown in FIG. 10 of digital memory unit 113→voice decoding unit 105→voice encoding unit 103→multiplexing unit 111, and digital memory unit 113→voice decoding unit 105→first D/A converter 104→first A/D converter 102→voice encoding unit 103→multiplexing unit 111 is established.

Then in step S507, as a transmission path for the image response message, the path shown in FIG. 6 of digital memory unit 113→video decoding unit 110→digital video processor 115→(second frame memory 117 and first frame memory 116)→video encoding unit 108→multiplexing unit 111 is established. More in detail, the path is established in a route of the digital memory unit shown in FIG. 6→video signal multiplexing decoder 207 shown in FIG. 3→information source decoder 206→digital video processor 115→(second frame memory 117→first frame memory 116)→information source encoder 201→video signal multiplexing encoder 202→transmission buffer 203→transmission encoder 204→multiplexing unit 111 shown in FIG. 6. Then, proceeding to S508, the process will wait for the termination of the transmission of the response message. When the transmission of the response message is terminated, the process will proceed to step S509 to restore the usual reception path and receive a message. After this message is recorded for processing, the operation of the current processing is terminated.

As described above, in accordance with the communications apparatus for multimedia information of the second embodiment, the response message in the answer recording mode is digitally recorded in a recording unit in an encoded form in synchronism with the voice and image information. Therefore, its accumulation is possible in a remarkably smaller amount. Also, it becomes possible to provide its dynamic access and reproduction.

Further, even when there is difference between the accumulated voice encoding mode and the voice encoding mode transmittable to an actually connected apparatus on the side of the communicating party, the transmission can be made without any problem. Hence there is no need for the response messages to be accumulated per encoding mode corresponding to an apparatus on the side of the communicating party. Likewise, even when there is difference between the accumulated image encoding mode and image transfer rate, and the image encoding mode and image transfer mode transmittable to an actually connected apparatus on the side of the communicating party, no problem should be encountered at all because it is possible to cope with such situation by controlling the frame memories in the digital video processor. The response messages are encoded in the maximum image transfer rate assignable to an apparatus on the transmission side. Fundamentally, therefore, it is possible to effectively prepare the response messages which can be transmitted without degrading its image quality.

Moreover, the frame synchronization of a received image can be detected simultaneously even during the transmission of a response message while being decoded and encoded. Hence it is possible to obtain the function of an answer recording mode which can be decoded immediately when the mode is switched over to the decoding of the received image.

[Third Embodiment]

In accordance with a communications apparatus for multimedia information of the third embodiment, only voice messages are prepared as response messages in an answer recording mode in order to implement the curtailment of accumulation media, and at the same time, an image information transmitted from an apparatus on the transmission side is by return transmitted to the operator, thus making it possible for the sender to confirm the image information transmitted by him.

Figure 11:
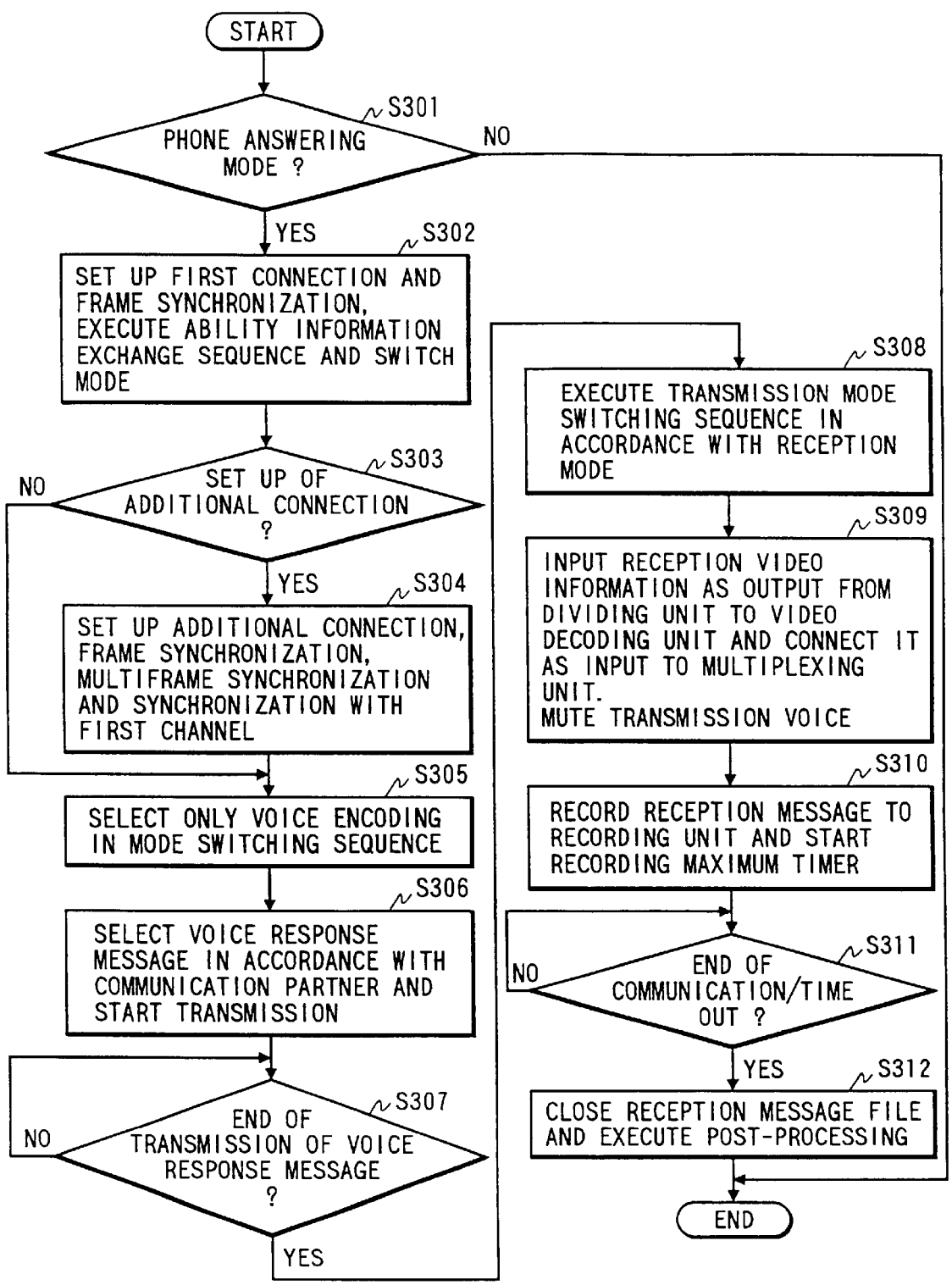
FIG. 11 is a flowchart which shows the operation of a communications apparatus for multimedia information according to a third embodiment of the present invention.

Hereinafter, with reference to a flowchart shown in FIG. 11, the detailed description will be made of the operation of the communications apparatus for multimedia information according to the third embodiment.

In this respect, the fundamental structure of the communications apparatus for multimedia information according to the present embodiment is identical to the one shown in FIG. 5.

Figure 12:
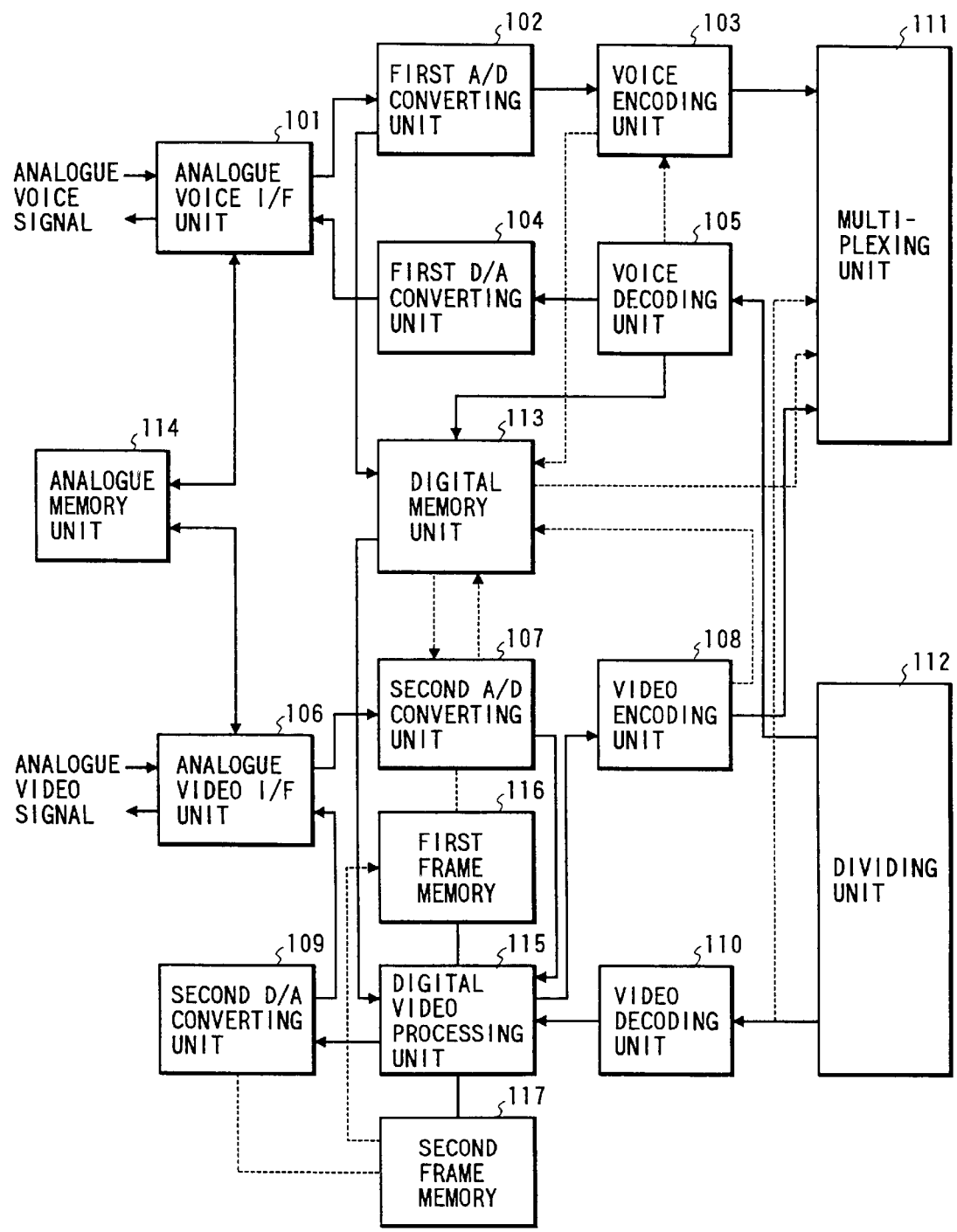
FIG. 12 is a view which shows the communications apparatus for multimedia information represented in the same state as FIG. 6 according to the third embodiment of the present invention.

Also, FIG. 12 is a block diagram which shows the arrangements of voice and image information between the analogue input/output unit and the multiplexing/dividing unit of the communications apparatus for multimedia information according to the third embodiment.

The function of each element shown in FIG. 12 is the same as that shown in FIG. 6.

The control of each operation given below is performed by the system controller 15.

At first, in step S301, it is determined whether or not the current mode is answer recording when a television telephone call is received. The processing operation is terminated without doing anything further unless the mode is found to be an answer recording. If it is found to be an answer recording mode, the process will proceed to step S302 to set up the reception automatically, and execute on inchannel the establishment of a first connection, the frame synchronization and the capability information exchanging sequence by BAS code. Then, proceeding to step S303, the process will determine whether or not any additional connections are set up. If affirmative, the process will proceed to step S304 to establish the additional connections, to execute the synchronized establishment of frame, the synchronized establishment of multiframe, and the synchronized establishment of the first connection in that order, and then, proceed to step S305. Also, if there is no setup of any additional connection, the process will skip over the aforesaid step S304, and proceed to step S305. In the step S305, the mode switching over sequence is executed, but it is made a mode only for a PCM voice transmission. Then, proceeding to step S306, the process selects a voiced response message prepared by the voice information corresponding to the communicating party determined by its telephone number and others, and starts its transmission. With this voiced response message, it is notified that the received imaged from the communicating party will be transmitted by return for confirmation.

Then proceeding to step S307, the process will wait for the termination of the transmission of the voiced response message. When the termination of the transmission is sensed, the process will proceed to step S308 to change the transmission setup to the same transmission mode as the image information receiving mode in order to transmit the received image information by return for confirmation. Then in step S309, the received image information is inputted into the video decoding unit 110 shown in FIG. 12 to store it in the digital memory unit 113. At the same time, the received image information is directly inputted into the multiplexing unit 111 for the transmission by return. Also, the transmitting voices are muted. Subsequently, in step S310, the accumulation of the received message is started, and at the same time, a timer for the maximum accumulation for the received message is started. Then proceeding to step S311, the process monitors the termination of the communication or the timing out of the timer which is actuated in the step S310. When either one of them is sensed, the process will proceed to step S312 to close the file for the received message, and then, terminate the current operation.

In the third embodiment described above, the output of the dividing unit 112 is directly connected to the image input of the multiplexing unit 111 in order to execute the turning transmission of the received image information, but it is of course possible to obtain the same effect by turning the input of the video multiplex decoder of the "H.261" decoding unit to the transmission buffer of the video encoding unit 108. Also, to make it simpler, the output from the video decoding unit 110 may be turned to the input of the video decoding unit 108 or there is a method, among others, in which an analogue turning is executed in the analogue image I/F unit 106. In this case, however, the anticipated effect is made smaller.

As described above in detail, it is possible to prepare the response message in a remarkably smaller amount of accumulation because it is good enough to accumulate only voiced response message in the answer recording mode, and also, because it is good enough if only the received image from the communicating party is transmitted by return as it is even if the transfer rate assignable to the image transmission should change due to the condition of the multimedia multiplexing at the time of actual transmission. Further, in the apparatus on the side of the communicating party, the accumulated image of its own image which has been transmitted is displayed at this juncture, thus producing an extremely favorable effect.

Also, since the image is transmitted by return, the transfer rate assignable to an image to be transmitted and received becomes identical on the calling side, and also, it is possible for the answer recording side to transmit the encoded image information received by return as it is. Therefore, the message can be transmitted while displaying the image screen of the image information which is accumulated as almost actual message received in the answer recording mode, and, further, it is possible for the apparatus on the side of the communicating party (the side being called) to implement it without any special functions to be added, any excessive operation, or the like at all.

[Fourth Embodiment]

In accordance with a communications apparatus for multimedia information of the fourth embodiment, voices are transmitted as a response message at first when a first connection is established, and then, only images are transmitted as a response message after the completion of the voice transmission. In this way, the transmission delay is prevented from being caused by the application of multiplexing when a multiplexed transmission is performed.

Now, with reference to FIG. 13 to FIG. 18, the description will be made of the fourth embodiment according to the present invention. In this respect, the fundamental structure of the communications apparatus for multimedia information according to the fourth embodiment of the present invention is the same as that of the first embodiment shown in FIG. 5 described above. Therefore, the embodiment will be described while applying FIG. 5 to its structure.

Figure 13:
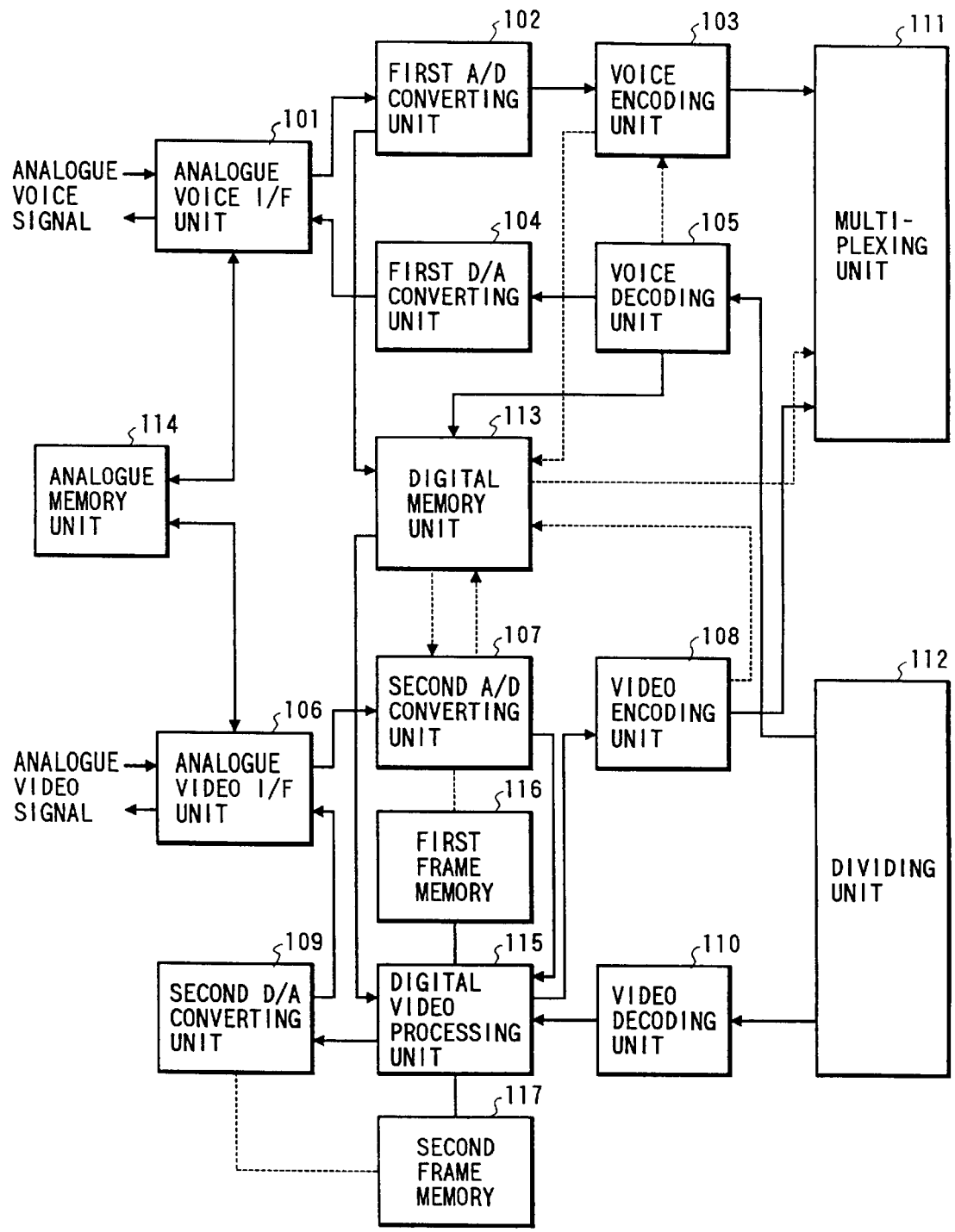
FIG. 13 is a view which shows a communications apparatus for multimedia information represented in the same state as FIG. 6 according to a fourth embodiment of the present invention.

FIG. 13 is a block diagram which shows the flow of the voice and image information from the input/output unit to the multiplexing/dividing unit of the communications apparatus for multimedia information according to the fourth embodiment. In FIG. 13, the same reference marks are provided for the same elements as those of the third embodiment appearing in FIG. 12. What differs in FIG. 13 from FIG. 12 is the omission of those signal lines between the first frame memory 116 and the second frame memory 117, and between the dividing unit 112 and the multiplexing unit 111 in the structure represented in FIG. 12.

Figure 14B:
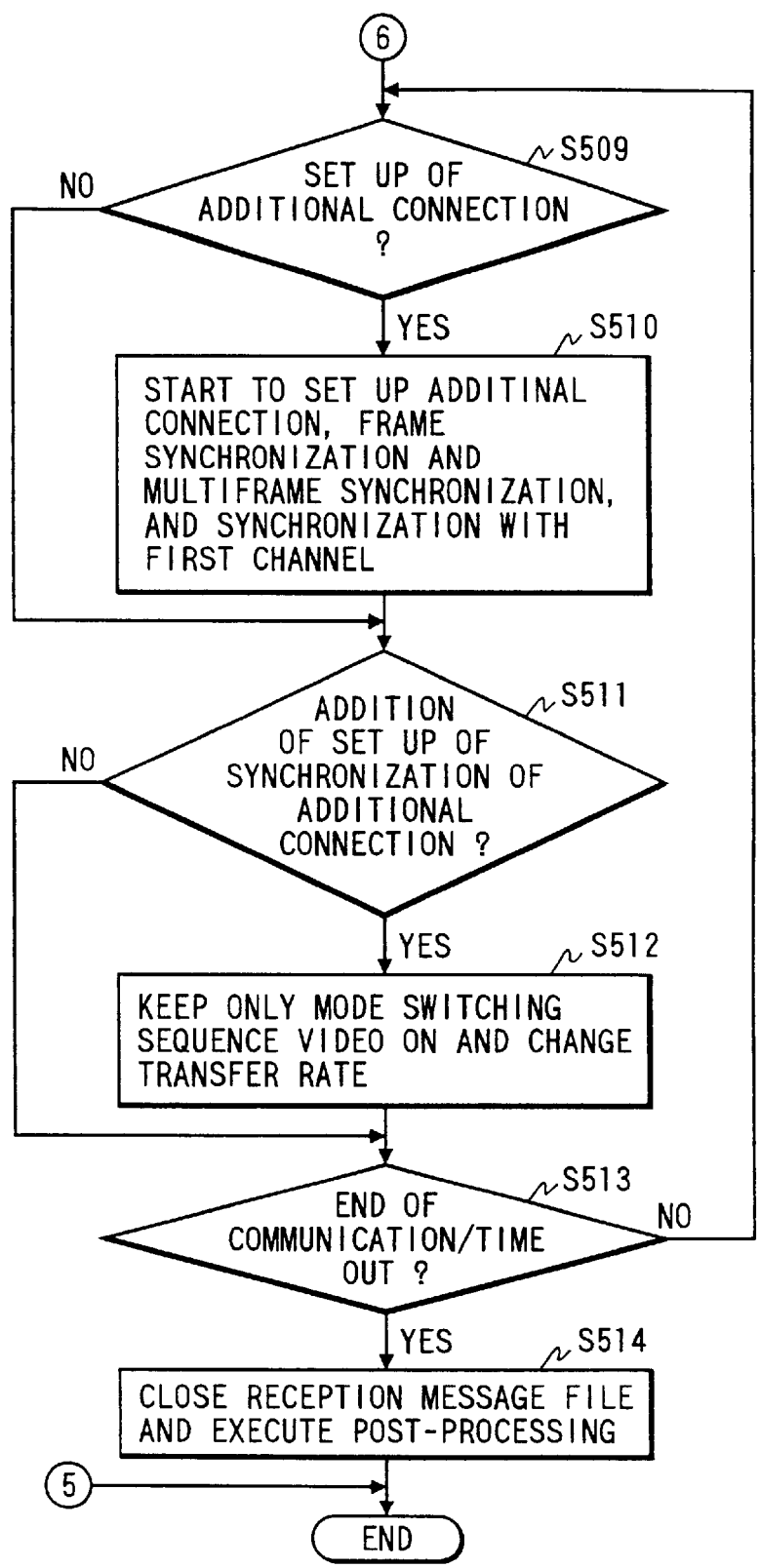
FIG. 14 is comprised of FIGS. 14A and 14B showing flowcharts which show the operation of the communications apparatus for multimedia information according to the fourth embodiment.

Hereinafter, with reference to flowcharts shown in FIGS. 14A and 14B, the detailed description will be made of the operation of the communications apparatus for multimedia information structured as described above. In this respect, the control of the operations given below are assumed to be performed by the system controller 15.

Figure 15:
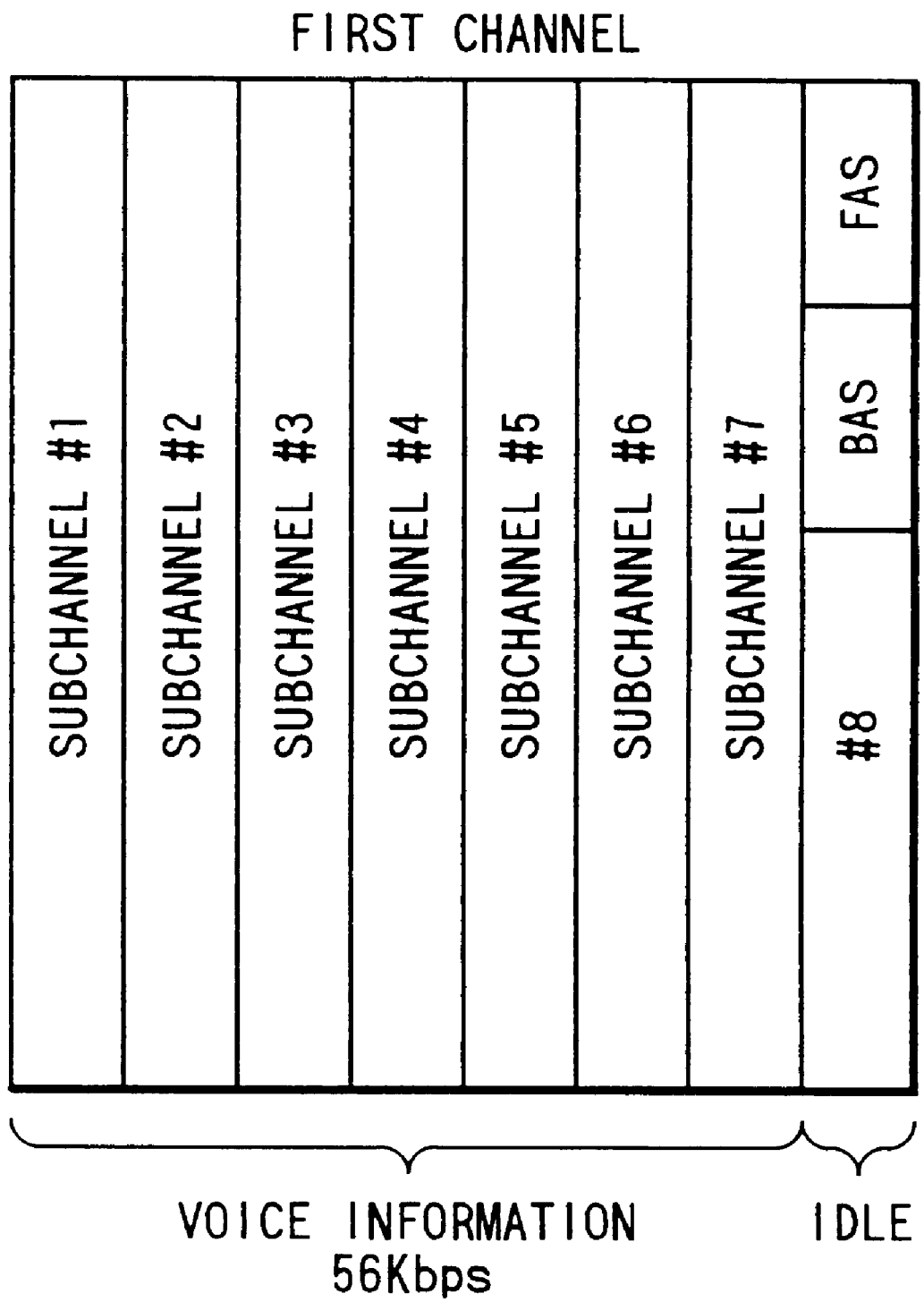
FIG. 15 is a view which shows an example of the assignments of "H.221" frame structure for the communications apparatus for multimedia information according to the fourth embodiment.

At first, in step S501, it is determined whether or not the current mode is answer recording when a television telephone call is received. The processing operation is terminated without doing anything further unless the mode is found to be an answer recording. If it is found to be an answer recording mode, the process will proceed to step S502 to accept the reception automatically, and execute on inchannel the establishment of a first connection, the frame synchronization and the capability information exchanging sequence by BAS code. At this juncture, the first channel is ready to be utilized. Then, proceeding to step S503, the process will switch the mode to a transmission mode in which only PCM ($\mu$-law/A-law) voices are transmitted using the first connection, and then, select the voiced response message and start transmission. At this juncture, the state of the multiplexed frame of the first connection is as shown in FIG. 15.

Then proceeding to step S504, the process will determine whether or not the transmission of the voiced response message is completed. If not, it is determined in step S505 whether or not any establishment of additional connections is requested. If not, the process will return to the step S504 described above. Also, if an additional connection is requested in the step S505, the process will proceed to step S506 to start establishing the additional connection, frame synchronization, multiframe synchronization, synchronization with the first connection. After that, the process will return to the step S504.

For example, when a second connection is established, the state of the "H.221" multiplexed frame is as shown in FIGS. 16A and 16B. Hence the portions other than that of the voice information 56 Kbps of the first connection become vacant.

In the step S504, when the transmission of the voiced response message is terminated, the process will proceed to step S507 to turn off the voice transmission mode. Then, after selecting the image response message according to the telephone number and other information of the communicating party, only the image transmission is turned on. Transfer rate is assumed to correspond to the number of connections which are established at that time. For example, if the synchronization has been completed over the second connection, the framing structure of the "H.221" multiplexed frame is as shown in FIGS. 17A and 17B. If it is only with the first connection, the structure is as shown in FIG. 18.

Then in step S508, the path for accumulating the received messages is established, and at the same time that the processing of the received message accumulation is started, the timer for defining the maximum accumulation of one received message is started (actuated). Then, proceeding to step S509, the process will determine whether or not there is any request for the establishment of additional connections within the capability range of the transfer rate. If requested, the process will proceed to step S510 to start executing the establishment of the additional connection, frame synchronization, multiframe synchronization, synchronization with the first connection, and then, proceed to the next step S511.

Also, in the step S509, if there is no request for any additional connection, the process will skip over the step S510, and proceed to step S511. In the step S511, the process will monitor whether or not any newly synchronized establishment is added to the connections yet to be established in synchronism among those additional connections. If any additional connections are found to have been established in synchronism, the process will proceed to step S512 to actuate the mode switching over sequence following the changes resulting from the required addition of the transfer rate. Here, there is no change except the image transmission is in a state of being turned on. The change of the mode is just to increase only the transfer rate assigned to the image transmission. Then in step S513, the process will monitor and wait for the completion of communication or the time out of the timer for the received signal accumulation actuated in the step S508. When either one of them is sensed, the process will proceed to step S514 to close the file for the received messages, and then, terminate the operation of the current processing.

On the other hand, if there is no connection which is additionally established in synchronism in the step S512, the process will skip over the step S512, and proceed to step S513. Also, in the step S513, neither of them is sensed, the process will return to the step S509.

In the fourth embodiment described above, while the description has been made of the transmission by the "H.261" codec when the image response message is transmitted, it is conceivable to adopt means for transmitting JPEG still pictures as the image response messages if it is found in the capability information exchanging sequence that JPEG still pictures are possible by the LSD/HSD. For example, the transmission of a JPEG still picture using the LSD can be represented as shown in FIG. 19 and FIGS. 20A and 20B. Also, the transmission of a JPEG still picture using the HSD is exemplified as shown in FIGS. 21A and 21B.

In accordance with the fourth embodiment, the transmission of a response message in the answer recording mode is started at first to transmit a voice message in the mode of only PCM voice transmission immediately after the completion of the first connection, and then, after the completion of the transmission of the voice message, an image response message is transmitted by switching over the voice transmission mode to the mode of only image transmission. In this way, it is possible to implement the function of preparing response messages in the answer recording mode, and also, the function of transmitting them simply without any consideration of synchronization at all just by preparing voice and image information in the fixed encoding mode and transfer rate as response messages without any attention given to the condition of multimedia multiplexing at each time communication is made. Also, it is possible to significantly curtail the amount of accumulation. Here, in image information, there may be some cases where the number of additional connections is smaller than estimated, but this does not create any problem because there is fundamentally no need for any synchronization with other media.

[Fifth Embodiment]

A communications apparatus for multimedia information of the fifth embodiment is designed to solve the problem of extremely wasteful use of media which takes place in such a case where no image is accompanied with a telephone mode reception or a television telephone mode communication while simply using at all times VCR and other media capable of recording image and voice information in synchronism as media for accumulating received messages in the answer recording mode. In the present embodiment, it is arranged to automatically select and switch over each of the optimal accumulation media by determining whether a received call is a telephone call or a television call, and further, determining whether or not any animated image information is being received as the current reception mode when an actual accumulation is started.

Figure 22:
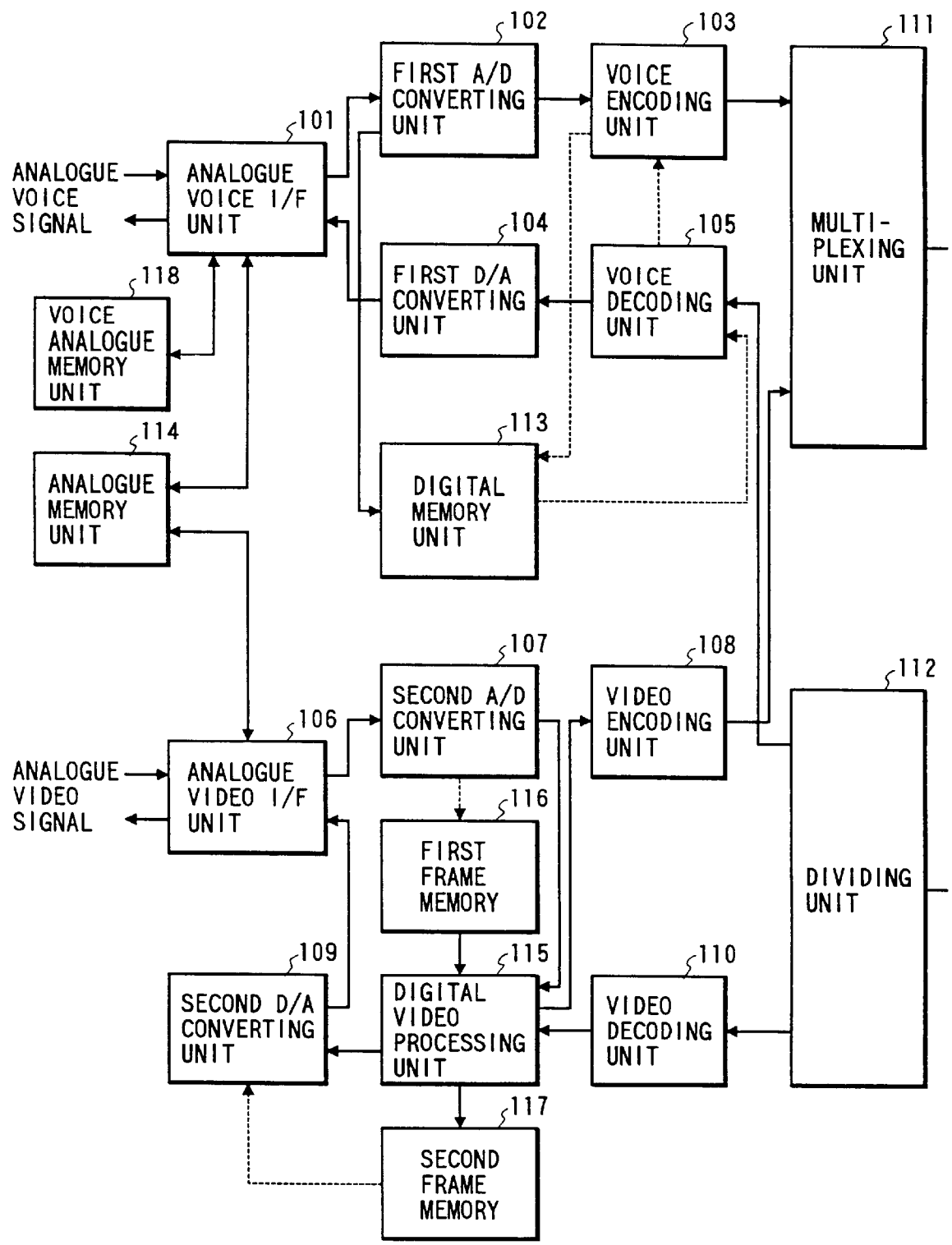
FIG. 22 is a block diagram which shows the flow of voice and image information for a communications apparatus for multimedia information according to a fifth embodiment of the present invention.

In this respect, each of the elements at 101 to 117 which constitute FIG. 22 is provided with the same function as the one represented in FIG. 6.

A reference numeral 118 designates an element comprising a micro cassette and others for accumulating and reproducing analogue voice information.

Now, with reference to FIG. 22, the description will be made of the flow of voice and image signals in the communications apparatus for multimedia information according to the fifth embodiment. FIG. 22 is a block diagram which illustrates the flow of voice and image signals according to the present embodiment with respect to the communications apparatus for multimedia information shown in FIG. 5. Here, the function of each element is the same as the one represented in FIG. 6.

The analogue voice signals to be transmitted and the analogue voice signals which are read out from the analogue memory unit 114, or analogue voice memory unit 118 are inputted into the analogue voice I/F unit 101. The analogue voice I/F unit 101 controls the input of such analogue voice signals and the output thereof.

The analogue memory unit 114 stores the analogue voice signals in synchronism from VCR and others through the analogue voice I/F unit 101, and outputs in synchronism the analogue voice signals through the analogue voice I/F unit 101. Likewise, the analogue image signals from VCR and others are stored in synchronism in the analogue memory unit 114 through the analogue image I/F unit 106 which will be described later, and read out from the analogue memory unit 114 in synchronism with the analogue image I/F unit 106.

The analogue voice memory unit 118 comprises a micro cassette and others for accumulating and reproducing analogue voice information.

The analogue voice signals which are output from the analogue voice I/F unit 101 are supplied to a first A/D converter 102.

The first A/D converter 102 converts the analogue voice signals from the analogue voice I/F unit 101 into the digital voice signals. The digital voice signals from the first A/D converter 102 are supplied to the voice encoding unit 103.

The voice encoding unit 103 encodes the digital voice signals from the first A/D converter 102 or the decoded voice signals from the voice decoding unit 105, and generates the encoded voice signals. The encoded voice signals from the voice encoding unit 103 are supplied to the digital memory unit 113 and the multiplexing unit 111.

The digital memory unit 113 stores the encoded voice signals from the voice encoding unit 103. The digital memory unit 113 records the encoded voice signals on MOD, HD or other recording media.

The analogue image signals to be transmitted, and the analogue image signals which are read out from the analogue memory unit 114 are inputted into the analogue image I/F unit 106. The analogue image I/F unit 106 controls the input of such analogue image signals and the output thereof.

The analogue image signals output from the analogue image I/F unit 106 are supplied to a second A/p converter 107.

The second A/D converter 107 converts the analogue image signals from the analogue image I/F unit 106 into the digital image signals. The digital image signals from the second A/D converter 107 are supplied to the digital video processor 115.

The input of the digital image signals from the second A/D converter 107 to the digital video processor 115 is controlled by the memory frame 116.

The digital video processor 115 performs the synthesizing and editing processing of each of the digital video signals.

The video encoding unit 108 encodes the digital video signals from the digital video processor 115 to generate encoded image signals. The encoded image signals from the video encoding unit 108 are supplied to the multiplexing unit 111.

The multiplexing unit 111 multiplexes the encoded voice signals from the voice encoding unit 103 and the encoded video signals from the voice encoding unit 108 in accordance with the instruction from the system controller 15 (see FIG. 5), and transmits them to the circuit interface unit 17 (see FIG. 5).

The reception signals from the circuit interface unit 17 are supplied to the dividing unit 112. The dividing unit 112 divides the reception signals from the circuit interface unit 17 into encoded voice signals and encoded image signals. The encoded voice signals are supplied to the voice decoding unit 105, and the encoded image signals are supplied to the voice decoding unit 110.

The voice decoding unit 105 decodes the encoded voice signals from the dividing unit 112 and the encoded voice signals from the digital memory unit 113 into the digital voice signals. The digital voice signals from the voice decoding unit 105 are supplied to the first D/A converter 104. The first D/A converter 104 converts the digital voice signals from the voice decoding unit 105 into the analogue voice signals.

The analogue voice signals from the first D/A converter 104 is output through the analogue voice I/F unit 101.

The video decoding unit 110 decodes the encoded image signals into the digital image signals. The digital image signals from the video decoding unit 110 is supplied to the digital video processor 115.

The digital video processor 115 performs the synthesizing and editing processing by use of the digital image signals from the second A/D converter 107 and the digital video signals from the video decoding unit 110.

The digital image signals from the digital video processor 115 are supplied to the second D/A converter 109. The output from the digital video processor 115 to the second D/A converter 109 is controlled by the frame memory 117. The second D/A converter 109 converts the digital image signals into the analogue image signals, which are output through the analogue image I/F unit 106.

In this respect, the video encoding unit 108 and video decoding unit 110 are structured in accordance with the ITU-TS Recommendation "H.261", and the frame structure which is regulated by the "H.221" is adopted as described in the conventional technique.

Figure 23:
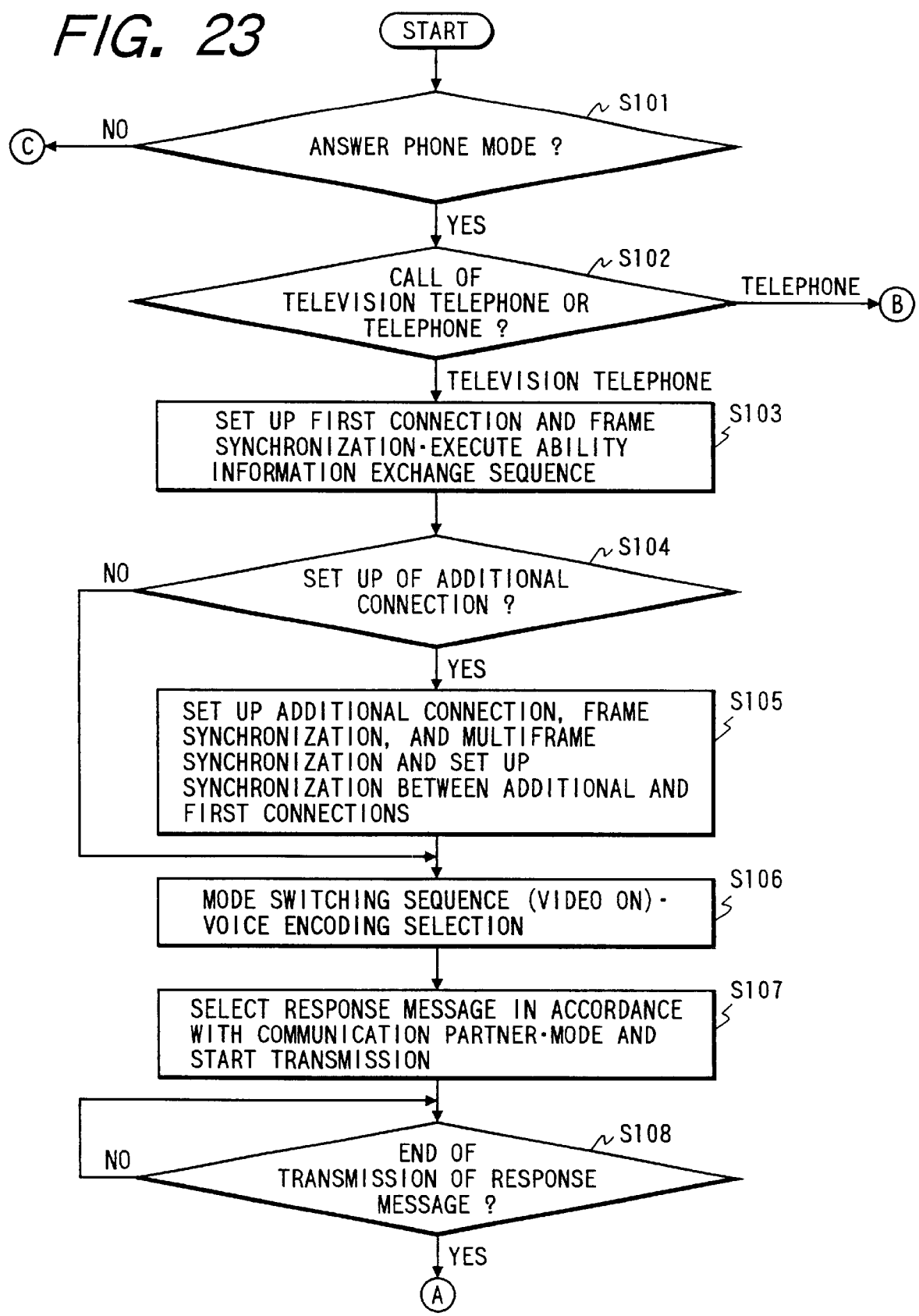
FIG. 23 is a flowchart which shows the operation of the communications apparatus for multimedia information according to the fifth embodiment.
Figure 24:
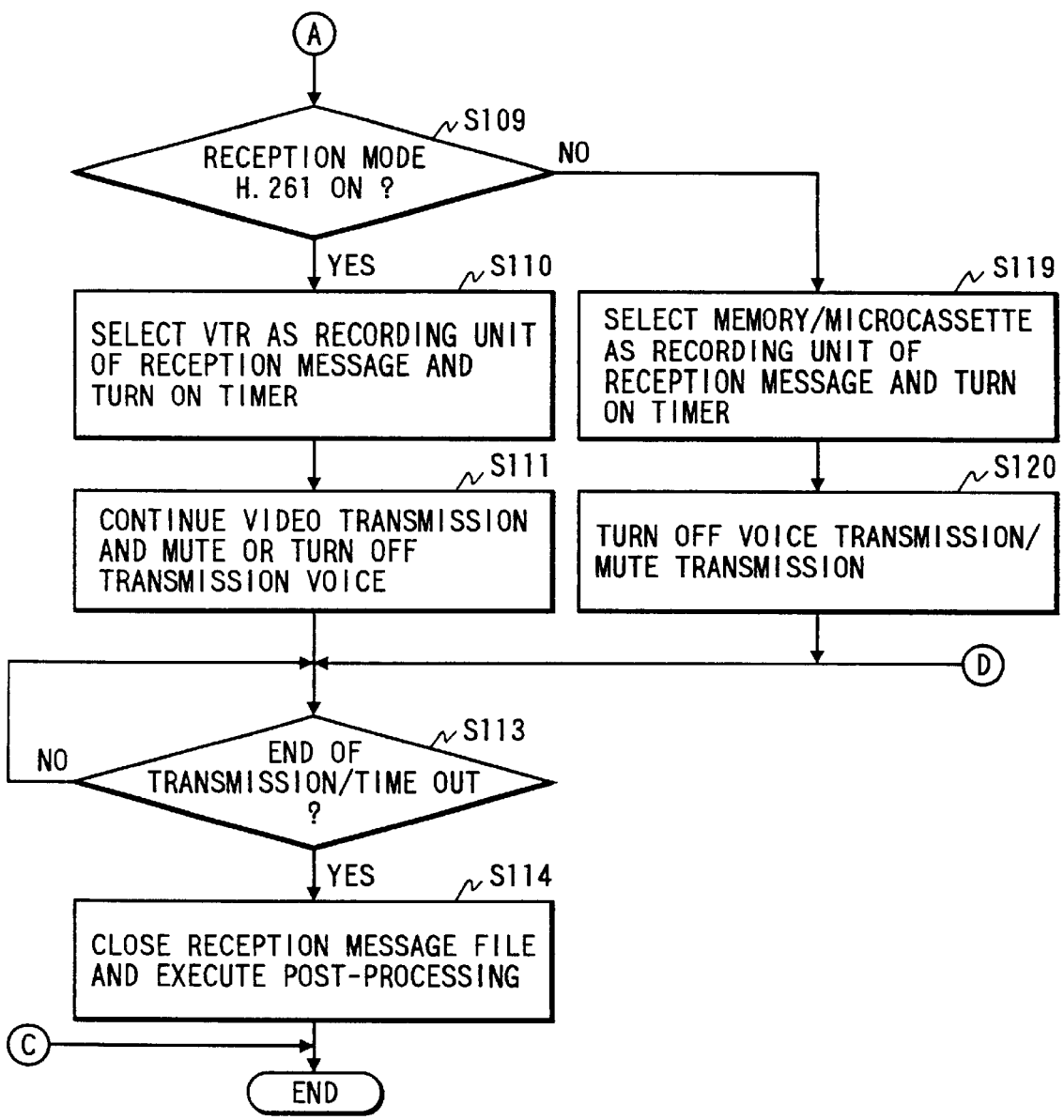
FIG. 24 is a flowchart which shows the operation of the communications apparatus for multimedia information according to the fifth embodiment.
Figure 25:
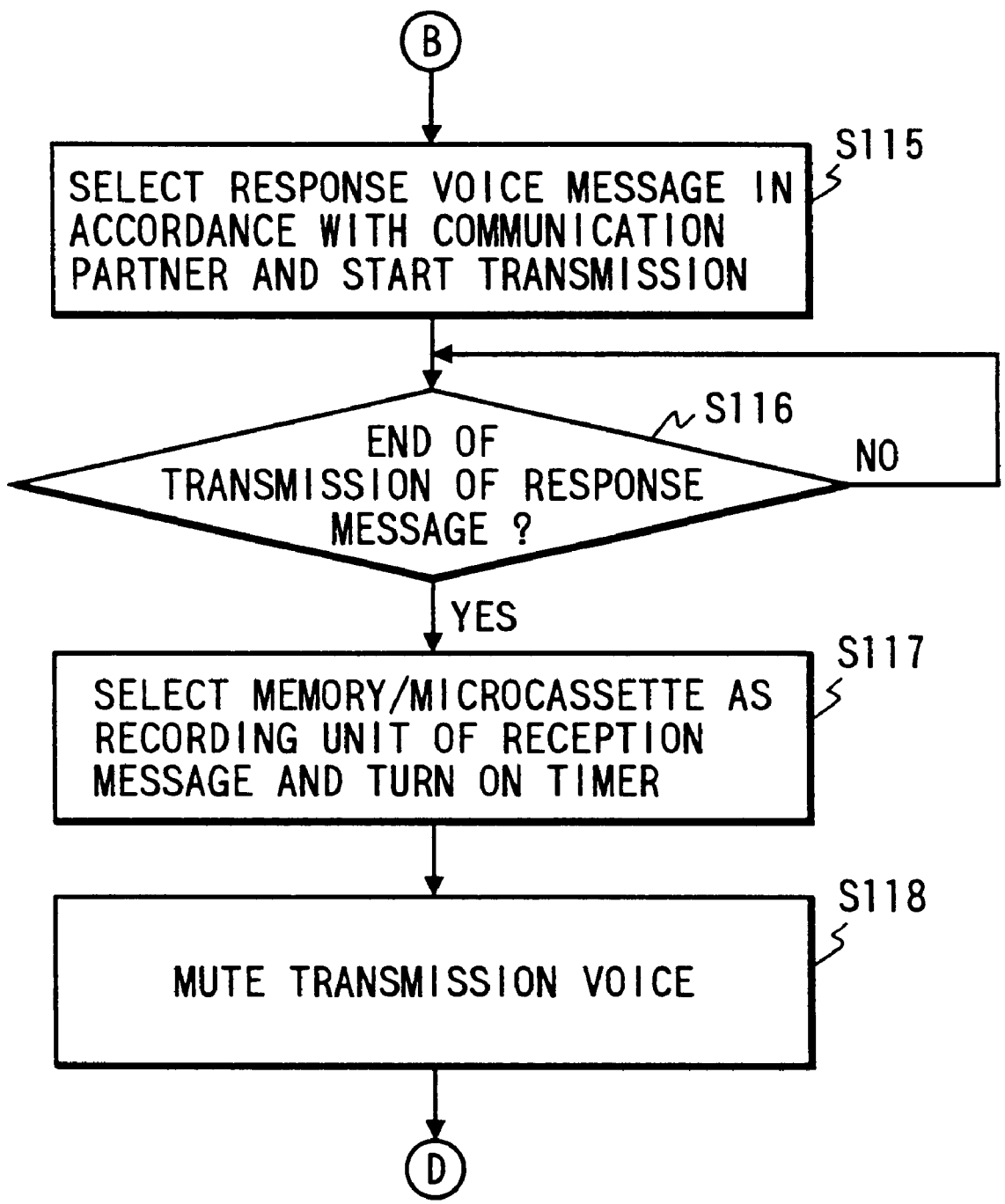
FIG. 25 is a flowchart which shows the operation of the communications apparatus for multimedia information according to the fifth embodiment.

Now, with reference to FIG. 23 to FIG. 25, the description will be made of the operation of a communications apparatus for multimedia information according to the fifth embodiment. FIG. 23 to FIG. 25 are flowcharts showing the operation of the communications apparatus for multimedia information according to the present embodiment. Each operation given below is controlled by the system controller 15.

When a call is received, step S101 is executed as shown in FIG. 23. In the step S101, whether or not the call is an answer recording is determined. If the mode is set for the answer recording, the step S102 is executed. In the step S102, it is determined whether or not the received call is a television telephone call or a telephone call.

If the received call is a television telephone call, step S103 is executed. In the step S103, the call is automatically established. In other words, a first connection is established, and on inchannel, the establishment of frame synchronization and the capability information exchanging sequence by BAS code are executed at the same time.

After the first connection is established, step S104 is executed. In the step S104, it is determined whether or not there is any request for additional connections. If affirmative, step S105 is executed. If negative, the step S104 is skipped over, and step S106 is executed.

In the step S105, the additional connection is established, and on the additional connection, the synchronized establishment of the frame, the synchronized establishment of the multiframe, and the synchronized establishment with the first connection are executed, respectively.

Then step S106 is executed. In the step S106, a voice encoding mode, and a transmission mode such as the image transmission mode are determined to execute the mode switching over sequence.

Then step S107 is executed. In the step S107, the communicating party and communication mode are determined in accordance with the telephone number and other information regarding the communicating party, thus starting transmission.

After the transmission is started, step S108 is executed. In the step S108, whether or not the transmission of the response message is completed is determined.

When the transmission of the response message is completed, step S109 is executed as shown in FIG. 24. In the step S109, the reception mode from an apparatus on the side of the communicating party is confirmed to determine whether or not there is any "H.261" animated image information involved.

If any "H.261" animated image information is involved, step S110 is executed. In the step S110, the analogue memory unit 106 which is a medium for accumulating voice and image information is selected as a medium for accumulating the reception message, and a reception timer is actuated at the same time.

After the reception timer is actuated, step S111 is executed. In the step S111, the transmitting voices are turned off or the transmitting voice mute is actuated. Thus the voice transmission is suspended while the transmission of image information is continued.

Then step S113 is executed. In the step S113, the termination of communication or the time up of the reception timer is monitored. When either the termination of communication or the time up of the reception timer is sensed, step S114 is executed. In the step S114, the file for reception messages is closed and the postprocessing is executed.

When no "H.261" animated image information is received, step S119 is executed. In the step S119, the digital memory unit 113 is selected as the medium for accumulating the reception message or analogue voice recording unit 118 is selected, and then, a path corresponding to the selected medium is established. In this respect, a digital memory medium 113 is selected if a JPEG still picture information is received.

Then step S120 is executed. In the step S120, the voice transmission mode is turned off or the transmitting voice mute is performed. Thereafter, the processes on the step S113 and on are executed.

In the step S102, if the received call is found to be a telephone call, step S115 is executed. In the step S115, the call is automatically set up. At the same time, a response message is selected corresponding to the communicating party, and its transmission is started.

After the transmission is started, step S116 is executed. In the step S116, whether or not the transmission of the response message is terminated is determined. If affirmative, step S117 is executed. In the step S117, the digital memory unit 113 is selected as the reception message medium or the analogue voice memory unit 118 is selected. Then step S118 is executed. In the step S118, the voice mute is performed.

As described above, an optimal accumulation medium is automatically selected at all times in accordance with the received information. Therefore, it is possible to prevent the accumulation media from being wastefully used, and obtain an economical and efficient environment for use of the media. More specifically, if an analogue recording unit formed by VCR is selected as an accumulation medium when there are animated image information and voice information involved. It is possible to eliminate a waste such that a received message which contains only voices but not any image information is still recorded unnecessarily on an image recording tape.

Also, it becomes easy to send out a response message in each mode optimally, while on the side of the communicating party, only the received image can be displayed during transmission of an answer recording message. As a result, there is an effect that the transmission of an answer recording message becomes easier psychologically.

[Sixth Embodiment]

A sixth embodiment is designed in consideration of the fact that in a television telephone and other communications apparatuses for multimedia information, an enormous amount of media is required when recording image and voice information in an answer recording mode is unable to materialize the production of compact media at a low cost, and that the actually received messages are often good enough to meet its purpose if only its voice information is recorded. Therefore, a communications apparatus for multimedia information according to the sixth embodiment is arranged to be able to automatically set up its communication capability as a television telephone to deal only with 1B and PCM voices when the answer recording key is depressed. Hence the resultant reception is only for the PCM voices despite the received call is for a television telephone. Then it is also arranged to be able to automatically restore this set up to the original communication capability when the answer recording key is again depressed to release the current answer recording mode. In this way, it is made possible to materialize an answer recording function for a television telephone which the user can operate in the same manner as operating an answer recording function of an ordinary telephone.

Figure 26:
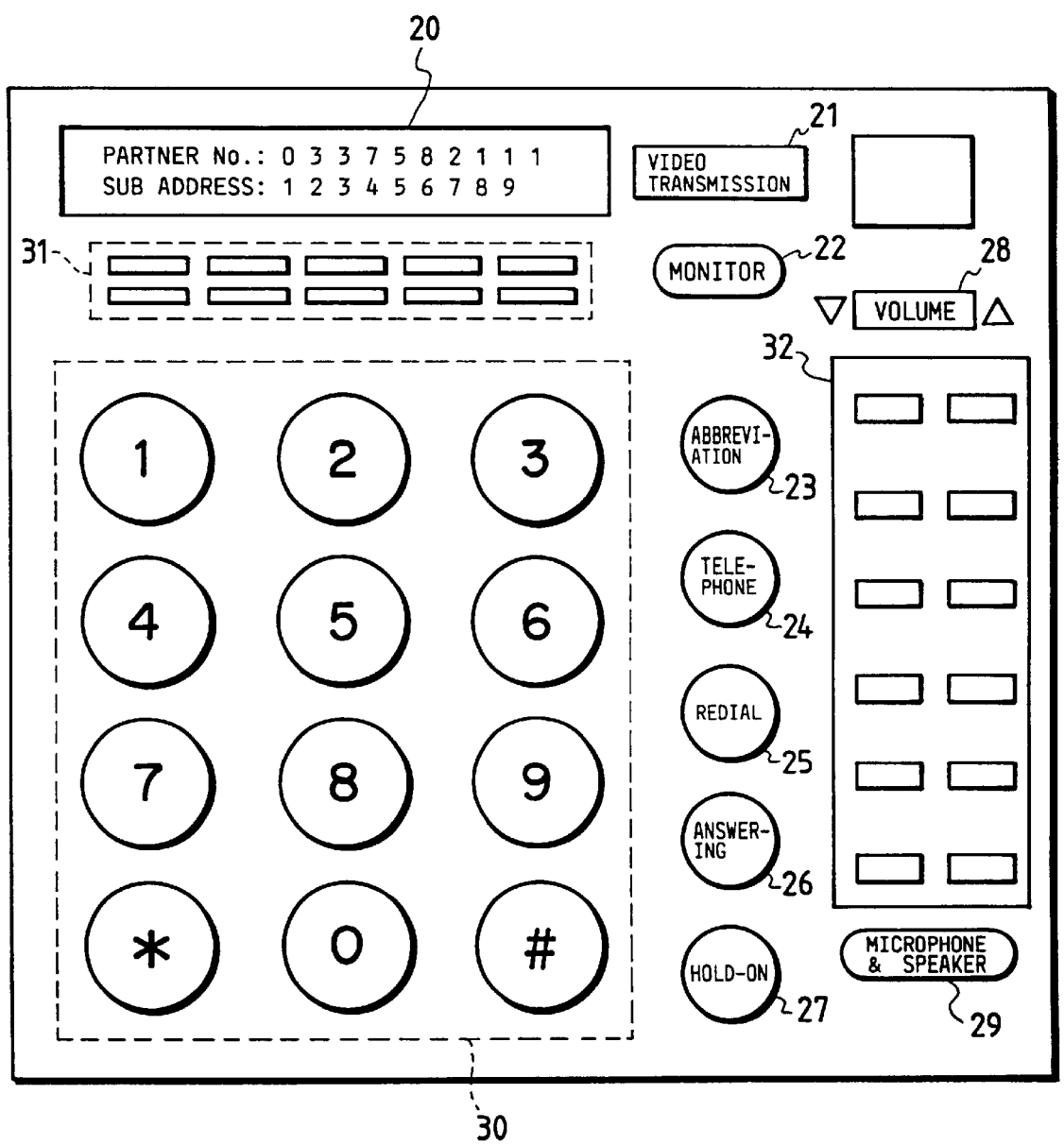
FIG. 26 is a view which shows a key arrangement of the operating unit of a communications apparatus for multimedia information according to a sixth embodiment of the present invention.

Now, with reference to the accompanying drawings, the sixth embodiment will be described. FIG. 26 is a view which shows the key arrangement of the operational unit of a communications apparatus for multimedia information according to the sixth embodiment.

The structure of the communications apparatus for multimedia information of the sixth embodiment is the same as that of the communications apparatus for multimedia information shown in FIG. 5. For this communications apparatus for multimedia information, the frame structure regulated by "H.221" is employed.

Now, with reference to FIG. 26, the operational unit will be described.

As shown in FIG. 26, the operational unit comprises an LCD indication section 20 for displaying the inputted information for operation and various kinds of information received; a plurality of directly functional keys 21 to 29 to command the control of the registration, modification and execution of additional services; ten keys 30 for dial input; a plurality of function keys 31; and a plurality of one-touch dial keys 32. The direct keys 26 are those of the answer recording mode for setting up and releasing this mode.

Figure 27:
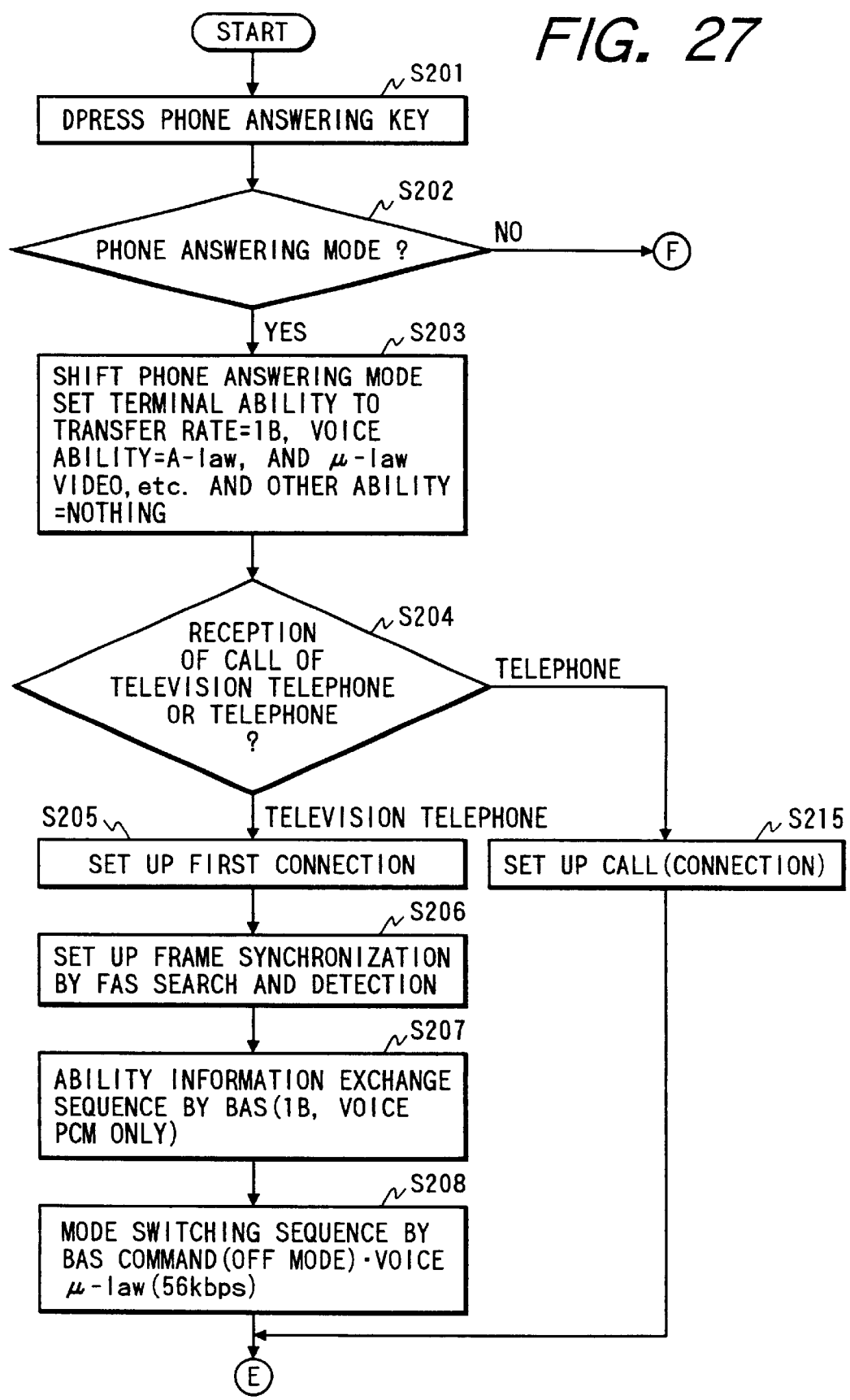
FIG. 27 is a view which shows a flowchart of the operation of the communications apparatus for multimedia information according to the sixth embodiment.
Figure 28:
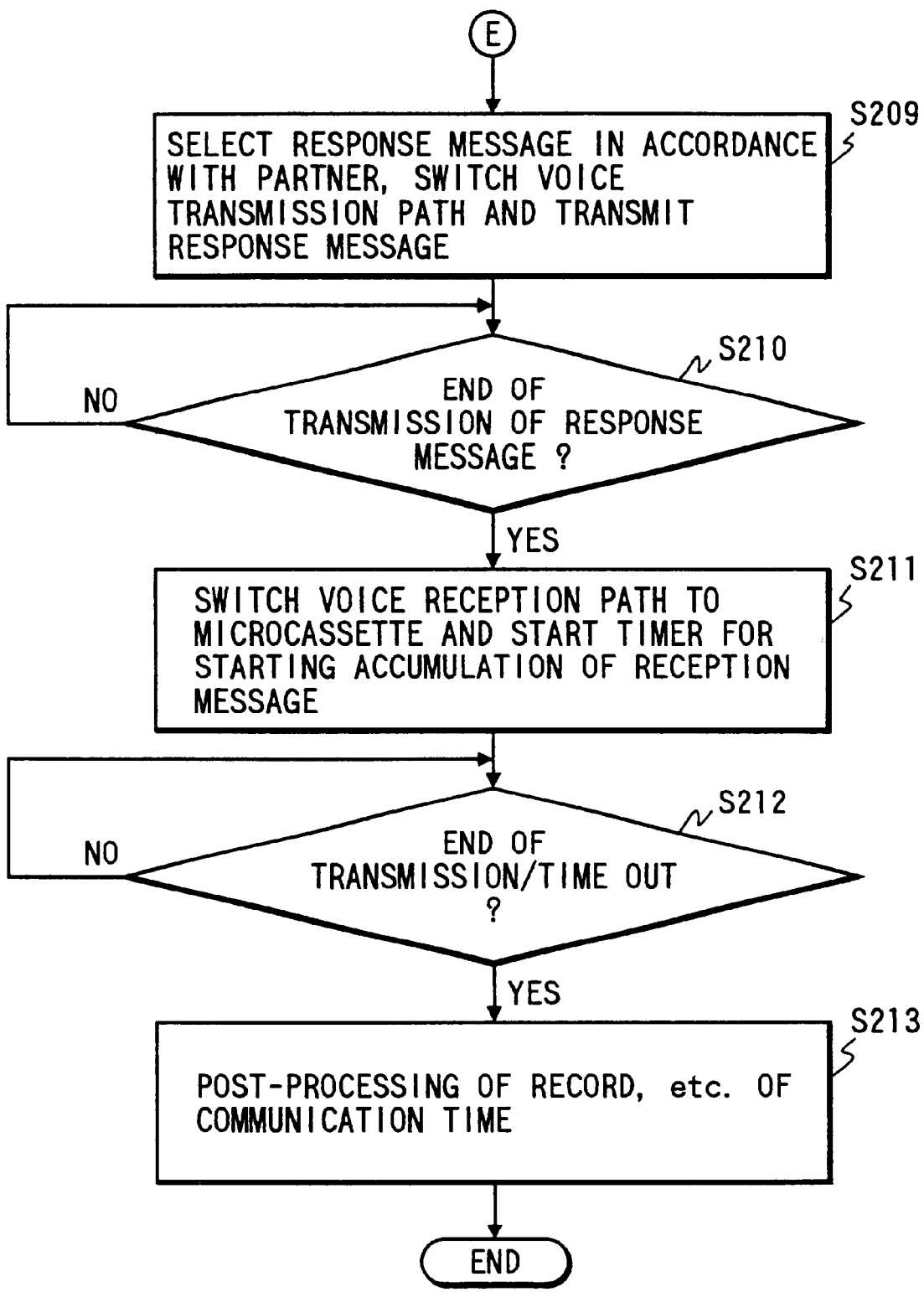
FIG. 28 is a view which shows a flowchart of the operation of the communications apparatus for multimedia information according to the sixth embodiment.
Figure 29:
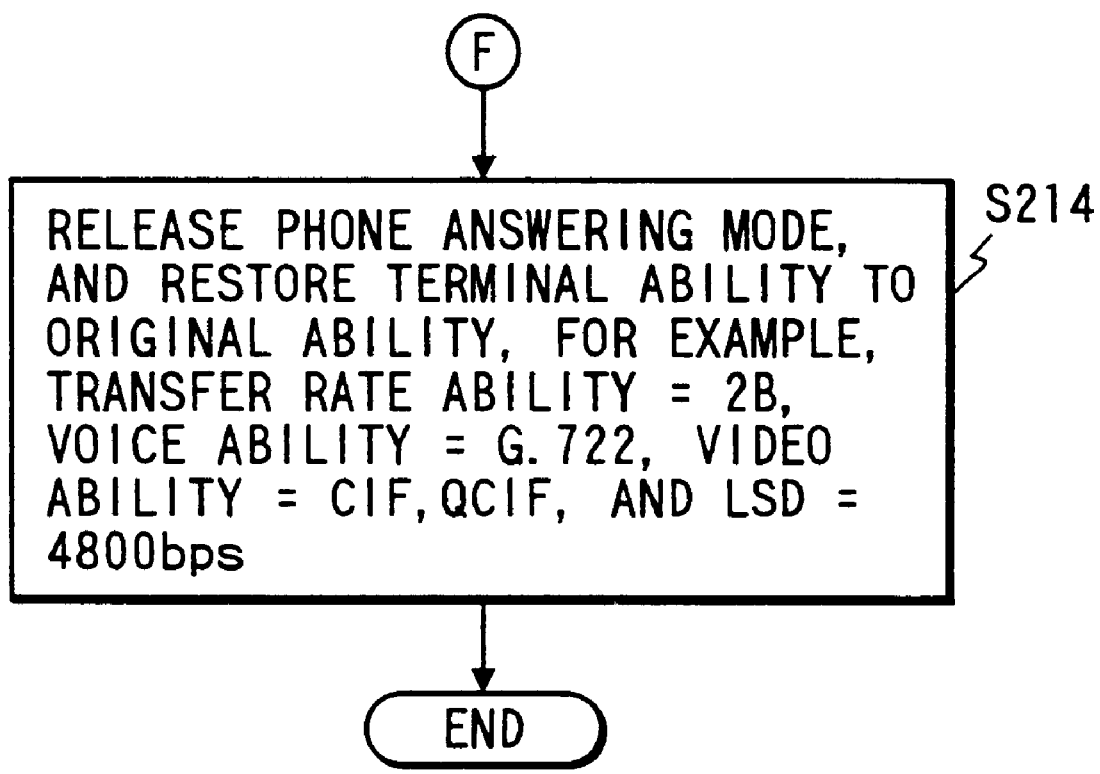
FIG. 29 is a view which shows a flowchart of the operation of the communications apparatus for multimedia information according to the sixth embodiment.

Now, in conjunction with FIG. 27 to FIG. 29, the description will be made of the operation of a communications apparatus for multimedia information according to the present embodiment. FIG. 27 to FIG. 29 are flowcharts which show the operation of the communications apparatus for multimedia information of the present invention. In this respect, the control of each operation given below will be performed by the system controller 15.

In FIG. 27, when the directly functional key 26 serving as that of an answer recording mode is depressed in step S201, step S202 is executed. In the step S202, it is determined from the current status of a mode that an answer recording mode has been set or not.

If it is found that the answer recording mode is yet to be set up, step S203 is executed. In the step S203, the mode is set up as an answer recording mode while its own terminal capability, which presents a communication capability, is set up to "transfer rate=1B", "voice capability=A-law, $\mu$-law PCM", and "image capability, other LSD, HAD, or the like=none".

Then step S204 is executed. In the step S204, it is determined whether the received call is a television telephone call or a telephone call. If the received call is a television telephone call, step S205 and step S206 are executed in that order. If the received call is a telephone call, step S215 is executed.

In the step S205, the first connection is established. In the step S206, a frame synchronization is established by the FAS retrieval and detection on inchannel.

Then step S207 is executed. In the step S207, the capability information exchanging is performed by the BAS code. At this juncture, the terminal capability is only "1B, PCM voice capability". As a result, an apparatus on the side of the communicating party does not request the setup of any additional connections. In the next step S208, therefore, the PCM ($\mu$-law/A-law) voice communication mode is set up both for transmission and reception.

In the step S215, the call is established.

After the execution of the step S208 or the step S205, step S209 is executed as shown in FIG. 28. In the step S209, a response message corresponding to the communicating party is selected from the memory unit 18 (see FIG. 5) according to the present embodiment. Then the voice path is switched accordingly to start transmitting the response message thus selected.

After the transmission of the response message is started, step S210 is executed. In the step S210, whether or not the transmission of the response message is completed is determined.

When the transmission of the response message is completed, step S211 is executed. In the step S211, the voice reception path is switched over to a micro cassette (not shown: but connected to the voice and image input/output unit shown in FIG. 5), thus starting the accumulation of the received message, and at the same time, actuating a timer for the maximum allowable message that can be received.

After the time for the maximum allowable reception message is actuated, step S212 is executed. In the step S212, the termination of communication and the time out of the timer for the maximum allowable reception message are monitored.

When either the termination of communication or the time out of the timer for the maximum allowable reception message is sensed, step S213 is executed. In the step S213, the recording of the communication time and accumulating period of the received message, and other postprocessing are performed.

In the step S202, if it is found that an answer recording mode has already been set up, step S214 is executed. In the step S214, the answer recording mode is released, and the set up is restored to the original capability of the terminals of its apparatus own. For example, it is automatically restored to "transfer rate capability=2B", "voice capability=G. 722 48 kbps", "image capability=CIF & QCIF", "LSD=4,800 bps" and the like as the capability thereof.

As described above, with the setup of an answer recording mode by the operation of the directly functional key 26, the PCM voice capability 1B communication is automatically declared in the capability information exchanging sequence when a television telephone call is received. Only the communication on the PCM voices is actuated, thus making it possible to accumulate the received messages on the same voice accumulation medium used at the time of the usual reception of a telephone call. Therefore, any wasteful consumption of the recording medium is suppressed when information is received in the answer recording mode. The recording is also possible at a lower cost. Further, when the directly functional key 26 is depressed to release the answer recording mode, the original function of the television telephone is automatically restored, thus making it possible to eliminate any complicated operation required for changing capabilities.

In this respect, according to the present embodiment, the description has been made of the use of a micro cassette, but it may be possible to use the aforesaid digital memory unit 113 in place thereof as in the other embodiments.

Further, although there is no particular description regarding response messages and received messages, it is also possible to curtail the accumulation amount by executing a compressed accumulation and expanded reproduction on real time by use of a versatile chip for answer recording.

Also, while the description has been made of the case where the voice communication capability is reduced to the "transfer rate=1B" and "voice capability=A-law, $\mu$-law PCM". It is not necessarily limited to this capability. It may be possible to adopt a method in which other capability such as to support still picture communications is maintained as a setup capability while making that of the voice communication PCM without any provision of animated image communication capability.

[Seventh Embodiment]

Figure 30:
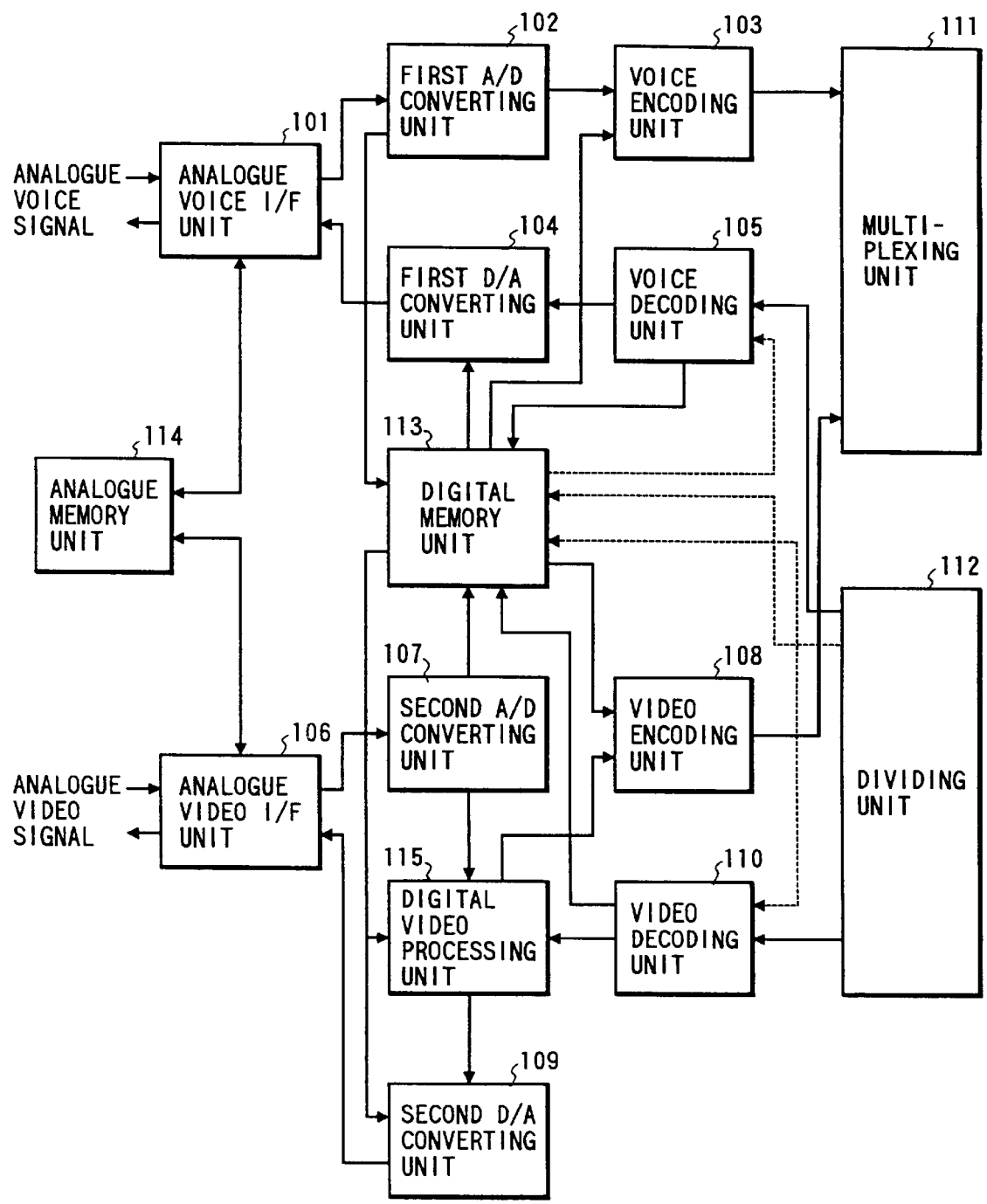
FIG. 30 is a block diagram which shows the flow of voice and image information for a communications apparatus for multimedia information according to a seventh embodiment of the present invention.
Figure 31:
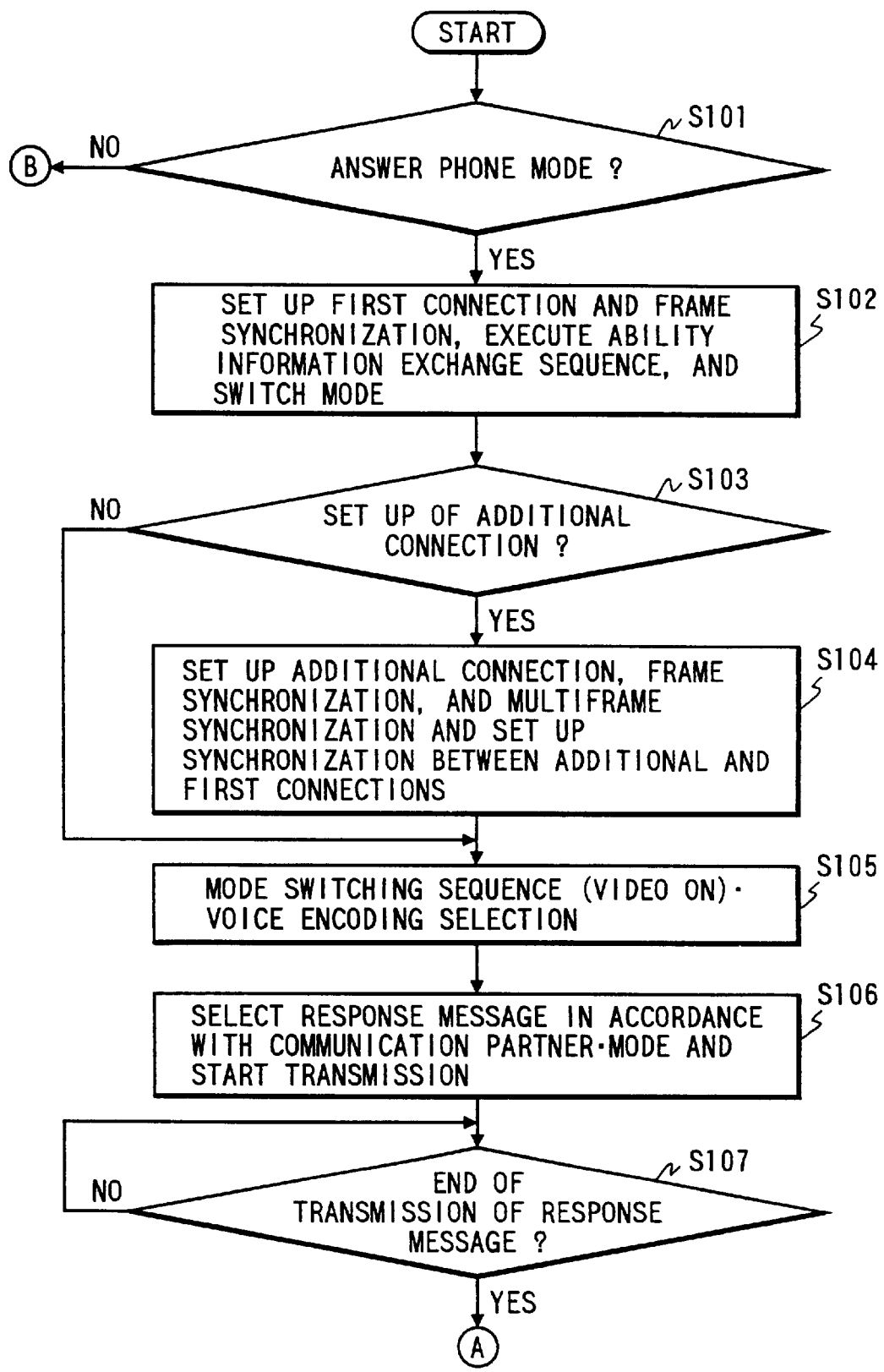
FIG. 31 is a flowchart which shows the receiving operation of the communications apparatus for multimedia information according to the seventh embodiment.

Now, with reference to FIG. 30 and FIG. 31, a communications apparatus for multimedia information will be described in accordance with a seventh embodiment of the present invention. FIG. 30 and FIG. 31 are flowcharts showing the receiving and storing operations of the communications apparatus for multimedia information according to the present embodiment.

In this respect, the fundamental structure of the communications apparatus for multimedia information of the present embodiment is identical to the one shown in FIG. 5. Also, FIG. 30 is a flowchart which shows the flow of voice and image information from the analogue input/output unit to the multiplexing/dividing unit of the communications apparatus for multimedia information according to the seventh embodiment. The elements having the same reference marks as those appearing in FIG. 6 are assumed to be provided with the same functions in FIG. 6, respectively.

As shown in FIG. 31, when a call is received, step S101 is executed at first. In the step S101, it is determined whether or not the current mode is set up for answer recording. If the mode is found to have been set up for answer recording, step S102 is executed. In the step S102, the call is automatically set up, that is, a connection is established, and on inchannel, the establishment of frame synchronization, and the execution of the capability information exchanging sequence by BAS code, and mode switching over sequence are performed in accordance with ITU-TS Recommendations "H.221/H.242".

After the connection is established, step S103 is executed. In the step S103, it is determined whether or not there is any request for the establishment of additional connections. If affirmative, step S104 is executed. If negative, step S105 is executed without executing the step S104.

In the step S104, the establishment of additional connections, the establishment of the frame synchronization on the additional connections, the establishment of the multiframe synchronization, and the synchronized establishment with the first connection are executed, respectively.

Then step S105 is executed. In the step S105, the voice encoding mode is decided, and the mode switching over sequence is performed to turn on the image transmission.

Then step S106 is executed. In the step S106, a response message is selected in accordance with the communicating party to be recognized by its telephone number and other information, and the communication mode to be determined by the capability exchange, thus starting the transmission.

After the transmission is started, step S107 is executed. In the step S107, whether or not the transmission of the response message is completed is determined.

Figure 32:
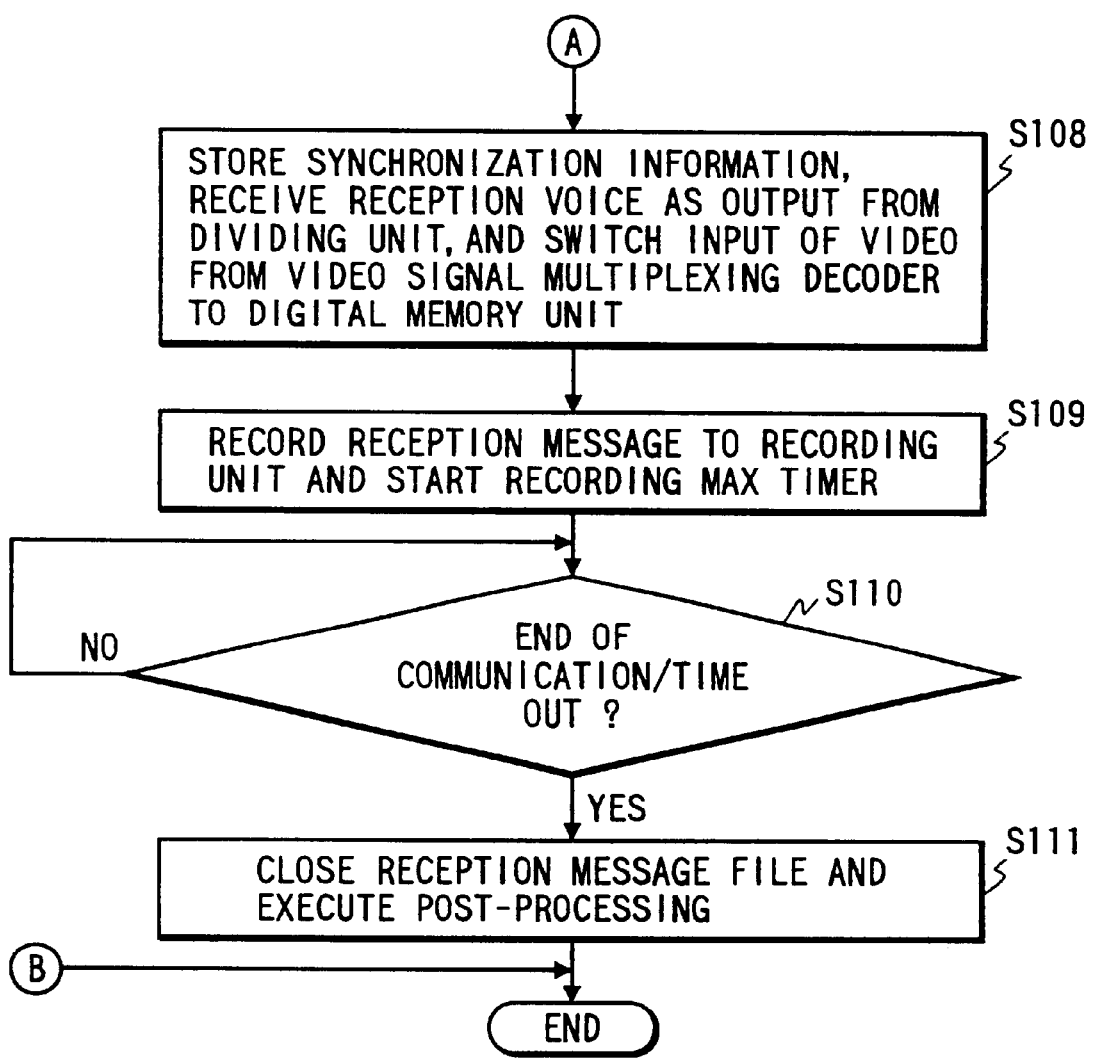
FIG. 32 is a flowchart which shows the storing operation of the communications apparatus for multimedia information according to the seventh embodiment.

When the transmission of the response message is completed, step S108 is executed as shown in FIG. 32. In the step S108, the path is switched over to the one in which the attribute of the reception mode and other information required for synchronization are stored; the voice signals from the dividing unit 112 (see FIG. 30) are directly transferred to the digital memory unit 113 (see FIG. 6) for storage; and the image signals inputted into the video multiplexing decoder 207 (see FIG. 3) of the video encoding/decoding unit 11 (see FIG. 5) are directly transferred to the digital memory unit 113 for storage. (In this respect, according to the present embodiment, the first frame memory 116, and the second frame memory are removed from the structure shown in FIG. 3.)

Then step S109 is executed. In the step S109, the recording MAX timer is actuated, and at the same time, the recording onto the digital memory unit 113 is started.

After the recording MAX timer is actuated, step S110 is executed. In the step S110, it is determined whether or not the communication is terminated or whether or not there is the presence of the time up of the recording MAX timer.

When either the communication is terminated or the time up of the recording MAX timer is present, step S111 is executed. In the step S111, the file for received messages is closed and the postprocessing is executed.

As described above, the encoded voice and image information are stored in the digital memory unit 113 in synchronism. As a result, the amount of generated information is less than that of circuit speed in second, thus making it possible to significantly reduce the volume required for accumulating received information, and to rapidly execute dynamic access to the accumulated information received.

Figure 33:
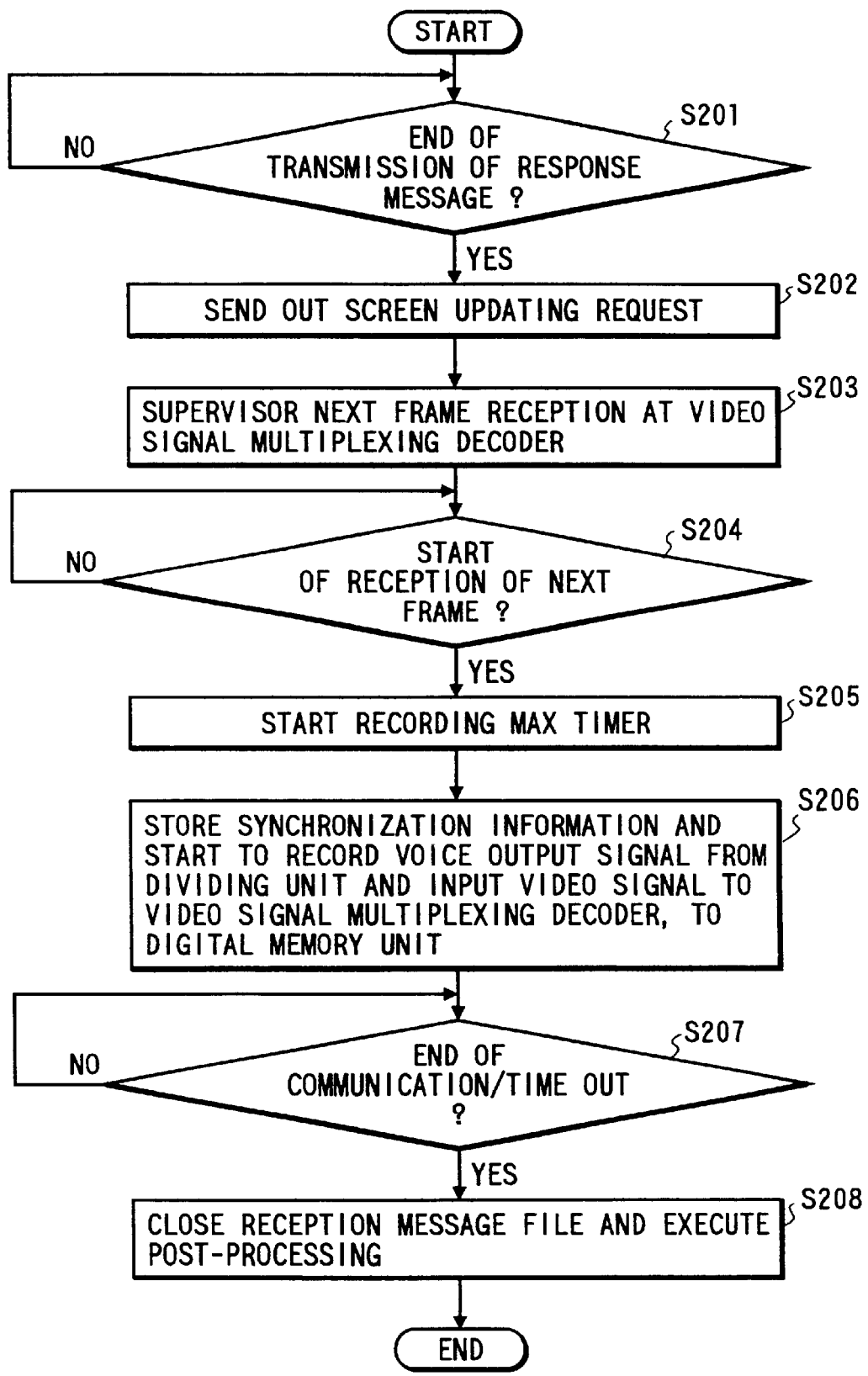
FIG. 33 is a flowchart which shows an application example of the communications apparatus for multimedia information according to the seventh embodiment.

Now, FIG. 33 is a flowchart showing an application example of the communications apparatus for multimedia information according to the seventh embodiment.

The communications apparatus for multimedia information of the present embodiment is provided with the same structure as that of the communications apparatus for multimedia information shown in FIG. 5. In this communications apparatus for multimedia information, its operation from the reception of a call to the transmission of a response message is the same as the operation in the steps up to S106 shown in FIG. 31.

At first steps S201 is executed. In the step S201, it is determined whether or not the transmission of the response message is terminated. If affirmative, step S202 is executed. In the step S202, a request is sent out to update the screen.

Immediately, then, step S203 is executed to start monitoring the next frame reception by means of the video multiplexing decoder. More specifically, a reception is monitored with respect to the "frame commencement sign" in the frame layer of video signals which is hierarchically structured.

After the monitoring of the next frame reception is started, step S204 is executed. In the step S204, it is determined whether or not the reception of the next frame is started. When the reception of the next frame is started, step S205 is executed. In the step S205, the recording MAX timer is actuated.

After the recording MAX timer is actuated, step S206 is executed. In the step S206, the synchronized information and reception attribute are recorded, and at the same time, the voice signals are transferred from the dividing unit 112 (see FIG. 30) to the digital memory unit 113 (see FIG. 6), thus starting the storage. The input to the video signal multiplexing decoder of the video decoding unit 110 is transferred to the digital memory unit 113, thus starting the storage. At the time of this transfer, the monitored "frame commencement sign" is transferred at first. Also, due to the problem of timing, at least either this frame or the next frame becomes the frame of a totally INTRA mode in a high probability corresponding to the request for updating the screen in the step S202. In this respect, there is a case where this takes place much later in terms of timing, but in such a case, the amount of information is extremely small during the period, that is, it is fundamentally possible to start immediately the encoded signals of recorded image beginning at the totally INTRA mode.

Then step S207 is executed. In the step S207, the termination of communication and the time out of the recording MAX timer are monitored.

When either the termination of communication or the time out of the recording MAX timer is sensed, step S208 is executed. In the step S208, the file for received messages is closed, and the postprocessing is performed.

As described above, the recording is made in the digital memory unit 113 from the image information in the next frame after a refreshing request is made. As a result, when the recording is started, it is assumed that the image frame of a totally INTRA mode is recorded in the head frame or approximately in the second or third frame. In this way, a good image information can be displayed promptly when reproduced, and then, an answer recording can be performed without any waste.

Figure 34:
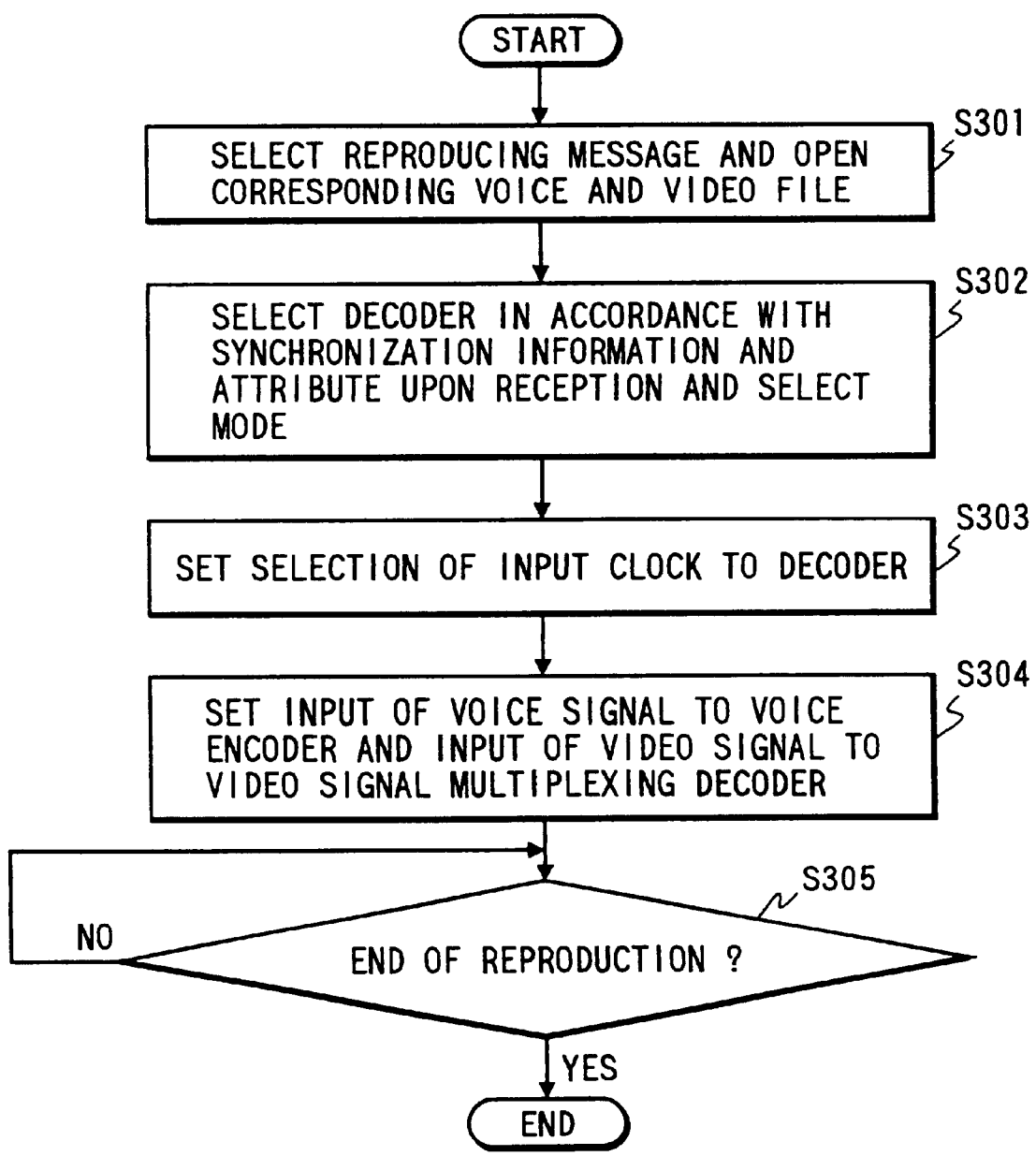
FIG. 34 is a flowchart which shows the reproducing operation of a received message.

Now, in conjunction with a flowchart shown in FIG. 34, the reproducing operation of a received message will be described.

At first, step S301 is executed. In the step S301, the reproducing message is selected among the received messages stored in the digital memory unit 113 (see FIG. 30) to open the voice and image files corresponding to this message.

Then step S302 is executed. In the step S302, the selection of the decoding unit and the setup of the mode are performed in accordance with the reception attributes, such as the information of the synchronized voice and image, the mode at the time of reception, the assigned transfer rate, which are stored in the digital memory unit 113 with respect to the selected reproducing message.

Then step S303 is executed. In the step S303, the dividing unit 112 (see FIG. 30) is actuated to set up the mode to the recorded reception mode spuriously for the input of clock to the voice decoding unit 103 (see FIG. 30) and video decoding unit 108 (see FIG. 30) without establishing any data path.

Then step S304 is executed. In the step S304, the voice signals are transferred from the digital memory unit 113 to the voice decoding unit 103, and the image signals to the video decoding unit 108 in synchronism, respectively. After the transfer is started, step S305 is executed. In the step S305, the termination of the reproduction is monitored. When the termination of the reproduction is sensed, the operation is terminated.

As described above, it is possible to select for reproduction arbitrarily the voice and image information which are the received information stored in the digital memory unit 113.

As set forth above, in accordance with the communications apparatus for multimedia information of the seventh embodiment, when a multiplexed information containing image information is received through circuit for an automatic recording, a refresh request is made to the transmission side before the performance of the automatic recording, and then, the recording is made from the frame which is encoded by the INTRA mode after refreshing. Therefore, it is possible to reproduce in a good condition the information received for the automatic recording, and at the same time, to curtail the volume required for accumulating the received information.

[Eight Embodiment]

Figure 35:
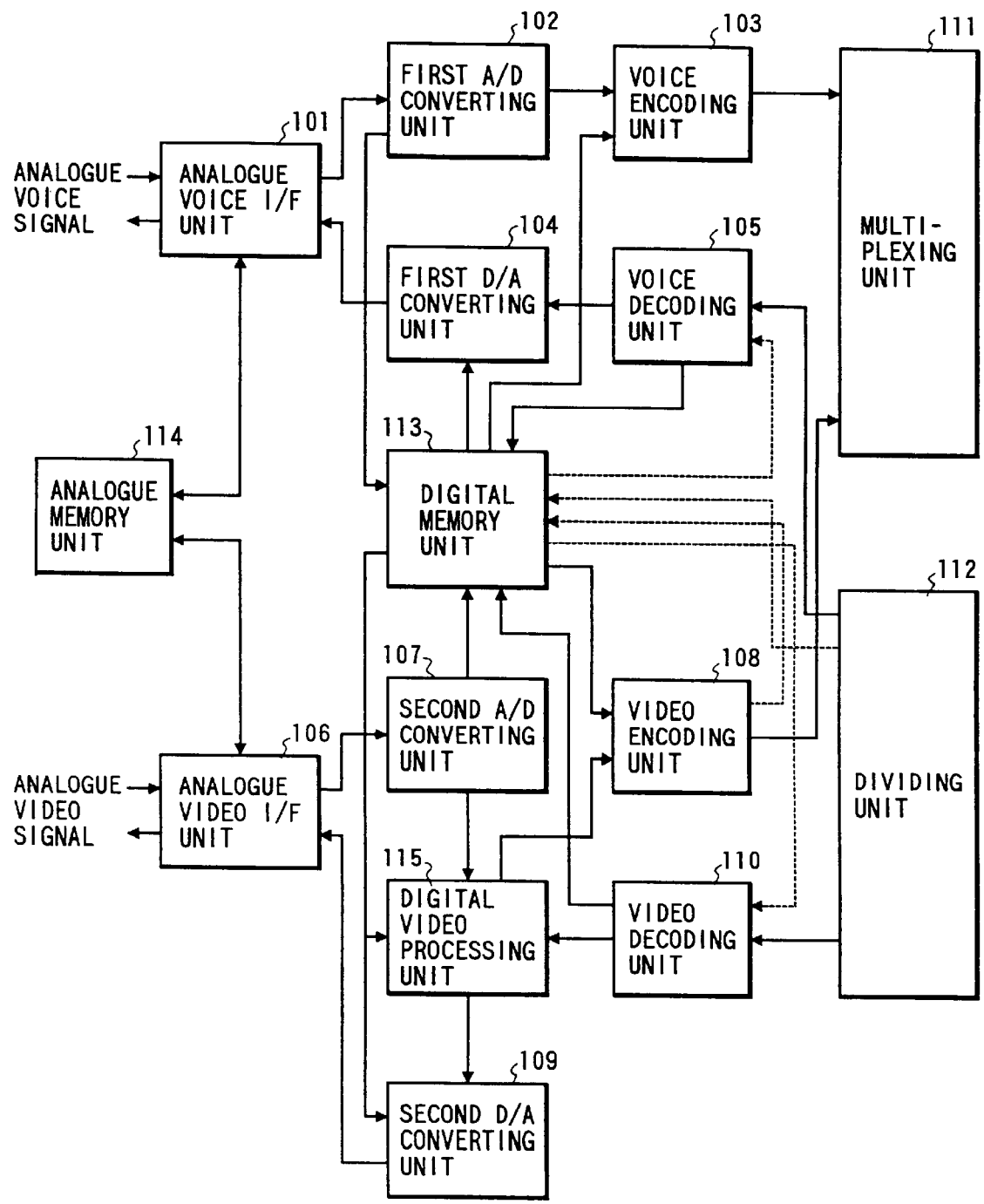
FIG. 35 is a block diagram which shows the flow of voice and image information for a communications apparatus for multimedia information according to a eighth embodiment of the present invention.

Now, with reference to the accompanying drawings,. the description will be made of an eighth embodiment according to the present invention. FIG. 35 is a block diagram which shows the flow of voice and image signals in a communications apparatus for multimedia information according to the eight embodiment.

Figure 36:
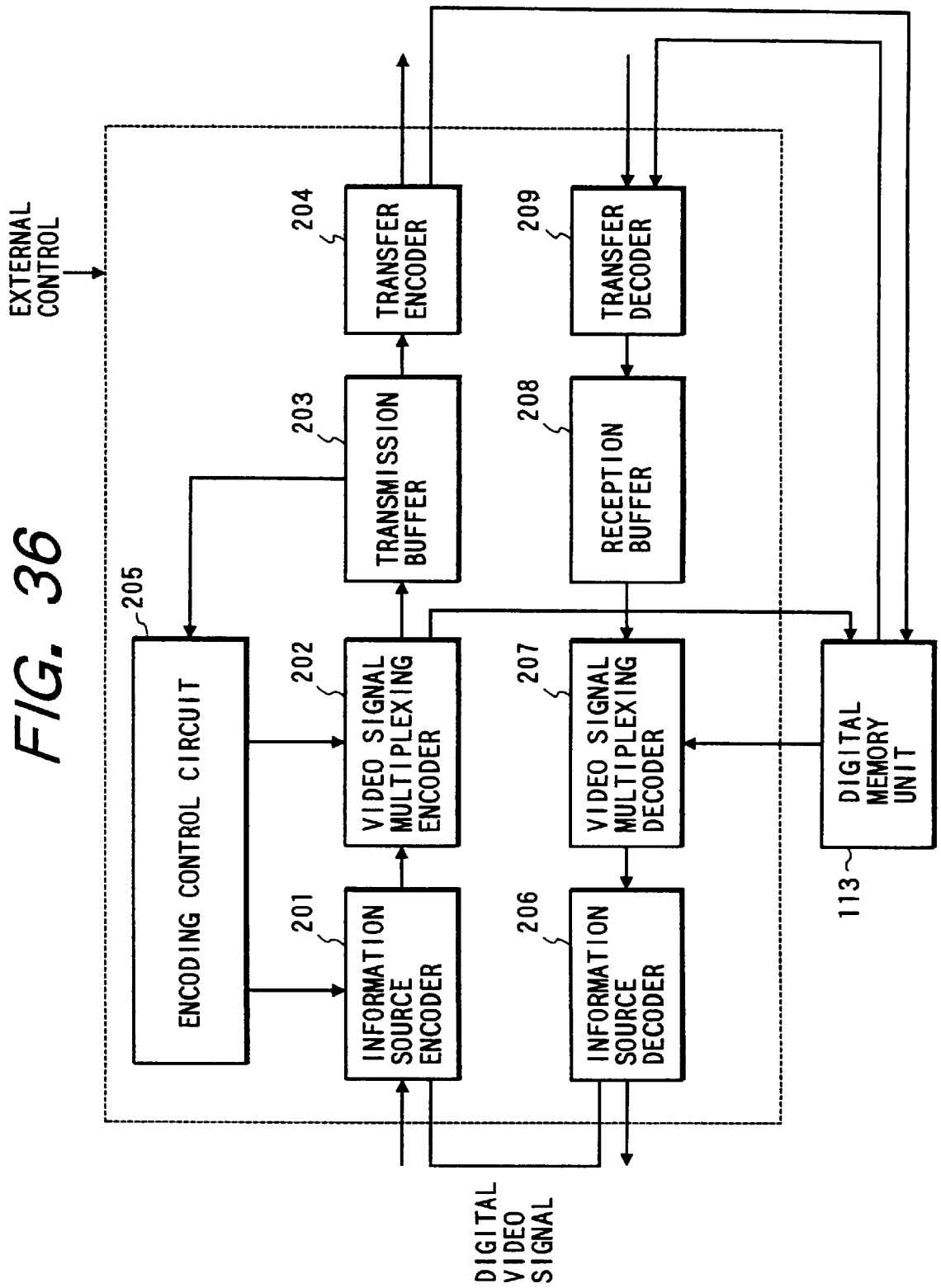
FIG. 36 is a diagram which shows the circuit which executes the videocodec function of the H.261 according the eighth embodiment.

FIG. 36 is a diagram which shows the circuit for executing the videocodec function of "H.261" according to the eighth embodiment. The elements having the same reference marks appearing in FIG. 3 are provided with the same functions as those of the elements represented in FIG. 3.

As shown in FIG. 35, the analogue voice signals to be transmitted, and the analogue voice signals read from the analogue memory unit 116 are inputted into the analogue voice I/F unit 101. The analogue voice I/F unit 101 controls the input of the analogue voice signals and the output thereof.

The analogue memory unit 114 stores the analogue voice signals from VCR or the like in synchronism through the analogue voice I/F unit 101, and outputs the analogue signals in synchronism with the analogue voice I/F unit 101. Likewise, the analogue image signals from the VCR or the like are stored in the analogue memory unit 114 in synchronism through the analogue image I/F unit 111 which will be described later, and are read out from the analogue memory unit 111 in synchronism with the analogue image I/F unit 114.

The analogue voice signals output from the analogue voice I/F unit 101 are supplied to the first A/D converter 102.

The first A/D converter 102 converts the analogue voice signals from the analogue voice I/F unit 101 to the digital voice signals. The digital voice signals from the first A/D converter 102 are supplied to the digital memory unit 113 and voice encoding unit 103.

The digital memory unit 113 stores the digital voice signals from the first A/D converter 102. The digital memory unit 113 records the digital voice signals and digital image signals on MOD, HD, or other recording media.

The voice encoding unit 103 encodes the digital voice signals from the first A/D converter 102 and the digital voice signals from the digital memory unit 113, and generates the encoded voice signals. The encoded voice signals from the voice encoding unit 103 are supplied to the multiplexing unit 111.

The analogue image signals to be transmitted or the analogue image signal read out from the analogue memory unit 114 are inputted into the analogue image I/F unit 111. The analogue I/F unit 111 controls the input of the analogue image signals and the output thereof. The analogue image signals output from the analogue image I/F unit 111 are supplied to the second A/D converter 107.

The second A/D converter 107 converts the analogue image signals from the analogue image I/F unit 111 to the digital image signals. The digital image signals from the second A/D converter 107 are supplied to the digital memory unit 113 and the digital video processor 115.

The digital memory unit 113 stores the digital image signals from the second A/D converter 107.

The video encoding unit 108 encodes the digital image signals from the second A/D converter 107 through the digital video processor 115, and the digital image signals read out from the digital memory unit 113. The encoded image signals from the video encoding unit 108 are supplied to the multiplexing unit 111.

The multiplexing unit 111 multiplexes the encoded voice signals from the voice encoding unit 103 and the encoded image signals from the video encoding unit 108 in accordance with an instruction from the system controller 15 (see FIG. 5), and transmits them to the circuit interface unit 17.

Received signals from the circuit interface unit 17 are supplied to the dividing unit 112. The dividing unit 112 divides the received signals from the circuit interface unit 17 into the encoded voice signals and the encoded image signals. The encoded voice signals are supplied to the voice decoding unit 105, and the encoded image signals are supplied to the image decoding unit 110.

The voice decoding unit 105 decodes the encoded voice signals to the digital voice signals. The digital voice signals from the voice decoding unit 105 are supplied to the first D/A converter 104 and digital memory unit 112. The first D/A converter 104 converts the digital voice signal from the voice decoding unit 105 and the digital voice signals read out from the digital memory unit 113 to the analogue voice signals.

The analogue voice signals from the first D/A converter 104 are output through the analogue voice I/F unit 101.

The video decoding unit 110 decodes the encoded image signals to the digital image signals. The digital image signals from the video decoding unit 110 are supplied to the digital memory unit 113 and digital video processor 115. The digital memory unit 113 stores the digital image signals.

The digital video processor 115 performs the synthesizing and edit processing by use of the digital image signals from the second A/D converter 107, the digital image signals read out from the digital memory unit 113, and digital video signals from the video decoding unit 110.

The digital image signals from the digital video processor 115 are supplied to the second D/A converter 109. The second D/A converter 109 converts the digital image signals to the analogue image signals and outputs them through the analogue image I/F unit 111.

In this respect, the video encoding unit 108 and the video decoding unit 110 are structured in accordance with the CCITT Recommendations "H.261", and the frame structure regulated by "H.221" as in the conventional technique is adopted for them.

Figure 37:
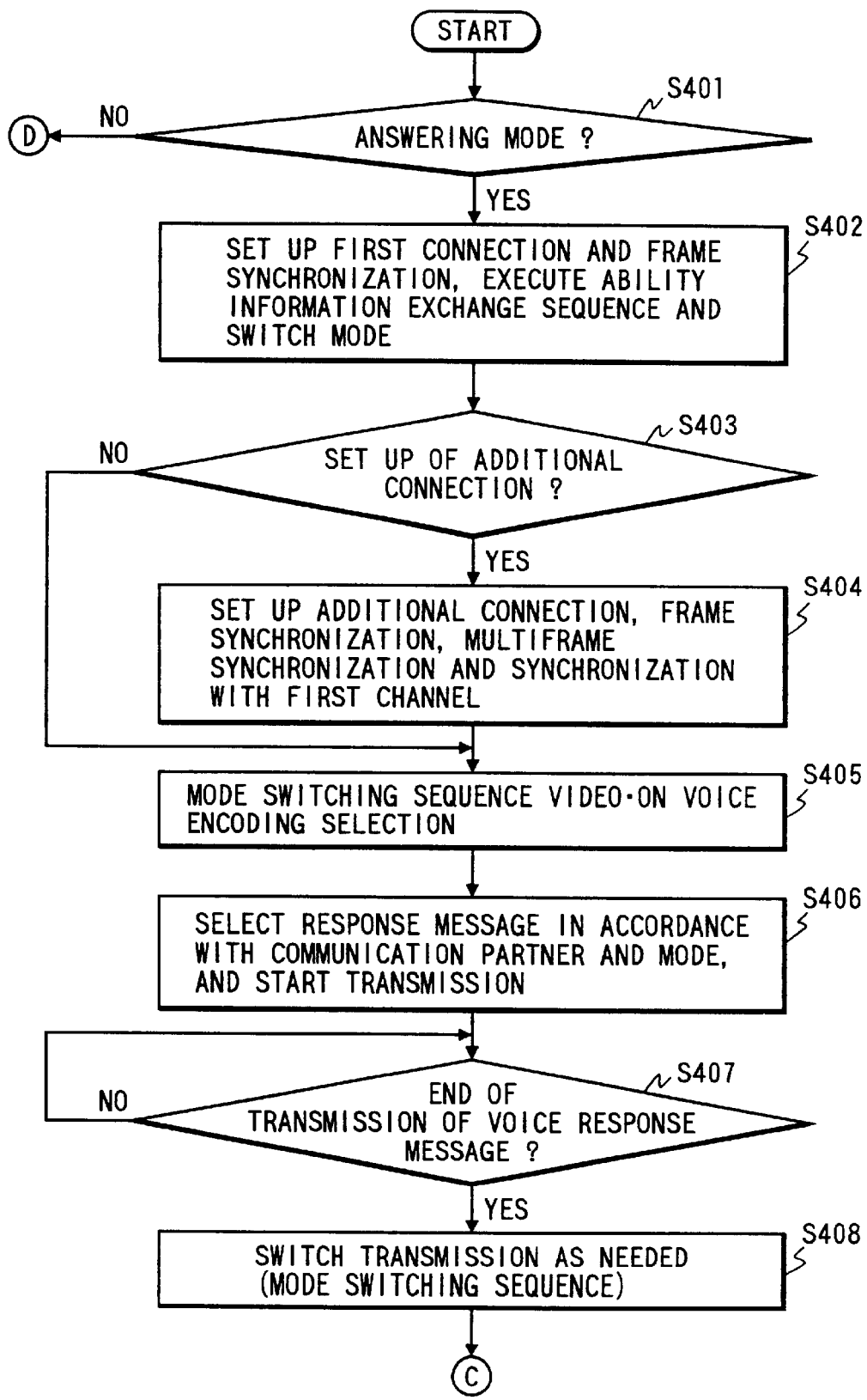
FIG. 37 is a flowchart which shows the operation of the communications apparatus for multimedia information according to the eighth embodiment.
Figure 38:
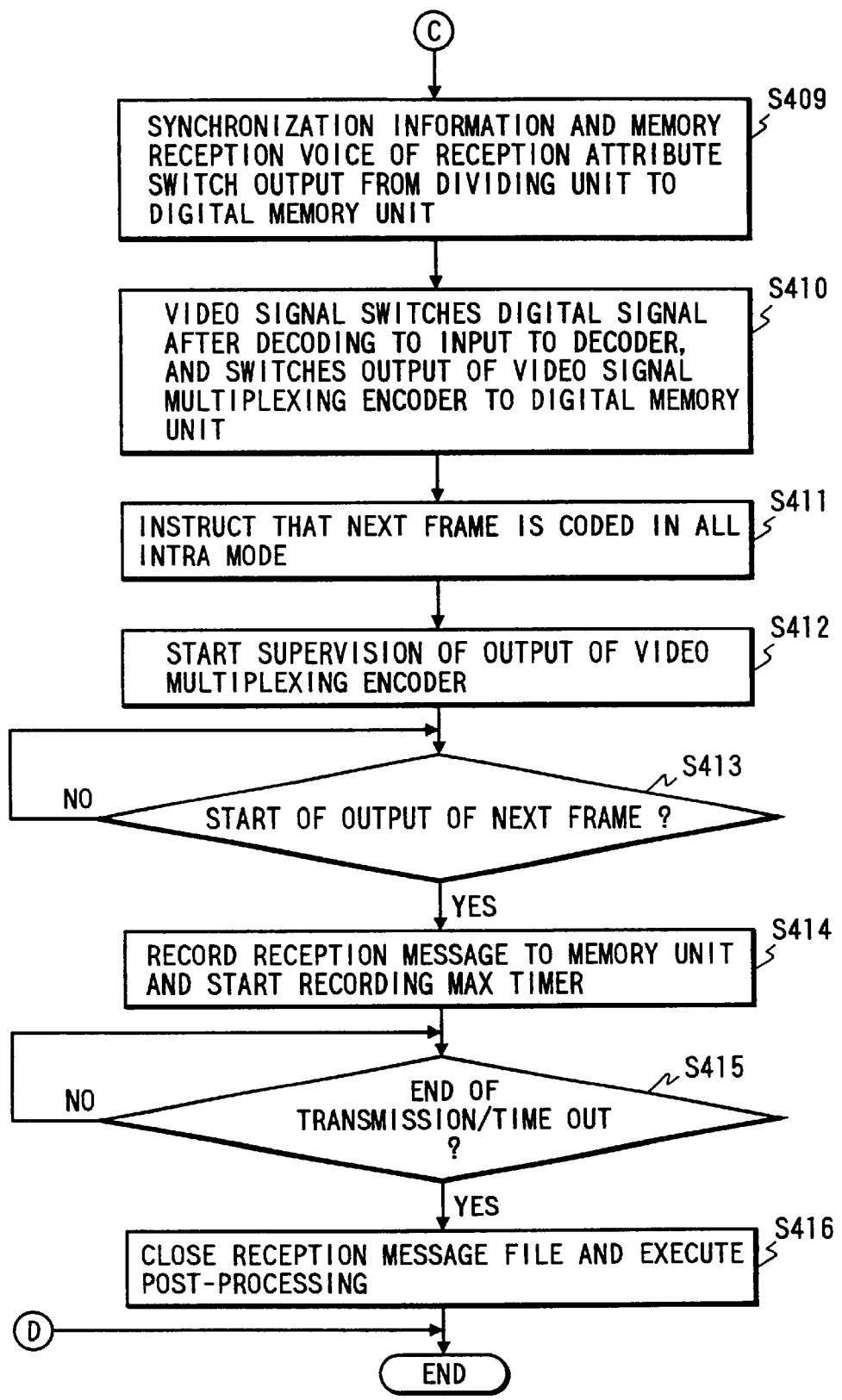
FIG. 38 is a flowchart which shows the operation of the communications apparatus for multimedia information according to the eighth embodiment.

Now, with reference to FIG. 37 and FIG. 38, the description will be made of the operation of the communictions apparatus for multimedia information according to the eighth embodiment. FIG. 37 and FIG. 38 are flowcharts showing the operation of the communications apparatus for multimedia information according to the present embodiment. In this respect, the fundamental structure of the communications apparatus for multimedia information of the present embodiment is the same as the one shown in FIG. 5.

Also, FIG. 35 is a block diagram showing the flow of voice and image information from the analogue input/output unit to the multiplexing/dividing unit of the communications apparatus for multimedia information according to the eighth embodiment. The control of each operation given below is assumed to be performed by the system controller 15.

As shown in FIG. 37, step S401 is executed at first when a call is received. In the step S401, whether or not it is an answer recording mode is determined. If it is set up for the answer recording mode, steps S402 is executed. In the step S402, the call is automatically set up, that is, the connection is established, and on inchannel, the synchronized establishment of frame, the capability information exchanging sequence by BAS code, and mode switching over sequence are executed in accordance with ITU-TS Recommendation "H.221/H.242".

After the establishment of the connection, step S403 is executed. In the step S403, it is determined whether or not there is any request for the setup of additional connections. If negative, step S405 is executed without executing the step S404.

In the step S404, the establishment of additional connections, synchronized establishment of frames on the additional connections, synchronized establishment of multiframe, and synchronized establishment with the first connection are executed, respectively.

Then the step S405 is executed. In the step S405, the voice encoding mode is decided, and mode switching over sequence is executed to turn on the image transmission.

Then step S406 is executed. In the step S406, a response message is selected in accordance with the communicating party to be recognized by the telephone number and other information, and the communication mode determined by the capability information exchange, thus starting the transmission.

After the transmission is started, step S407 is executed. In the step S407, whether or not the transmission of the response message is terminated is determined.

When the transmission of the response message is terminated, step S408 is executed. In the step S408, the transmission mode and reception mode are made to agree with each other if required for the purpose of matching the transfer rate of the transmission and reception for the preparation to turn the received signals to the image signals to be transmitted.

Then, as shown in FIG. 38, step S409 is executed. In the step S409, the reception mode attribute and other information required for synchronization are stored, and then, a switching over is performed so that the voice signals from the dividing unit 112 (see FIG. 35) can be transferred directly to the digital memory unit 113 (see FIG. 35) for storage.

After the switching over in the step S409, step S410 is executed. In the step S410, a switching over is performed so that the output from the information source decoder 206 (see FIG. 36) of the video decoding unit 110 (see FIG. 35) can be inputted into the video multiplexing encoder 201 (see FIG. 36) of the video encoding unit 108 (see FIG. 35), and then, a path is set up to transfer the output from the video multiplexing encoder 202 (FIG. 36) of the video encoding unit 108 (FIG. 35) directly to the digital memory unit 113.

Then step S411 is executed. In the step S411, the encoding control circuit 205 is instructed to encode the next frame in the totally INTRA mode in accordance with a command from the system controller 15.

Then step S412 is executed. In the step S412, it is instructed to start monitoring the output from the video multiplexing encoder 202 shown in FIG. 36.

After the instruction is issued to start monitoring, step S413 is executed. In the step S413, the commencement of the head encoding for the next frame is monitored. More specifically, the output of "frame commencement sign" is monitored in the frame layer of the video signals which is hierarchically structured.

When the commencement sign for the next frame is sensed, step S414 is executed. In the step S414, recording MAX timer is actuated, and at the same time, the recording to the digital recording unit 113 is started.

After the recording MAX timer is actuated, step S415 is executed. In the step S415, it is determined whether the communication is terminated or the time up of the recording MAX timer is present.

When either the communication is terminated or the time up of the recording MAX timer is present, step S416 is executed. In the step S416, the file for received messages is closed, and the postprocessing is performed.

As described above, the voice information is stored as encoded information immediately before being decoded. The image information is once decoded, and encoded in the totally INTRA mode. Then the storage is made beginning at this encoded frame, thus making it possible to perform the reproduction promptly, and at the same time, to curtail the volume required for the storage of received information significantly.

As set forth above, in accordance with the communications apparatus for multimedia information of the present embodiment, it is possible to execute a dynamic access to the accumulated reception information in the answer recording mode, and at the same time, to curtail the volume required for the accumulation of the received information.

According to the communications apparatus for multimedia information of the eighth embodiment, the multimedia information received through circuit, which contains the encoded image information, is decoded, and then, again encoded by the application of a given method. This image information which is again encoded is automatically stored. Therefore, it is possible to demonstrate an effect that the received information is reproduced in a good condition at the time of automatic recording, and at the same time, the volume required for accumulating the received information can be curtailed.

What is claimed is:

1. A communication apparatus for multimedia information, comprising:

reception means for receiving multiplexed multimedia information;

memory means for storing information containing audio information and image information as an automatic response message in an automatic response to a transmission side in accordance with a reception by said reception means; and transmission means for transmitting image frame data information for use in the automatic response to the transmission side after having transmitted audio frame data information for use in the automatic response in accordance with the reception, wherein said transmission means establishes one or more connections with a communication apparatus of a communication partner during the transmission of audio data by said transmission means to yield a multi-channel communication link with the communication partner, and wherein the number of connections established by said transmission means is determined by the capability of the communication apparatus of the communication partner and the type of multimedia information that is to be transmitted as the automatic response message.

2. A communications apparatus according to claim 1, wherein said transmission means transmits the audio frame data information encoded by PCM.

3. A communications apparatus according to claim 1, further comprising storing means for storing said received multiplexed information.

4. A communications apparatus according to claim 1, wherein said memory means stores information for one reception for a predetermined time.

5. A communications apparatus according to claim 1, wherein said transmitted image frame data information is encoded information according to an H.261 codec.

6. A communications apparatus according to claim 1, wherein said transmitted image frame data information is encoded information according to a JPEG encoding method.

7. A communications apparatus according to claim 1, further comprising pick up means for picking up an image, wherein said transmission means transmits said picked up image together with said audio frame data information when an automatic response mode is not set, and said transmission means transmits only said audio frame data information without said picked up image when the automatic response mode is set.

8. A communications apparatus according to claim 1, further comprising selection means for selecting a response message as the transmitted information transmitted in the automatic response message in response to the multiplexed multimedia information received by said reception means.

9. A communication apparatus according to claim 1, further comprising storage means for storing additional audio and image information which is transmitted from a communication partner after said transmission means has transmitted the stored image frame data information.

10. A communication apparatus according to claim 1, further comprising means for establishing an additional connection with the communication partner according to the presence or absence of an additional connection setting after said transmission means has transmitted the stored image frame data information.

11. A communication method for multimedia information, comprising the steps of:

receiving multiplexed multimedia information;

storing information containing audio information and image information as an automatic response message in an automatic response to a transmission side in accordance with a reception in said receiving step; and transmitting image frame data information for use in the automatic response to the transmission side after having transmitted audio frame data information for use in the automatic response in accordance with the reception, wherein, in said transmission step, one or more connections with a communication apparatus of a communication partner are established during the transmission of audio data in said transmission step to yield a multi-channel communication link with the communication partner, and wherein the number of connections established in said transmission step is determined by the capability of the communication apparatus of the communication partner and the type of multimedia information that is to be transmitted as the automatic response message.

* * * * *

UNITED STATES PATENT AND TRADEMARK OFFICE
CERTIFICATE OF CORRECTION

PATENT NO.    : 6,400,693 B2
DATED         : June 4, 2002
INVENTOR(S)   : Masatoshi Otani It is certified that error appears in the above-identified patent and that said Letters Patent is hereby corrected as shown below:

Drawings,
Sheet 29 of 40, Figure 27, Box S201, "DPRESS" should read -- DEPRESS --.

Column 6,
Line 7, "shows the preration" should read -- show the operation --.
Line 11, "shows" should read -- show --.

Column 8,
Line 21, "(p-law)," should read -- (µ-law), --.

Column 10,
Line 42, "105" should read -- 105 → --.

Column 11,
Line 3, "JPED" should read -- JPEG --.

Column 12,
Line 9, "own," should read -- itself, --.

Column 20,
Line 2, "A/p" should read -- A/D --.

Column 22,
Line 1, "on the" should read -- of --.
Line 36, "an" should read -- the --.
Line 37, "is" should be deleted.
Line 38, "is unable to" should read -- prevents --.
Line 39, "materialize" should be deleted.
Line 48, "despite" should read -- despite the fact that --.

UNITED STATES PATENT AND TRADEMARK OFFICE
CERTIFICATE OF CORRECTION

PATENT NO.   : 6,400,693 B2
DATED        : June 4, 2002
INVENTOR(S)  : Masatoshi Otani It is certified that error appears in the above-identified patent and that said Letters Patent is hereby corrected as shown below:

Column 26,
Line 14, "At first steps" should read -- First, step --.

Column 27,
Line 43, "[Eight" should read -- [Eighth --.

Column 29,
Line 17, "communictions" should read -- communications --.

Signed and Sealed this

Twenty-fourth Day of June, 2003

JAMES E. ROGAN
*Director of the United States Patent and Trademark Office*